United States Patent [19]

Daniels

[11] Patent Number: 5,409,435
[45] Date of Patent: Apr. 25, 1995

[54] VARIABLE RESISTANCE EXERCISE DEVICE

[76] Inventor: John J. Daniels, 350 Bristol St. Unit A-1, Waterbury, Conn. 06708

[21] Appl. No.: 148,066

[22] Filed: Nov. 3, 1993

[51] Int. Cl.⁶ .............................................. A63B 21/00
[52] U.S. Cl. .......................................... 482/5; 482/53; 482/58; 482/73; 482/901; 482/902
[58] Field of Search ......................................... 482/1–9, 482/51, 52, 53, 58, 73, 900–903

[56] References Cited

U.S. PATENT DOCUMENTS

| | | | |
|---|---|---|---|
| 4,726,582 | 2/1988 | Fulks | 482/901 X |
| 5,015,926 | 5/1991 | Casler | 482/902 X |
| 5,201,772 | 4/1993 | Maxwell | 482/6 X |

Primary Examiner—Richard J. Apley
Assistant Examiner—Glenn Richman
Attorney, Agent, or Firm—John J. Daniels

[57] ABSTRACT

A variable resistance exercise device provides a variable resisting force in response to a user applied force. The variable resistance exercise device includes at least one rotating force transmitting means for inputting a user applied force as a rotational force to be resisted, and at least one force transmission member for transmitting the user applied force. The user applied force is resisted by varying the viscosity of a viscosity variable fluid which surround plates rotated by the user applied force. Thus a braking force is applied to actively resist the user applied force. In accordance with the invention, a multi-configurable multi-programmable exercise device is provided which may be used in a variety of exercise modes to provide a resistive force to a user-applied force during a range of motion of a particular exercise. In a preferred embodiment of the present invention, a variable resistor resists a user-supplied force in one rotational direction only. A gear and clutch system translates a reciprocating user-supplied force, corresponding to a reciprocating range of motion, into the one rotational direction.

10 Claims, 28 Drawing Sheets

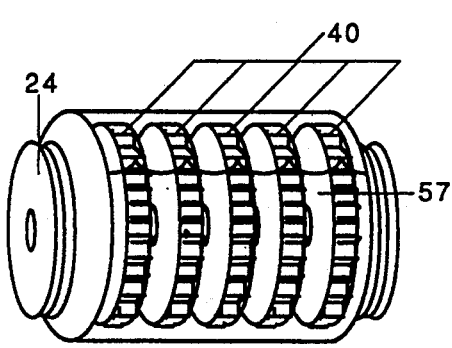
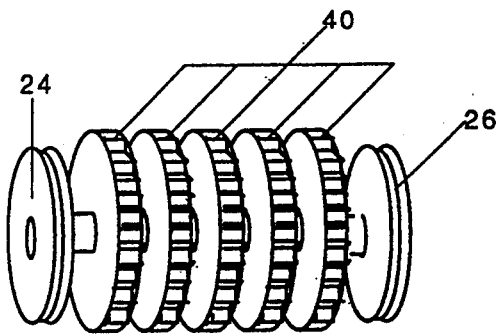
Figure 9(a)  Figure 9(b)
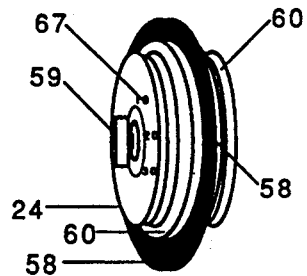
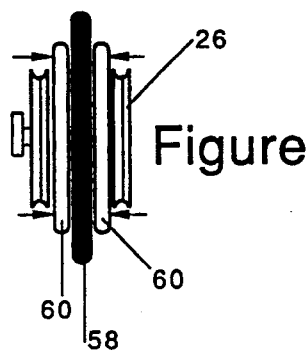
Figure 10(a)  Figure 10(b)
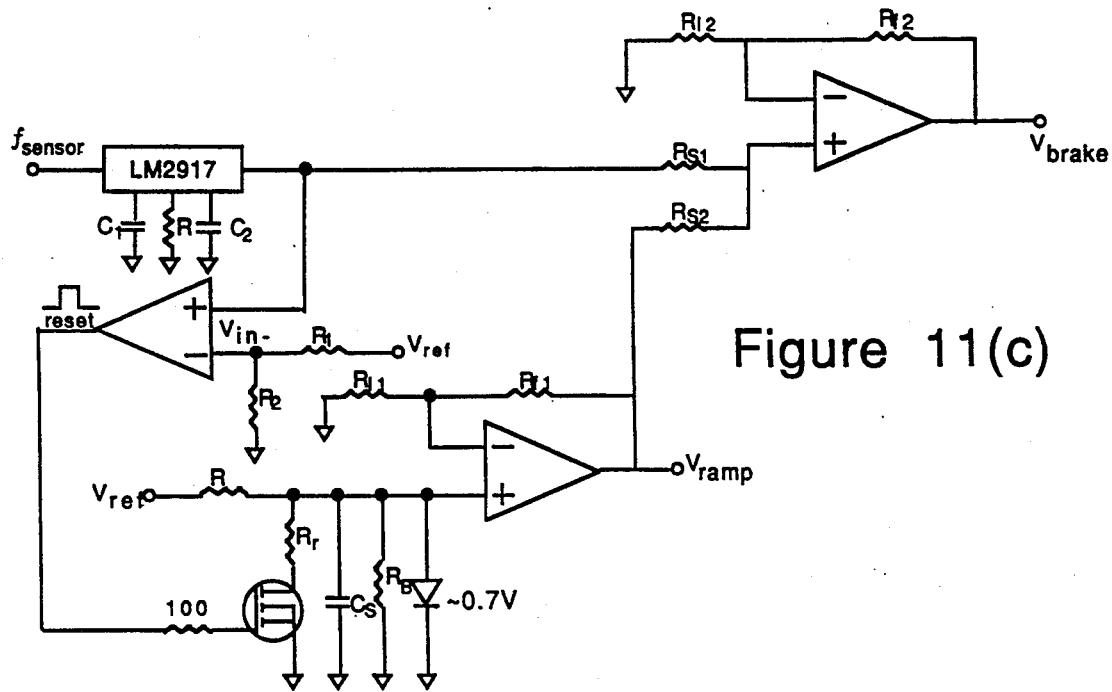
Figure 11(c)

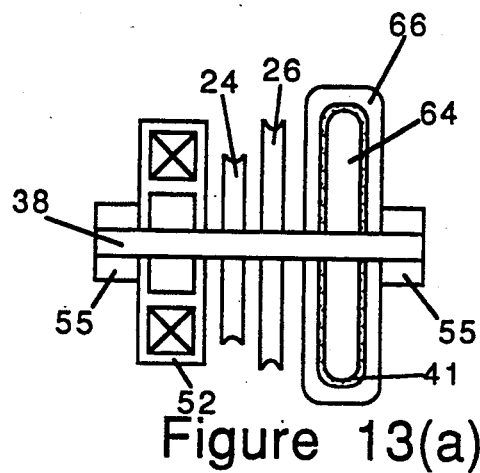
Figure 13(a)
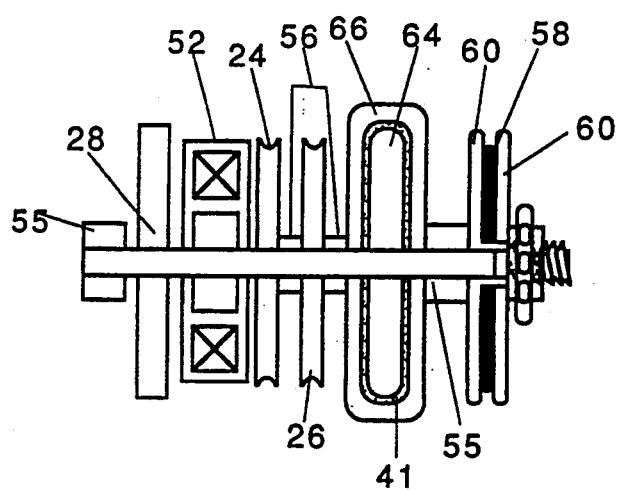
Figure 13(b)
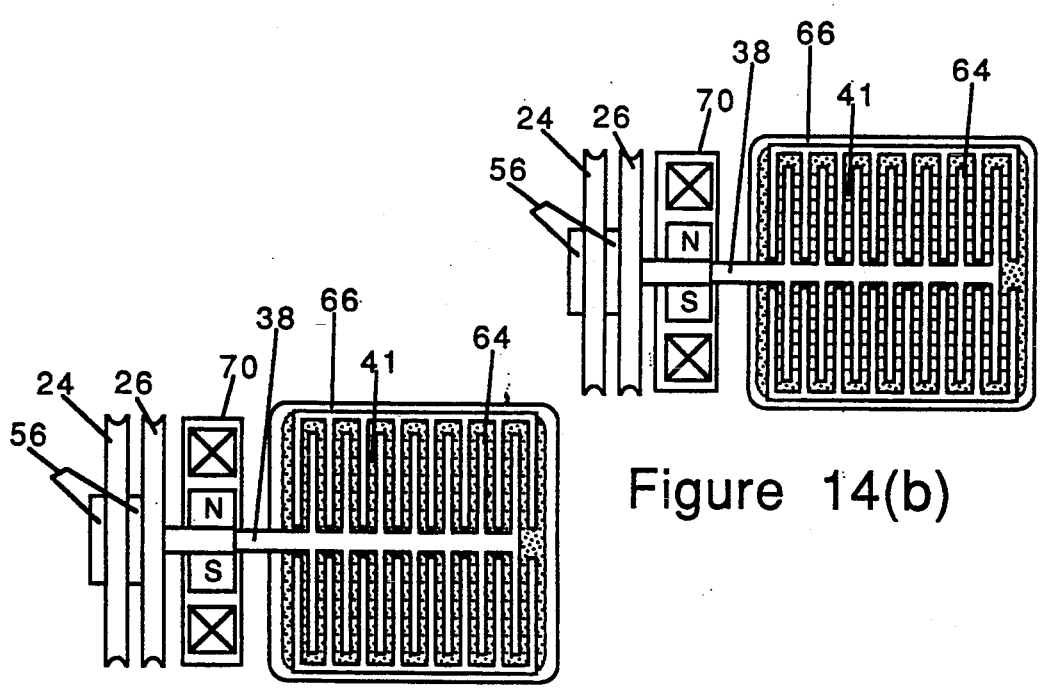
Figure 14(b)
Figure 14(a)

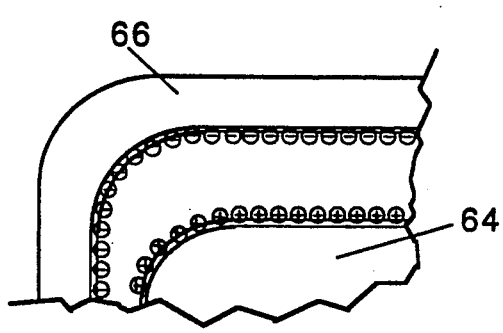
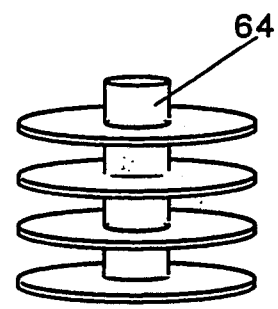
Figure 21
Figure 22(a)
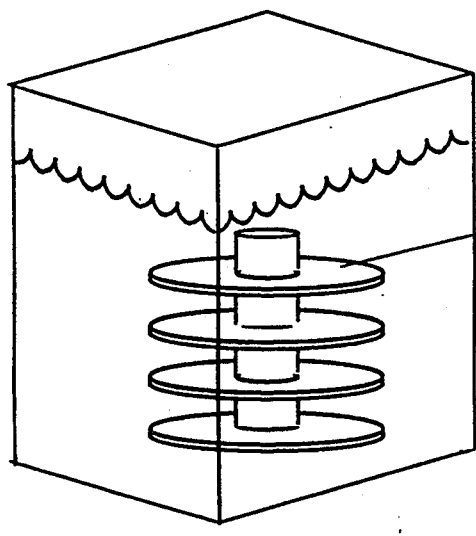
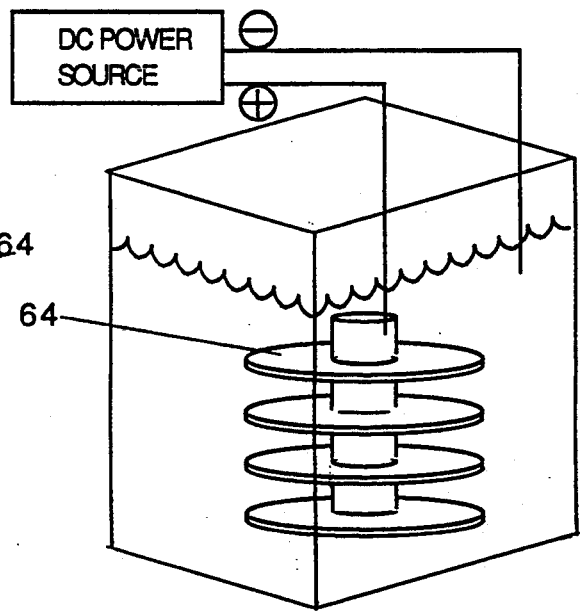
Figure 22(b)
Figure 22(c)

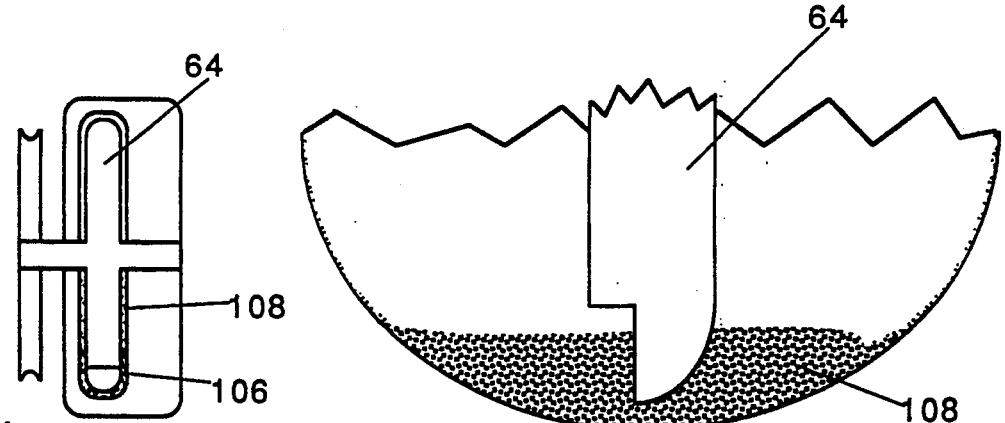
Figure 23(a)
Figure 23(b)
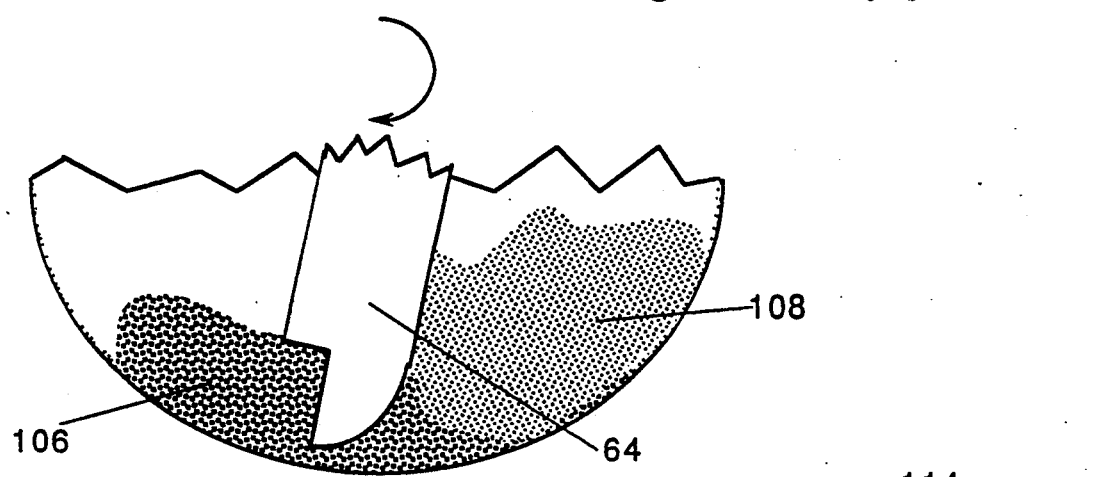
Figure 23(c)
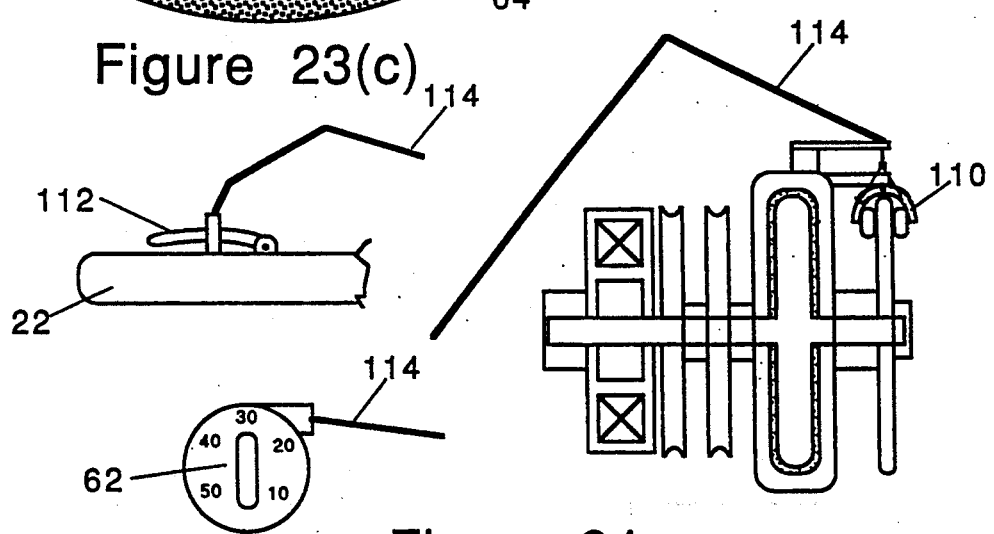
Figure 24

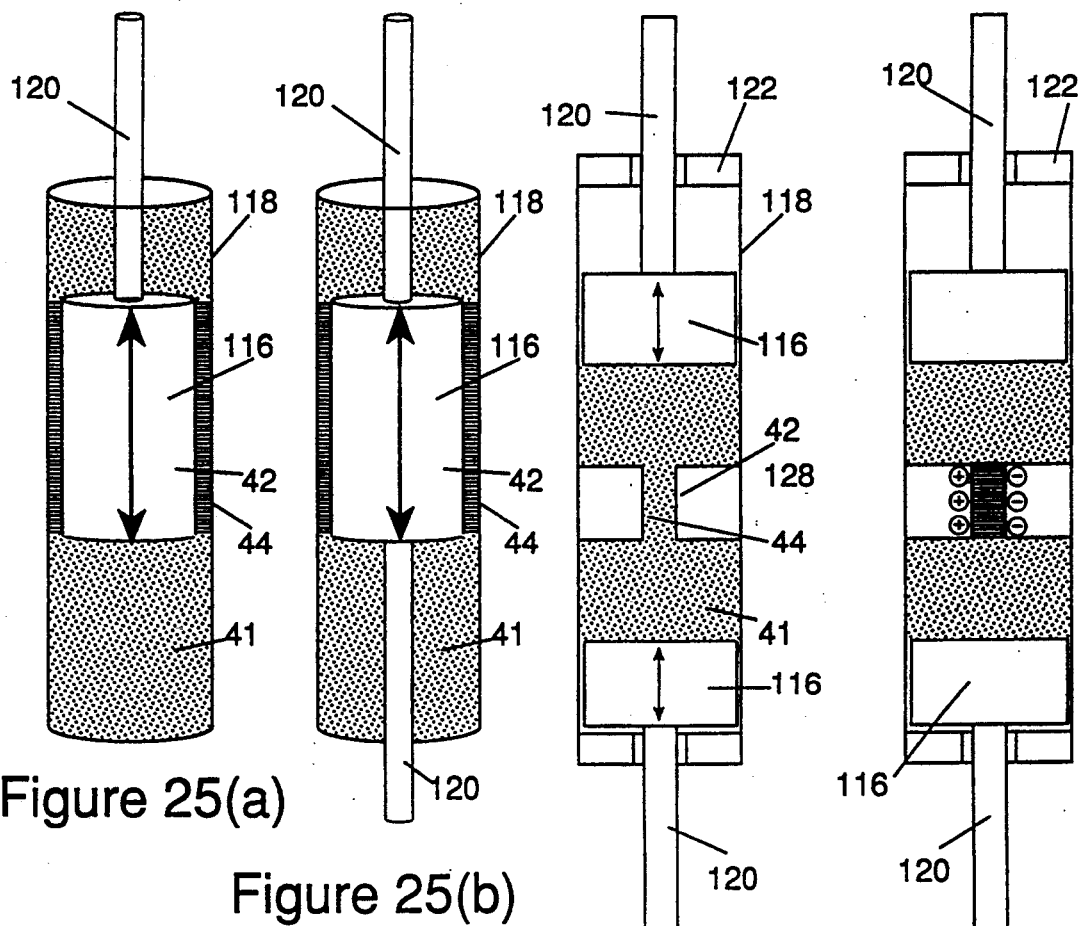
Figure 25(a)
Figure 25(b)
Figure 27(a)
Figure 27(b)
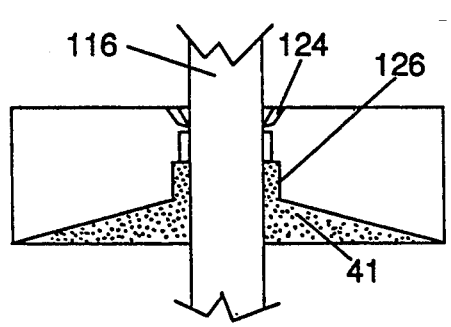
Figure 26(b)
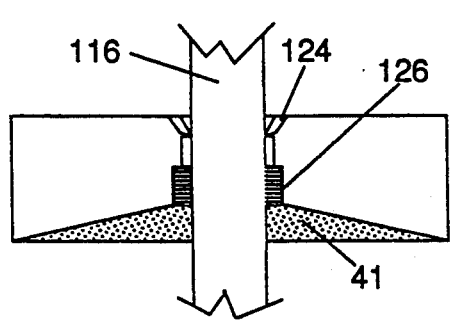
Figure 26(c)
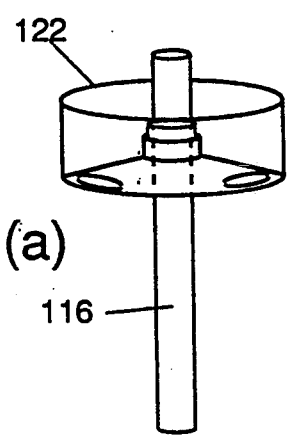
Figure 26(a)

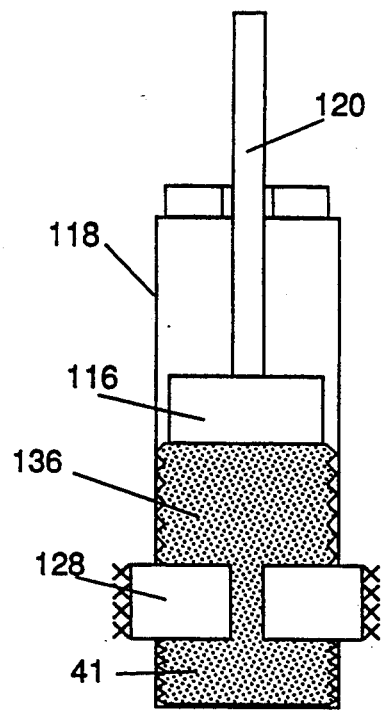
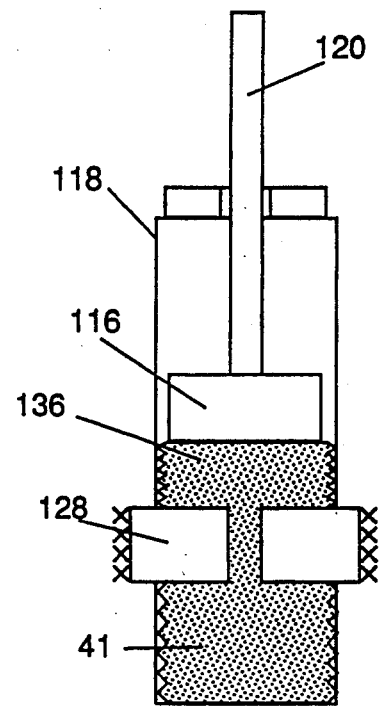
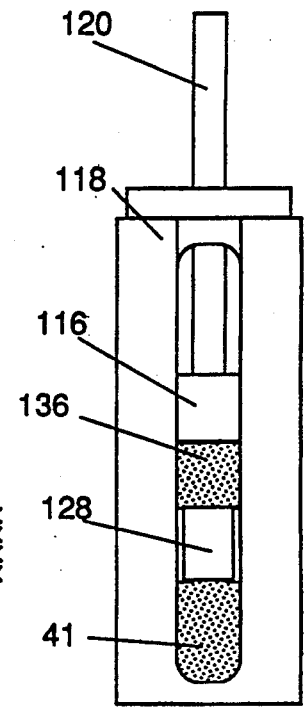
Figure 31(a)  Figure 31(b)  Figure 31(c)
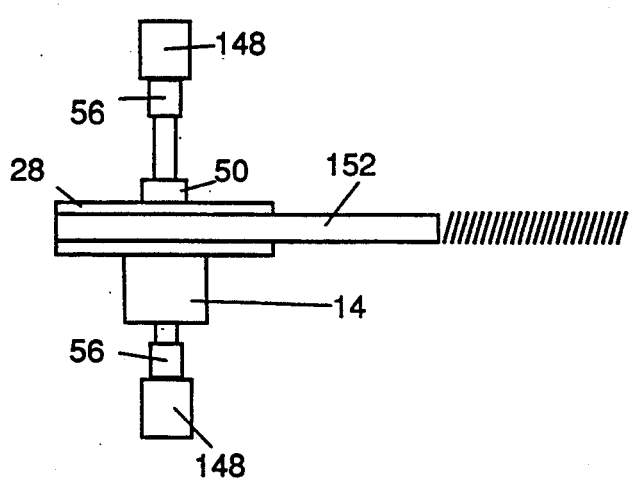
Figure 33(d)

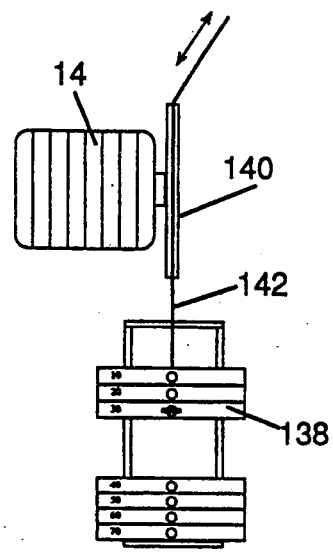
Figure 32(a)
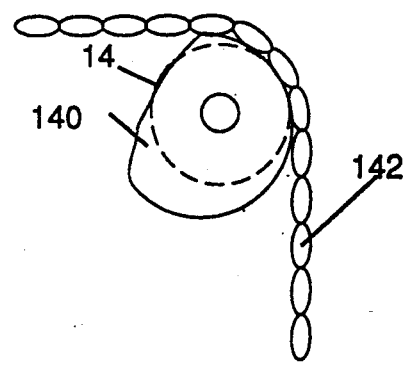
Figure 32(b)
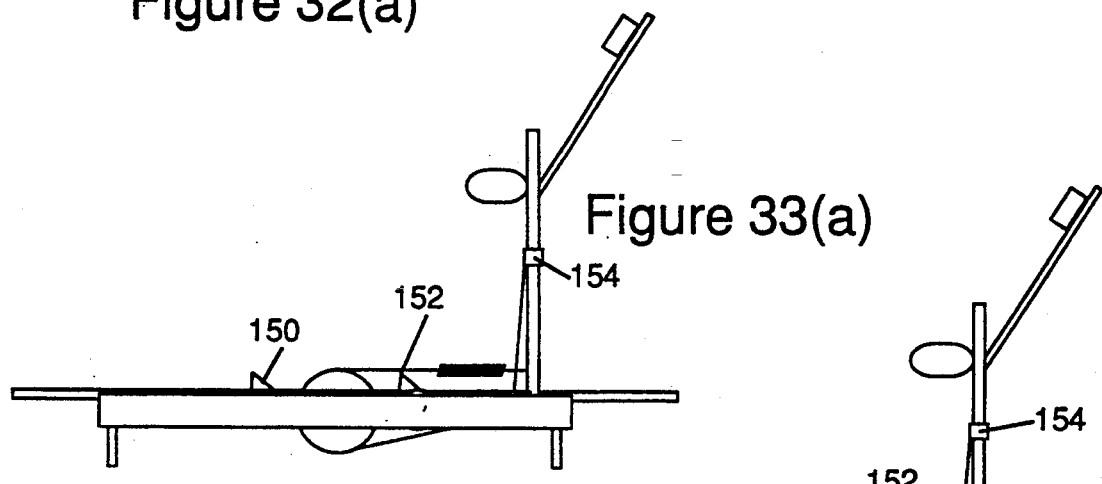
Figure 33(a)
Figure 33(b)
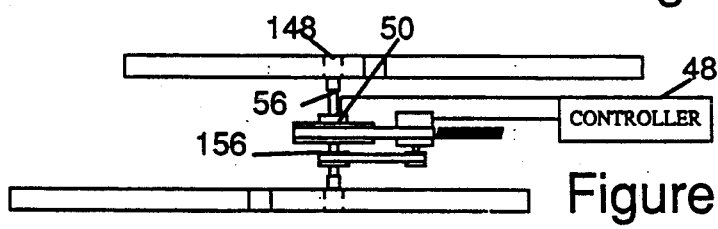
Figure 33(c)

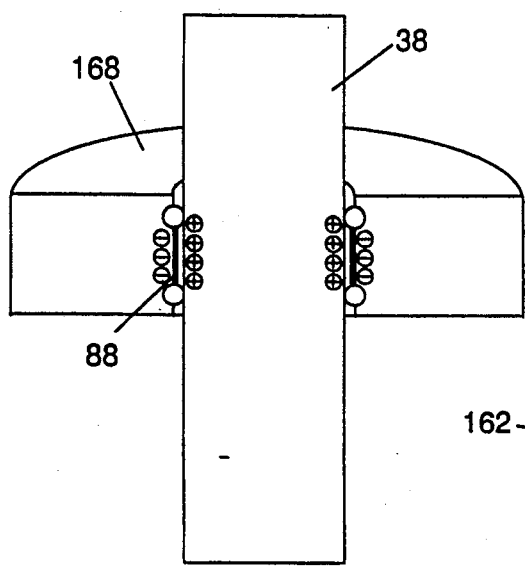
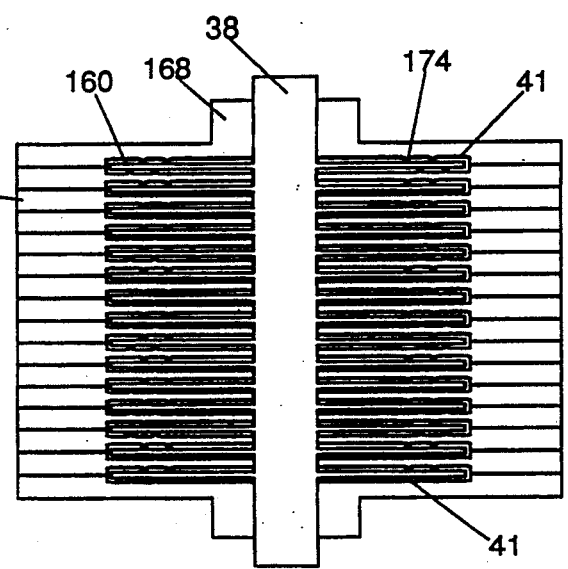
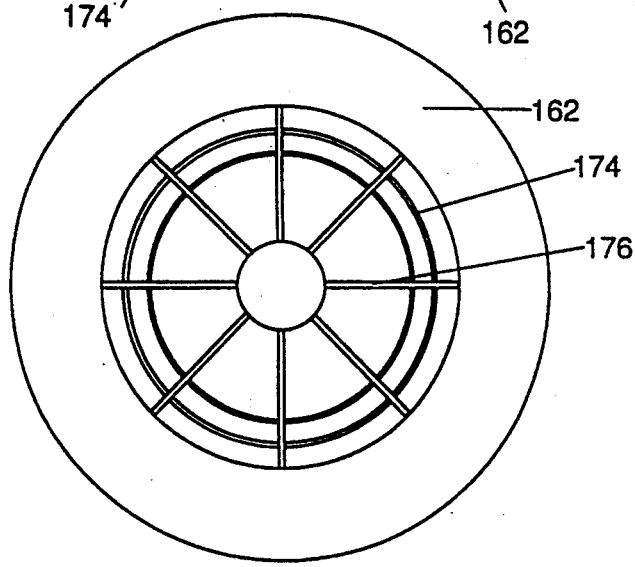
Figure 37
Figure 38(a)
Figure 38(b)

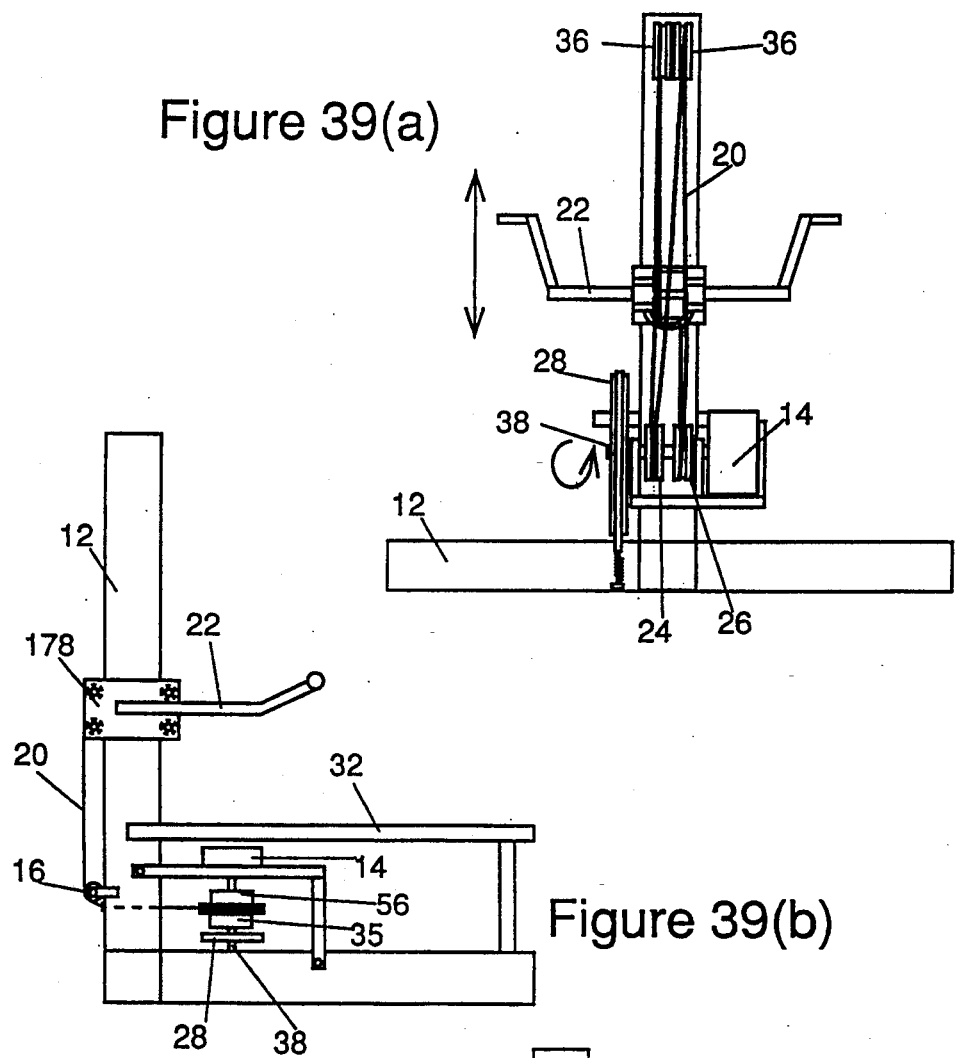
Figure 39(a)
Figure 39(b)
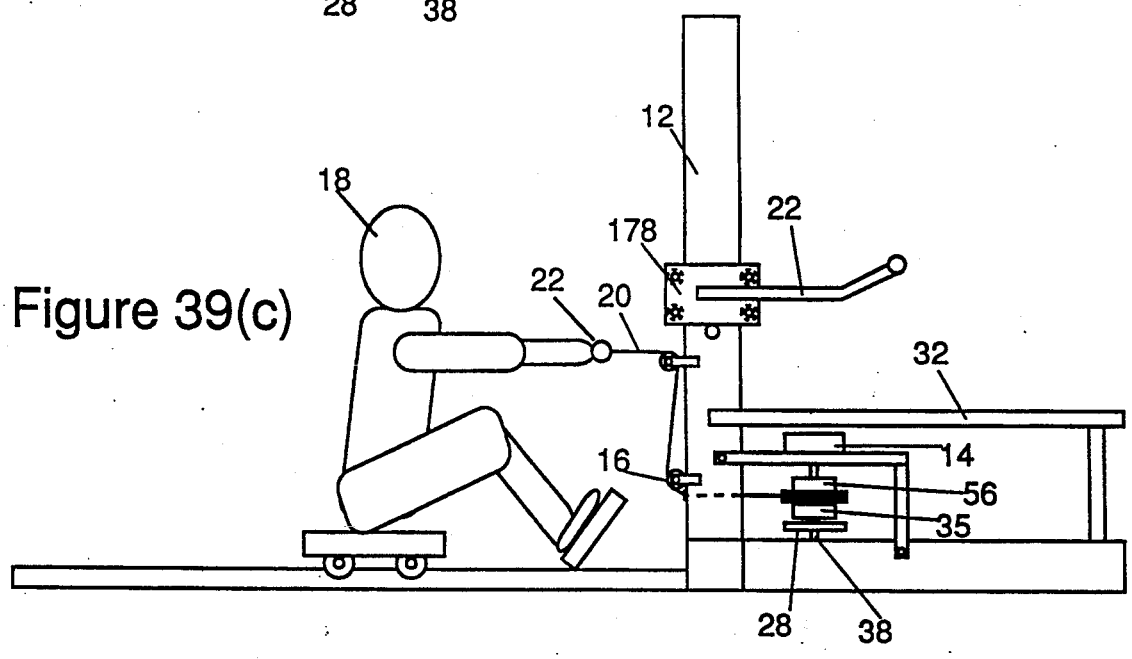
Figure 39(c)

VARIABLE RESISTANCE EXERCISE DEVICE

TECHNICAL FIELD OF THE INVENTION

The present invention pertains to a multi-configurable programmable exercise apparatus. More particularly, the present invention pertains to a multi-configurable programmable exercise apparatus which may be used to provide a variable resistance to enable isotonic, isokinetic, and cardiovascular exercise.

BACKGROUND OF THE INVENTION

Traditionally, muscle building exercise has been associated with the lifting of free weights, which are simply plates of steel, or cement filled plastic, positioned on a bar which resist a force applied by a user through the action of gravity. Such free-weight exercise apparatus provide a consistent resisting force, due to the consistent nature of gravity, therefore providing the same resistance to the user applied force throughout the range of motion of the exercise. For example, in the case of exercising the biceps of the upper arm, the user stands up straight, grasping the bar with an equally distributed weight on either side with his hands, and brings the bar upward against the resisting force of gravity, by bending his arms at the elbows to thereby provide a strain to the biceps muscle group.

Typically, each time the user performs this range of motion it is called a repetition or rep. By performing a plurality of reps, the biceps group of muscles in both arms of the user is fatigued, causing slight shredding of the muscle tissue which becomes stronger and more massive upon healing. In addition, the user will generally perform a variety of other exercises using the free-weight system. Such exercises include the bench press, in which the user lies on a bench and presses the free-weight system in a motion reciprocating the bar from his chest, where his arms are most bent, to a position where his arms are substantially straightened.

Also, the user may perform the seated shoulder press in which he sits upright on a bench and presses the free-weight system up over his head in a range of motion from where the bar is resting on his shoulders behind his head, at a position where his arms are most bent, upwards to a position where his arms are substantially straightened. A similar mode of exercise may be performed by resting the bar of the free-weight system in front of his head towards his chest and pressing upward. Another weight lifting exercise is called a triceps curl, which is substantially the reverse of the biceps curl, wherein the force resisting the user applied force is resisting the motion of the user's arms to fatigue the triceps muscle groups.

In addition to the free-weight form of exercise, other exercise apparatus are designed to replicate other particular conventional exercise modes. Examples of these exercises include rowing, in which the user rows a stationary rowing machine, which replicates the rowing of a boat on water. Another example is the stationary exercise bicycle, in which an apparatus resembling a bicycle is pedaled by the user but remains stationary. In these forms of exercise, there is always applied a force to counteract the force applied by the user, and to cause the necessary muscle fatigue desired to complete the particular exercise.

Typically, there are four modes of exercise which a user may perform. Each mode has certain advantages and disadvantages over the others with regard to body conditioning, muscle toning, muscular bulking, endurance etc. These four modes of exercises may be called isometric, isotonic, isokinetic, and cardiovascular.

Isometric exercise is associated with an exercise in which a user applied force results in no range of motion. An example of this type of exercise is the simple act of placing the palms of the hands together and pushing one hand against the other, causing the muscles in tile chest and arm to attempt to contract. This form of exercise may be advantageous over the other forms of exercise because of the very limited range of motion, and the static forces applied to the joints and associated tissue.

Isotonic exercise is associated with the mode of exercise in which the resistive force remains constant. An example of such an exercise is the above described free-weight lifting exercises. In isotonic exercise, the resistive force (i.e. the force of gravity) remains constant while the velocity of movement may vary along the range of motion. Isokinetic exercise is an exercise associated with a variable force resisting a user applied force along tile range of motion of an exercise, so that the velocity along the range of motion of the exercise remains constant.

Cardiovascular exercise is associated with an exercise in which the heart and blood vessel system, as well as other muscle, organ and nervous systems of the body, are caused to experience consistent and relatively prolonged stress. A simple example of such an exercise is jogging. When one jogs, the arms and legs are constantly in motion propelling the jogger forward. Throughout the jog, the heart rate is elevated to supply nutrients and oxygen to the fatiguing muscles. This form of exercise, when done correctly, has many advantages over the other exercises, particularly with regard to overall health conditioning.

There have been attempts in the past to provide an apparatus which is multi-configurable so as to enable the performance of a variety of exercises. However, consistent with these attempts has been the construction of a device which replicates only one or two of the above described exercise modes. Most common of these conventional attempts, are devices which replicate the exercise mode associated with free-weight lifting. To replicate the resistive force of the free-weight system, these devices typically include elastic members which the user stretches during a particular exercise's range of motion, air piston systems which resist the user's applied force by absorbing the force through the compression of air filled in a chamber (using a piston and rod system), or devices which use steel plates which are restricted to movement along tracks. These devices have a variety of inadequacies.

Among the inadequacies of these above mentioned devices, the resistance to the user-applied force remains constant throughout the range of motion of a particular exercise. For example, when replicating biceps curls, the same force is applied to resist the user applied force regardless of whether the arms are at the beginning of a rep such as when in the out-stretched position, or at the end of a rep such as when in the bent-arm position, and the same resistive force is applied along the entire range therebetween.

However, the human body has various points along such a range of motion where the strength of a particular muscle group varies. For example, in the biceps curl range of motion the point of maximum muscular strength of the biceps group may be at a position located somewhere between the two ends of the range of motion, and the points of weakest strength of the particular muscle group may be at points at either end of the range of motion.

Thus, it is recognized that the prior art exercise devices which attempt to replicate the free-weight weight training system are failures because, like the free-weight system, they do not providing for compensation of this inconsistent muscle group strength along a particular range of motion. Also, there are dangers associated with such systems, due to, for example, discrepancy in muscular strength along the range of motion, excessive muscle fatigue and over exertion.

Typically, a user will over exert the muscle group at its weakest points in the range of motion which may seriously damage the body's tissue. Also, because the exercise motion is limited by the weakest points of the muscle group during a particular range of motion, the strongest points of the range of motion receive inadequate stress to maximize the positive effects of the exercise.

Further attempts in exercise devices have led to the construction of devices which may provide a variable resistance to a user-applied force along the range of motion of a particular exercise. Such a device typically requires the input of a counter-acting resistive force using an electric drive motor. A clutch system transmits this rotational force to resist a user applied force. This configuration is particularly inadequate, since the electric drive motor requires much power to be an effective source of resistance. Also, such a configuration is very complicated and prone to failure due to the fact that rotational force supplied by the motor must be coupled through a clutch mechanism to be used to resist the input of the user. There have been attempts to vary the resistance applied to counteract the user applied resistance over the exercise range of motion. These attempts are generally inadequate because, for example, they typically resist the force applied by the user in one direction only. For example, in the case of the biceps curl these devices resist the user-applied force only in the upstroke, or the power stroke of the biceps group, of the exercise's range of motion. However, to maximize the exercise performed during a particular range of motion, such as the biceps curl exercise, it is desirable that the user-applied force is also resisted during the downstroke, or triceps muscle group power stroke.

Conventionally, the construction of a device capable of resisting the user-applied force, in both the upstroke and downstroke, of the biceps/triceps exercise range of motion, requires a very complicated and very expensive device. In addition, prior attempts to provide such an exercise apparatus failed to take into account the fact that, for example, the biceps group has a much stronger power stroke relative to the triceps group, resulting in inadequately designed devices.

SUMMARY OF THE INVENTION

The present invention is intended to alleviate the many drawbacks of the conventional exercise devices. An object of this invention is to provide a multi-configurable, multi-programable exercise device which may be used in a variety of exercise modes to provide a resistive force to a user-applied force during a range of motion of a particular exercise.

Another object of this invention is to provide a multi-programable exercise device which may function to provide isometric, isotonic, isokinetic, and cardiovascular exercise selectively.

A further object of this invention is to provide an exercise device having a variable resistance means which variably resists user-applied force in two-directions so that the user can concurrently exercise at least two muscle groups.

Still another object of the present invention is to provide an exercise device which can cumulatively store and display a user's performance during a particular workout session, or a series of workout sessions. Further, the inventive exercise device can be programmed to automatically increase the intensity of a workout in corresponding relationship with a user's increasingly enhanced fitness level. Also, the present invention is designed to cumulatively store individual fitness data for a variety of users, such data being accessible selectively by the particular user.

To accomplish the above recited objects, in a preferred embodiment of the present invention, a variable resistance means resists a user-supplied force in one rotational direction only. A gear and clutch system translates a reciprocating user-supplied force, corresponding to a reciprocating range of motion, into the one rotational direction.

In accordance with the present invention, a variable resistance apparatus provides a variable resistance against a rotationally applied force. A rotatable member is rotatable in response to a rotationally applied force to be resisted. A first electrode surface is rotatable with the first rotatable member, and a second electrode surface is disposed relative to the first electrode surface to define a gap therebetween. In accordance with one embodiment of the invention, an electro-theological (ER) fluid is disposed in the gap. An electrical generator is rotatable with the rotatable member for generating an electric potential. The electric potential is applied from the electric generator as a first polarity to the first electrode surface and as a second polarity to the second electrode surface. The applied electric potential imparts shear resistance to the ER fluid, which creates a resistance which must be overcome by a shear stress applied by the rotatable member. Thus, by varying the applied potential, the amount of shear stress necessary for the rotatable member to rotate is varied, thereby providing a variable resistance exercise apparatus.

Containing means contains the ER fluid. A shaft member passes through a through-hole in the containing means and is connected with the rotatable member. The shaft member is rotated by a user applied force, which in turn causes the rotatable member to rotate against the variable resistance. An external power source may provide electrical power to supplement the electrical power generated by the electrical generator, and an energy storage device, such as a battery or capacitor, may be used to store at least some of the electrical power generated by the electrical generator.

In order to appropriately control the amount of resistance, detecting means can detect a rotational speed of the rotatable member, an electrical power output of the electrical generator, a rotational speed of the electrical generator and/or an applied force. The detecting means produces a detection signal, which is received by controlling means for controlling the applied potential depending on the detection signal.

In accordance with the present invention, one-way rotating means receives a first linearly applied force having a first linear direction and a second linearly applied force having a second linear direction. The one-way rotating means applies the first and the second linearly applied force to the shaft member as only a one-way drive direction. The first and the second linearly applied forces thus causes the rotatable member to rotate in only one rotating direction. The one-way rotating means comprises a shaft member, a first rotatable body, such as a gear, roller, pulley, or the like, for rotating the shaft member and having means, such as a one-way clutch mechanism, for rotating the shaft member in the one-way rotating direction only. A second rotatable body, such as a gear, rotates the shaft member and has means, such as a one-way clutch mechanism for rotating the shaft member in the same one-way rotating direction.

The electrical generator may comprise a generator shaft rotatable by the rotationally applied force and a magnet and wire coil system. Either the magnet or the wire coil are rotatable by the generator shaft relative to the other so as to produce magnetic field lines moving relative to a wire coil to thereby generate the electric power.

In accordance with one aspect of the present invention, the rotatable member comprises a plurality of plate members each comprising a respective portion of the first electrode surface. In this case, the second electrode surface is configured so as to dispose a portion of the second electrode surface facing a respective portion of the first electrode surface and define a respective gap therebetween.

A non-varied applied constant resistance can be provided which is supplemented by the resistance produced by the variable resistance apparatus to resist the rotationally applied force. In accordance with one embodiment, a friction member is in contact with at least one friction surface. The applied constant resistance is adjusted by adjusting at least one of the contact area and the contact pressure between the friction member and the friction surface. In accordance with another embodiment, a friction band is used, an in another embodiment, a weight stack is used to apply the constant resistance.

In accordance with another aspect of the present invention, a magnetic particle clutch is used to provide a variable resistance to resist the one-way rotation force. In this case, a rotating plate member is rotatable by the input shaft. The rotating plate member is surrounded by a magnetically reactive fluid (which may contain fine metal powder or finely sized magnetic particulates, micro encapsulated and disposed in a lubricating carrier fluid). An electromagnet applies a variable magnetic field, which causes the magnetically reactive particulates to align along the magnetic field lines, thereby imparting a resistance to the rotation of the rotating plate member.

A configuration of the present invention includes sealing means provided for preventing the ER fluid from leaking out from between the gap. A pair of protruding lip portions disposed on the rotatable member are received in receiving grooves disposed in the interior wall surfaces of the containing means. As the rotatable member is rotated, there would be a tendency for the ER fluid to leak out through the containing means through, for example, the through-holes through which the shaft passes. Also, contaminates such as dust and moisture, may infiltrate the ER fluid through the through-holes in the containing means. In addition, depending on the ER fluid used, the moisture content of the ER fluid is crucial. To combat the contamination, loss of moisture and leaking of the ER fluid, the sealing means is provided. Confining means is provided for confining the ER fluid, and preventing the ER fluid from leaking out of the containing means. A first confining electrode receives electric potential as a first polarity, and a second confining electrode receives electric potential as a second polarity. The second confining electrode is disposed facing the first confining electrode and defines a confining gap there between. Thus, when the electric potential is applied to the confining electrodes, the confining means gels and confines the ER fluid that is disposed in the confining gap.

In accordance with the present invention the rotatable member is rotated via a magnetic coupling. A first magnetic member is contained in the interior of the containing means and is connected with the rotatable member. A second magnetic member is disposed adjacent to the containing means and magnetically coupled with the first magnetic member. The second magnetic member is rotationally driven by the rotationally applied force, so that the rotationally applied force rotates the rotatable member through the magnetic coupling between the first magnetic member and tile second magnetic member.

In accordance with the present invention, a method of producing the component parts having excellent tolerances and consistencies between individual pieces of different units is provided. In accordance with the inventive method, a plastic, or other suitable material, is coated at areas to become electrode surfaces with a sensitizing solution. Electroplating deposits a conductive film directly on the substrate at appropriate electrode locations. This method allows for the use of inexpensive injection molding techniques for producing the substrate, and relatively inexpensive electroplating techniques for depositing electrode surfaces only at selected locations.

In accordance with the present invention, an agitation mechanism is provided for quickly dispersing the ER particulates within the carrier fluid upon rotation of the rotatable member. The rotatable member has a shape which quickly disperses settled particles or floating particles into the carrier fluid by creating a turbulence upon rotation of the rotatable member. Thus, upon rotation of the rotatable member, the turbulence created by the geometry of the rotatable member causes the settled or floating particles to become suspended particles within the carrier fluid.

To vary the amount of resistance during the exercise stroke, in accordance with the present invention, a lever is provided which can be activated by the user to control the resistance applied by the variable resistance means, or to control the constantly applied resistance.

In accordance with another embodiment of the inventive variable resistance means, a piston is provided within a hollow cylinder. The piston and cylinder are moveable relative to each other. A gap is defined between the peripheral surface of the piston and the interior walls of the cylinder. An ER fluid or magnetically reactive fluid is disposed within this gap. The surface of the piston has a first electrode surface disposed thereon, while the surface of the interior of the hollow cylinder has a second electrode surface formed thereon. Thus, a potential is applied across the ER fluid by applying opposite polarities to the first electrode surface and second electrode surface. The movement of the piston relative to the cylinder is variably resisted in proportion to the amount of potential applied via the electrode surfaces. Thus, a linear displacement applied, for example, to the piston shaft, can be variably resisted to variably resist a user supplied force. The piston and cylinder system may include self-contained collapsible bellows for fully containing the ER fluid, thereby increasing the ease of manufacture, durability and effectiveness of the variable resistance means.

An ER fluid valve for controlling the ER fluid flow between a top bellows and a bottom bellows includes a series of valve plate members provide a great increase in electrode surface area to thereby more effectively resist the ER fluid flowing through the ER fluid valve. The adjacent plates are alternately applied with opposite potentials so that between any two facing plates a potential can be applied through the ER fluid disposed therein. In another embodiment of the electrode of the inventive ER fluid valve a stack of mesh electrodes are alternately applied with opposite polarity. The ER fluid flow through the stack of mesh electrodes is variably controlled by controlling the potential applied to the mesh electrodes. Also, by selectively applying the polarity between non-adjacent mesh electrode, the gap between which the potential field must be applied can be selected.

Another configuration for applying the constantly applied resistance includes a weight stack, such as that commonly used with a Universal ™ or Nautilus ™ type gym equipment, to select a constant resistance level. A chain, cable, or other force transferring means is fixed to the weight stack and the amount of weight lifted depends on the placement of the key within the plurality of holes. In this case, the static weight of the selected weight stack is supplemented variably and continuously along the exercise range of motion by the variable resistance means.

Another configuration of the inventive exercise device is configured to replicate the exercise of cross country skiing. A frame supports guide rollers which in turn slidably support two skis. These skis drive respective drive rollers, as the user causes the skis to slide. As the user replicates the cross country ski motion, the skis rotate the drive rollers, which in turn rotate a shaft through a one-way clutch mechanism. The shaft in turn rotates a flywheel which has a friction band in contact with its peripheral surface. In accordance with the present invention, a variable resistance means is rotatably driven through a drive pulley and drive belt system (or may be directly driven by the shaft and/or flywheel). The drive pulley is fixed to the shaft and rotates therewith. The drive belt is thus driven by the pulley which drives the shaft of the variably resistance means. By controlling the resistance available through the variable resistance means, the resistance experienced by the user when performing the cross country skiing exercise is appropriately varied. The variable resistance means may fixed to the flywheel, which rotates freely on the shaft. The rotation of the variable resistance means is coupled with the rotation of the shaft so that the variable resistance means couples the rotation of the shaft to the rotation of the flywheel in a variable manner. Thus, the friction band on the flywheel perimeter acts as a resistance amplifier to the resistance applied through the variable resistance means.

Another embodiment of the present invention provides an easy to manufacture variable resistance means, which does not require many expensive and laborious time consuming machining operations. A stack is made of conductive disks is disposed between separately controllable sections. A series of non-conductive bearings are disposed in bearing grooves to maintain the gap distance between the disks and sections to within a high tolerance. The total resistance applied by the stack by controlling the applied voltage and/or controlling the separate disk/section units (i.e., the number of units having applied voltage and/or amount of applied voltage to individually controlled units). Also, the disk/section units can be added or deleted from the assembled stack depending on the application and the anticipated resistance it requires. The assembled stack can be made by assembling disk and section units, wherein at least one of the disk and the section units can be formed by a more efficient metal stamping operation, rather than the injection molding and electroplating process of the inventive method described above. In this case, for example, the disk can be formed simply by stamping an appropriate disk 160 shape from a sheet of sheet metal. The sections can be formed by a machining process, or by the injection molding and electroplating process. Ridges in the sections are masked so that electrodes are planer and parallel. The ER fluid acts as a lubricant between the disk and the ridges. The stacking system allows for constant voltage (i.e., a simple power supply) to be used. By applying a constant voltage, while controlling the number of sections and/or disks having the potential applied thereto, the overall total resistance available through the assembled stack can be appropriately controlled. Thus, if a greater resistance is required, a larger number of disk/section units have voltage applied thereto to increase the resistance. If less resistance is required, fewer disk/section units the potential applied. The units not having the potential applied do not add any resistance to the assembled stack, since the ER fluid disposed within the gap of these units is not caused to gel.

BRIEF DESCRIPTION OF THE DRAWINGS

FIG. 9(a) is a sectional perspective view showing yet another embodiment of the variable resistance means;

FIG. 9(b) is a perspective view of still another embodiment of the variable resistance means;

FIG. 10(a) is a perspective view of still another embodiment of the variable resistance means;

FIG. 10(b) is a side view of the variable resistance means shown in FIG. 10(a);

FIG. 11(c) is a schematic circuit diagram of the circuit shown in FIG. 11(b);

FIG. 13(a) is a cross sectional view showing yet another configuration of the inventive variable resistance apparatus;

FIG. 13(b) is a cross sectional view showing still another configuration of the inventive variable resistance apparatus;

FIG. 14(a) is a view showing a configuration of the inventive variable resistance apparatus showing non-aligned particulate;

FIG. 14(b) is a cross sectional view showing the configuration of the inventive variable resistance apparatus shown in FIG. 14(a) showing aligned particulate;

FIG. 21 is a cut-away sectional view showing the structure of the an embodiment of the inventive resistance apparatus, in accordance with an inventive method for manufacturing the resistance apparatus;

FIG. 22(a) is an isolated perspective view of an injection molded substrate in accordance with the inventive method for manufacturing a resistance apparatus;

FIG. 22(b) is a view showing the substrate shown in FIG. 22(a) dipped in a sensitizing solution;

FIG. 22(c) is a view showing the sensitized substrate shown in FIG. 22(b) being electroplated;

FIG. 23(a) is a view showing another configuration of the inventive resistance apparatus having particulate agitation means;

FIG. 23(b) is a cut-away sectional enlarged view of the particulate agitation means shown in FIG. 23(a);

FIG. 23(c) is a cut-away sectional enlarged view of the particulate agitation means shown in FIG. 23(b), shown agitating settled particulates of the ER fluid;

FIG. 24 is still another configuration of the inventive resistance apparatus, showing user variable friction resistance applying means;

FIG. 25(a) is a perspective view of an alternative configuration of the inventive resistance apparatus configured as a piston and cylinder system having a single input shaft;

FIG. 25(b) is a perspective view of the alternative configuration of the inventive resistance apparatus configured as a piston and cylinder system having two input shafts;

FIG. 26(a) is a perspective view of a configuration of the confining means in accordance with the inventive resistance apparatus configured as a piston and cylinder system;

FIG. 26(b) is an enlarged cross sectional view of the confining means shown in FIG. 26(a), in the state where the ER fluid does not have a potential applied;

FIG. 26(c) is a cross sectional view of the confining means shown in FIG. 26(a), in the state when the potential is applied across the ER fluid and disposed within the confining means;

FIG. 27(a) is a plan view of another configuration of the inventive resistance apparatus, configured as a double piston within a cylinder system;

FIG. 27(b) is a plan view of the configuration of the inventive resistance apparatus shown in FIG. 27(a), having a potential applied at an ER valve;

FIG. 31(a) is cross section of another configuration of the inventive resistance apparatus configured as a piston within a cylinder, and showing the ER fluid confined within containing bellows;

FIG. 31(b) is a sectional view of the embodiment shown in FIG. 31(a), showing the relative displacement when a linear force is applied to the piston;

FIG. 31(c) is a view showing the embodiment shown in FIG. 31(a), showing the exterior of the cylinder;

FIG. 32(a) is a schematic representation of the inventive variable resistance apparatus configured with a weight stack;

FIG. 32(b) is an isolated side view of the inventive variable resistance apparatus having its shaft fixed with a cam;

FIG. 33(a) is a side view of an alternate configuration of the inventive exercise device configured as a cross country skier exerciser;

FIG. 33(b) is a side view of the configuration shown in FIG. 33(a), showing essential elements of the cross country skier exerciser;

FIG. 33(c) is a top plan view of the essential elements of the cross country skier exerciser shown in FIG. 33(b);

FIG. 33(d) is an isolated view of the inventive variable resistance apparatus configured with a amplifying resistance source;

FIG. 37 is an enlarged isolated view of a shaft and sealing cap in accordance with the assembled stack shown in FIG. 34;

FIG. 38(a) is a cross sectional perspective view of an easy to manufacture assembled stack;

FIG. 38(b) shows a cross section side view of an assembled section/disk unit and a top plan view of a section in accordance with the assembled stack shown in FIG. 38(a);

FIG. 39(a) shows an alternative configuration of the inventive exercise device, wherein a reciprocating exercise motion is resisted;

FIG. 39(b) shows another alternative configuration of the inventive exercise device, wherein a single directional exercise motion is resisted;

FIG. 39(c) shows the configuration shown in FIG. 39(b) reconfigured as a rowing machine;

BEST MODES FOR CARRYING OUT THE INVENTION

Figure 1A:
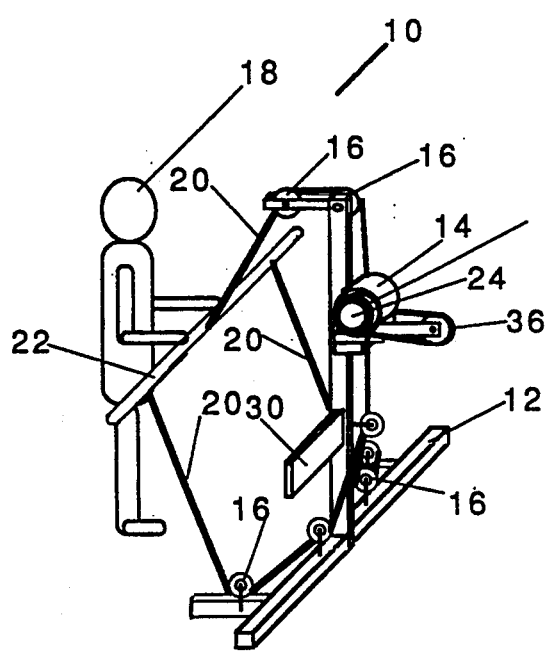
FIG. 1(a) is a perspective view of a preferred embodiment of the inventive exercise device configured in a biceps and triceps exercise mode.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Figure 1B:
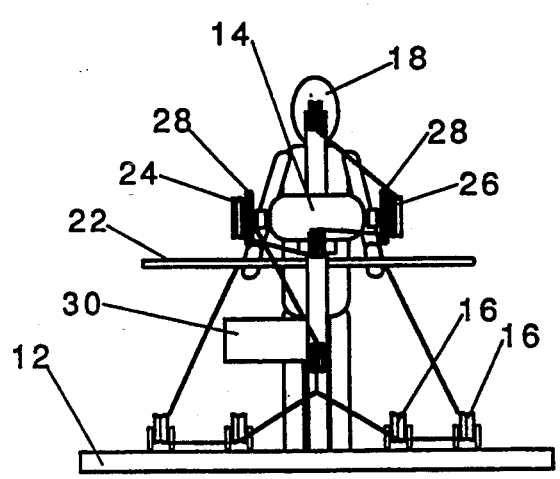
FIG. 1(b) is a front view of the embodiment shown in FIG. 1(a)

Referring to FIGS. 1(a) and 1(b), an embodiment of the inventive exercise device 10 is shown. In this embodiment, the inventive exercise device 10 includes a frame 12 which supports a variable resistance means 14 and force-transmission guides, such as pulleys 16 or the like. A user 18, is shown exercising the biceps and triceps groups of his upper arms. A force exerted by the user 18 is transferred through force transfer means, such as cables 20 or the like, and the force is supplied to the variable resistance means 14 which applies a counteractive resistance force. In this configuration of the inventive exercise device 10, the user grips a bar 22 and exerts a motion replicating a free-weight curl exercise and a triceps pull down exercise. The force exerted by the user 18 during these motions is transferred via the cables 20 to the variable resistance means 14 through the interaction of the cables 20 and gears 24 and 26 of the variable resistance means 14. The gears 24,26 may be tooth gears (in which case, at least a portion of the force transfer means is a link chain), rollers, pulleys, or the like. As shown more clearly in FIG. 1(b), the cables 20 guided by the pulleys 16 located towards the bottom of the frame 12 act to rotate the gears 24 and 26 in a particular rotational direction. The force exerted by the user 18 is thus transmitted to the variable resistance means 14 in the form of a rotational force. In this instance, the user 18 pulls up on the bar 22 such as to replicate the free-weight biceps curling exercise, the cables 20 which are extending from the bottom of the frame 12 will cause the gear 24 to rotate in a clockwise direction. In a similar manner, when the user 18 pulls down on the of the user 18 as a rotational force to the variable resistance means 14 via the gear 26.

In this configuration, the gear 24 and the gear 26 both rotate in the clockwise direction in response to the user-supplied force. In other words, when either the motion replicating biceps curling or the motion replicating triceps pull-down is performed by the user 18, the force exerted by the user 18 is transmitted to the variable resistance means 14 as a rotational force having a clockwise direction. Thus, the variable resistance means 14 resists the force of the user 18 by applying a counteracting resistance to rotation of the respective gears 24 and 26. This counter-acting resisting force need be applied in only one rotational direction. The gears 24 and 26 are both driven in the same rotational direction, shown as clockwise, in response to either the upstroke, or biceps curling motion, or the downstroke, or triceps pull-down motion, performed by the user 18. This feature allows the effective use of flywheels 28 associated with the respective gears 24 and 26 to provide a consistent and even movement along the range of motion. In addition, the user can constantly be apprised of his workout status by the display 30 and also can input programming characteristics through the keyboard 30'.

Figure 2A:
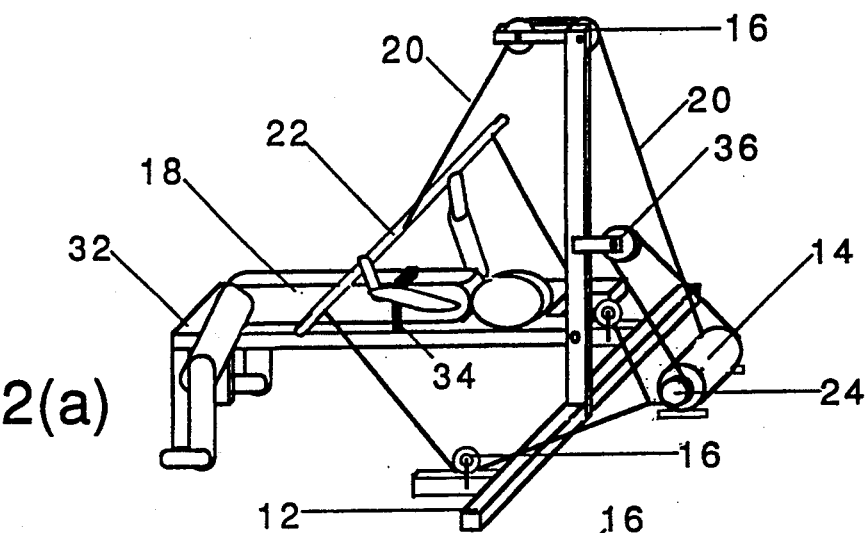
FIG. 2(a) is a perspective view of the embodiment shown in FIG. 1(a), configured in a bench press mode.

FIGS. 2(a) through 2(g) show the inventive exercise device 10 in various configurations to accomplish a variety of exercise modes. Referring to FIG. 2(a), a configuration of the inventive apparatus 10 for bench press and reverse bench press mode is shown. In this configuration, the variable resistance means 14 may be placed in an alternative position relative to the frame 12. Also, the user may be strapped in and restrained to the bench 32 by a belt 34. Thus, the belt 34 allows the user 18 to accomplish the reverse bench press exercise.

Figure 2B:
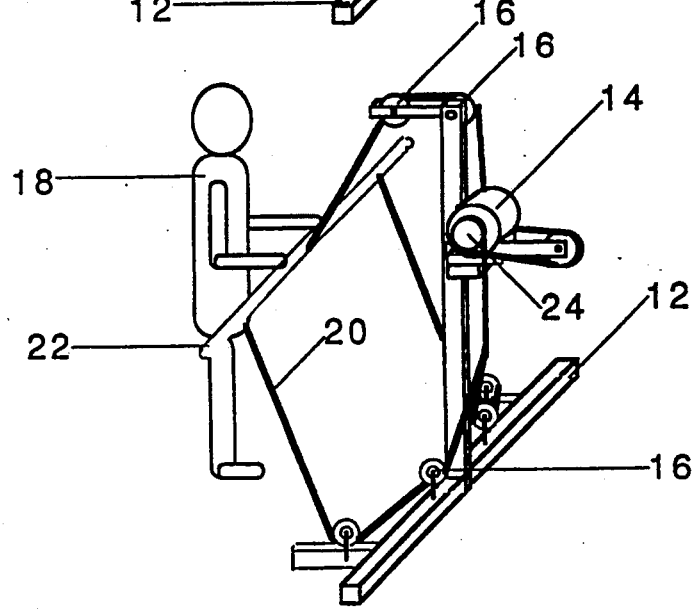
FIG. 2(b) is a perspective view of the embodiment shown in FIG. 1(a), configured in a biceps and triceps exercise mode.

FIG. 2(b) shows the inventive exercise device 10 configured in a biceps and triceps exercise mode and has been described with reference to FIGS. 1(a) and 1(b).

Figure 2C:
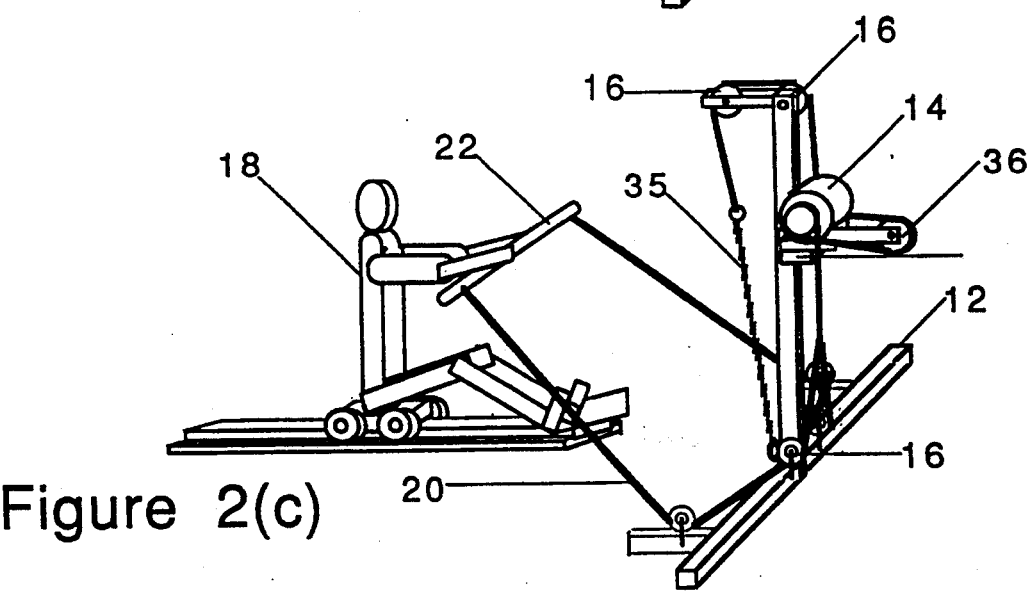
FIG. 2(c) is a perspective view of the embodiment shown in FIG. 1(a), configured in a rowing exercise mode and showing a reciprocating force applying spring member.

FIG. 2(c) shows the inventive exercise device 10 configured for use as a rowing machine exercise. In this configuration, the cables 20 reciprocates back and forth. Resistance is applied by the variable resistance means 14 during a power stroke and the cable 20 is retrieved during the forward or non-load stroke of the rowing exercise. Stated otherwise, in order for the user 18 to apply a force to the inventive exercise device 10 during the rowing or power stroke of the exercise, it is necessary that during a forward stroke, or non-load stroke, the cables 20 are returned to an initial position. To accomplish this, a spring member 35 retracts the cable 20 during the forward stroke and is stretched during the power stroke. The spring member 35 may be used with other configurations to return an element, such as the bar 22, from the end of the exercise stroke to a position at the beginning of the exercise stroke. The spring member 35 may be, for example, a coil spring, air spring, rubber band, and the like.

Figure 2E:
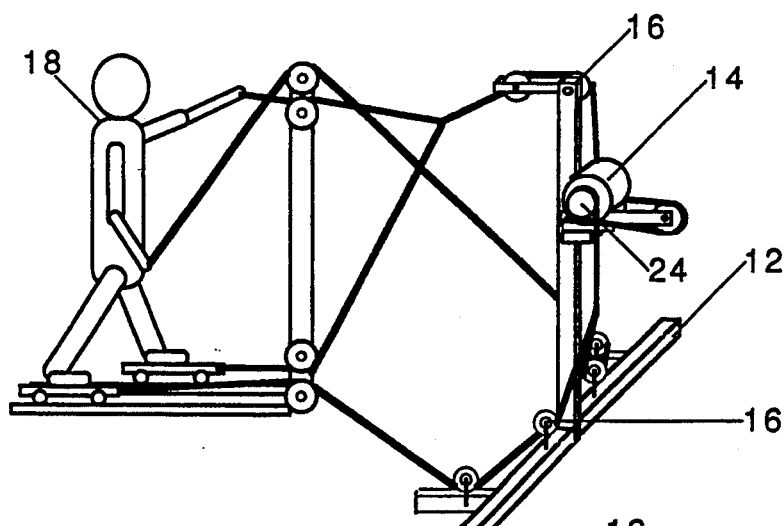
FIG. 2(e) is a perspective view of the embodiment shown in FIG. 1(a), configured in a cross country skier mode.
Figure 2F:
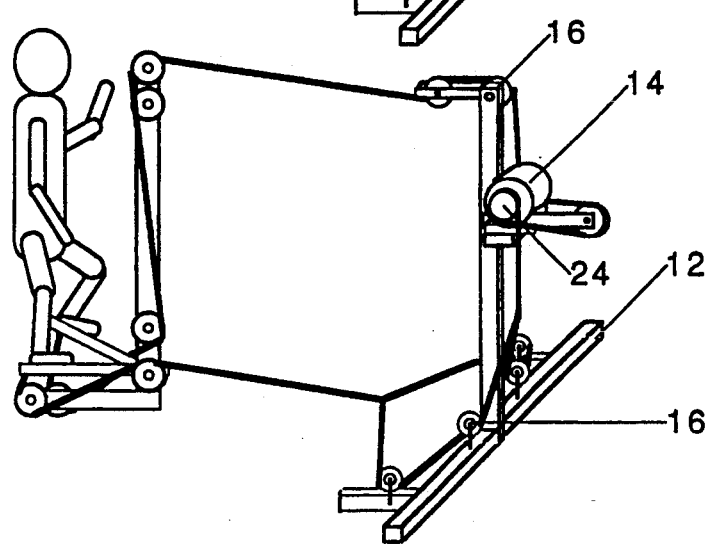
FIG. 2(f) is a perspective view of the embodiment shown in FIG. 1(a), configured in a stepper exercise mode.
Figure 2G:
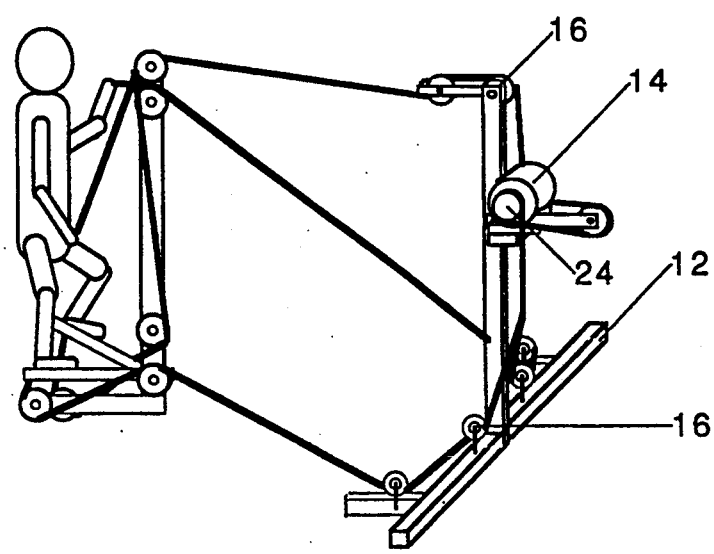
FIG. 2(g) is a perspective view of the embodiment shown in FIG. 1(a), configured in a modified stepper exercise mode.
Figure 2D:
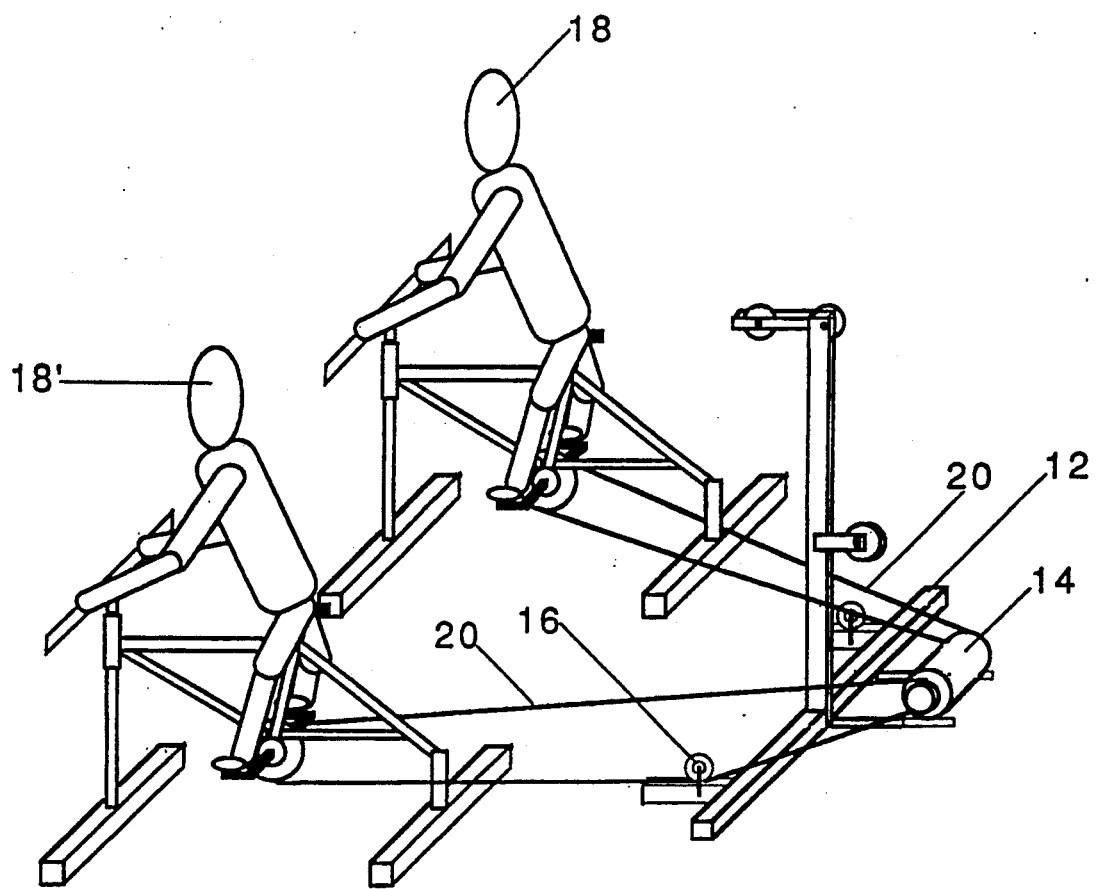
FIG. 2(d) is a perspective view of the embodiment shown in FIG. 1(a), configured in a dual exercise bicycle mode.

FIG. 2(d) shows the inventive exercise device 10 in a stationary bicycle mode configuration. In this configuration, it is possible for two users 18 and 18' to both use a single variable resistance means 14.

FIG. 2(e) shows the inventive exercise device 10 in a cross country skier configuration. In this configuration, both the arms, upper body and the legs of the user are exercised simultaneously to provide an excellent cardiovascular and muscle toning workout.

FIG. 2(f) shows the inventive exercise device 10 in a stepper configuration. In this configuration, the legs of the user are exercised in a workout simulating walking up steps.

FIG. 2(g) shows the inventive exercise device 10 configured in a combination stepper and upper body exercise mode. In this configuration, as with the cross country skier configuration, both the arms, upper body and the legs of the user are exercised simultaneously to provide an excellent cardiovascular and muscle toning workout.

Figure 3:
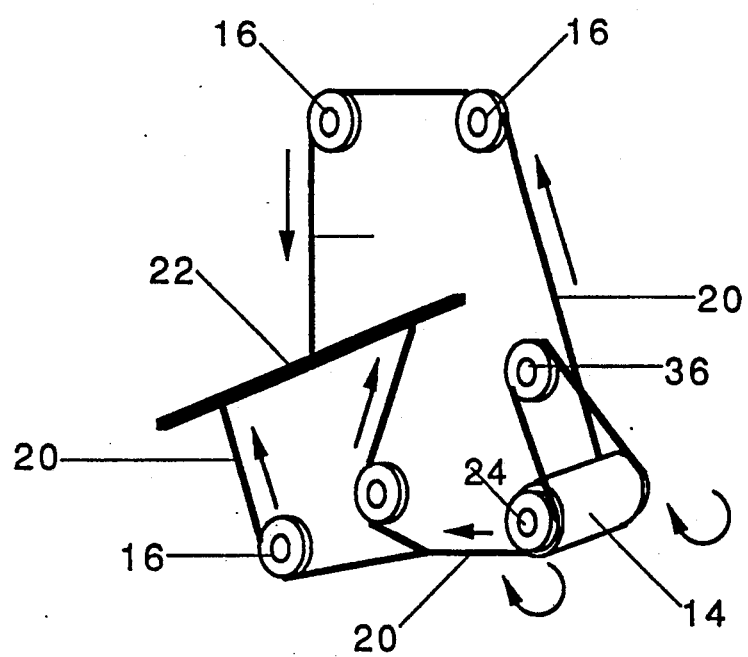
FIG. 3 is an isolated perspective view of the force applying and force resisting means of the inventive exercise device.
Figure 41A:
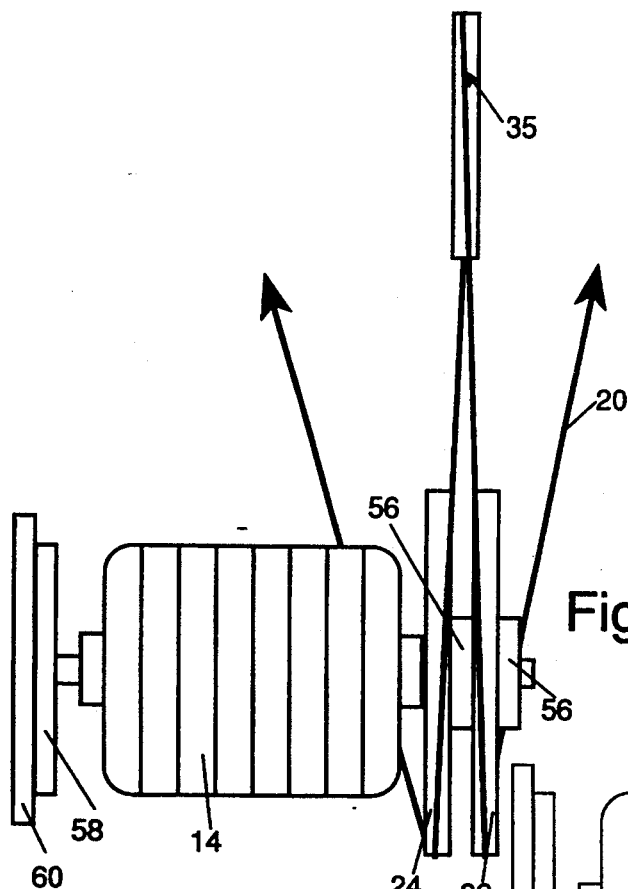
FIG. 41(a) shows an isolated view of the variable resisting means.
Figure 41B:
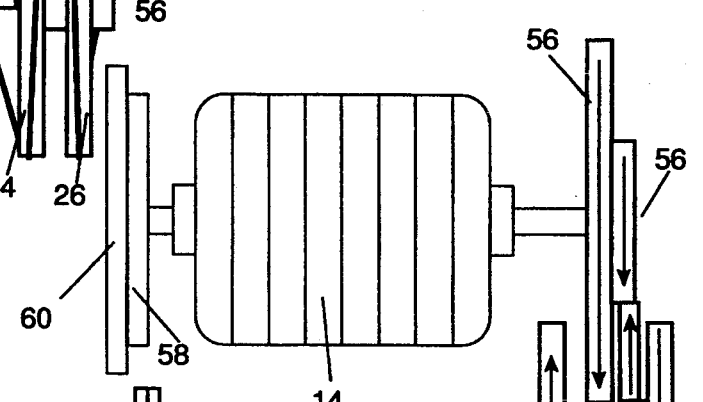
FIG. 41(b) shows an isolated view of the variable resisting means showing a direct drive gear train.
Figure 41C:
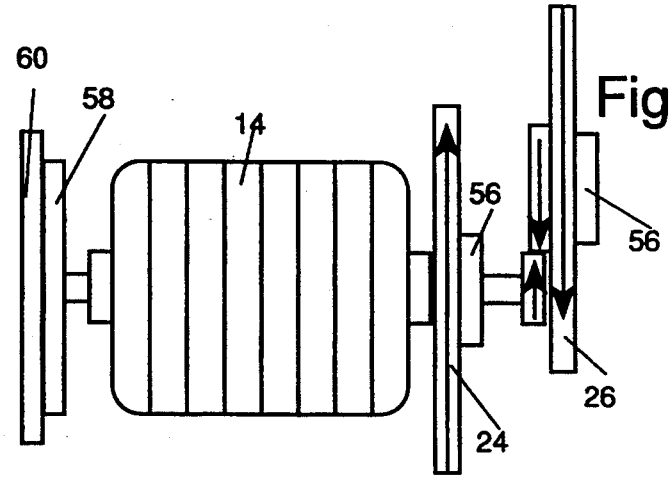
FIG. 41(c) shows an isolated view of the variable resisting means showing a direct drive gear train.

FIG. 3 is an isolated view of the inventive exercise device 10. The curved arrows indicate the rotational direction of the gears 24 and 26 and show the rotational direction as a clockwise direction. The straight arrows show the direction of the user applied force applied to the cables 20. As shown in FIG. 3, the user applied force is a reciprocating force in a substantially up and down directional motion. The pulleys 16 direct the cables 20 so that the substantially linearly supplied force from the user 18 is transmitted to the variable resistance means 14 as a rotational force inputted through the gears 24 and 26. To counteract the user applied force, the variable resistance means 14 supplies a variable resistance in response to the inputted force which acts to inhibit the motion of the user 18 thus resulting in the muscular strain associated with the exercise. As can be seen in this Figure, a directional pulley 36 is located at a point along the path of the cable 20 between where the cable 20 applies its rotational force to gear 24 and rotational force to gear 26. The directional pulley 36 acts to redirect the cable 20 between the gears 24 and 26 so that force in a single rotational direction, in this case a clockwise direction, is inputted to the variable resistance means 14. Rather than pulley, an appropriate gear train can be employed, as shown in FIGS. 41(a)–41(c).

Stated otherwise, the user 18 supplies a reciprocating force, in this configuration in an up direction and in a down direction, but the variable resistance means 14 experiences this reciprocating force as a single-directional rotational force. By this construction, a multi-configurable exercise device is provided optimally configured to counteract the natural range of motion of at least two muscle groups of a user 18, with only a single resistance means 14. In addition, the present invention allows for a smooth resistance to be applied to counteract the user's applied force, which is the most preferred way of reducing any unnecessary shocks to the user's body.

The inventive exercise device 10, allows for a multitude of exercise modes and a variety of exercise programs. For example, the inventive exercise device 10 may be used to provide an isotonic mode of exercise, in which the applied resistance from the variable resistance means 14 is a non-varying counteracting force to the user applied force. Further, the inventive exercise device 10 can be programmed to provide an isokinetic exercise mode, in which case, the applied resistance by the variable resistance means 14 may vary along the range of motion of the particular exercise. Also, the inventive exercise device 10 can provide cardiovascular exercise, in which case the resistance applied by the variable resistance means 14 varies along the range of motion, but the speed associated with the range of motion remains constant.

Figure 4A:
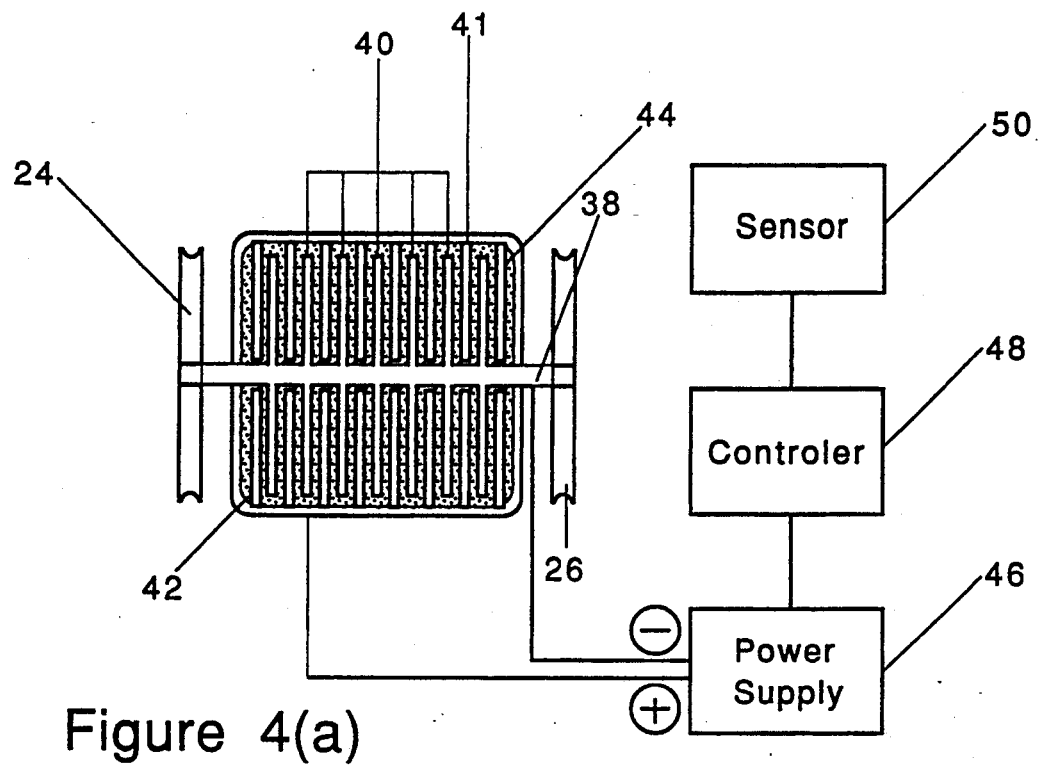
FIG. 4(a) is a cross sectional view of one embodiment of a variable resistance means.
Figure 4B:
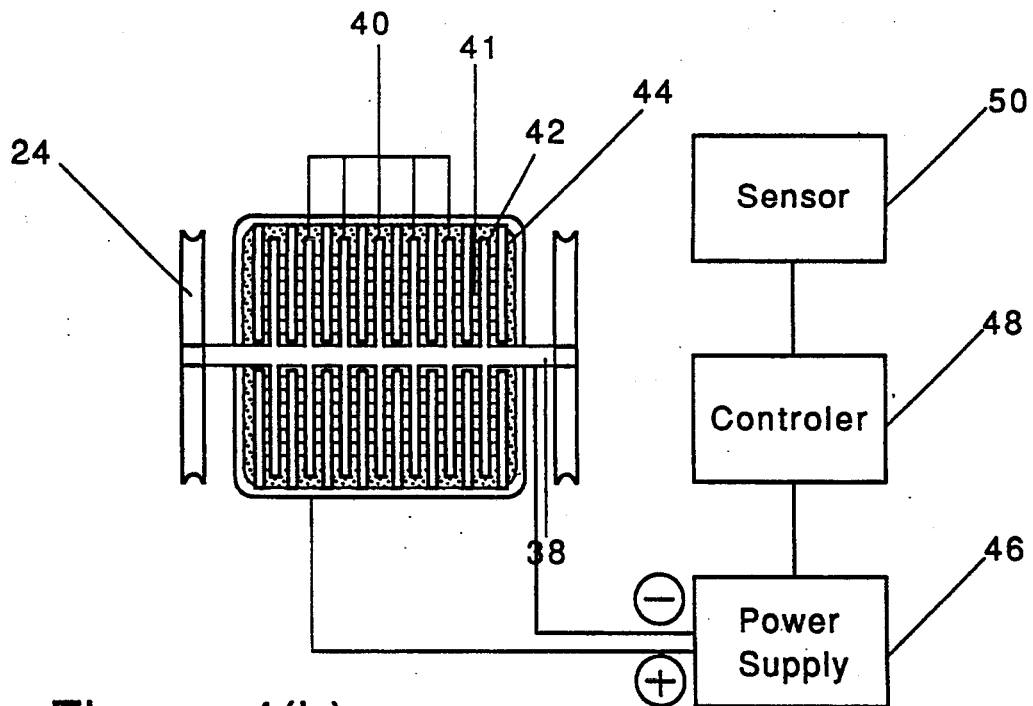
FIG. 4(b) is a cross sectional view of the embodiment of the variable resistance means shown in FIG. 4(a) showing the alignment of particles.

FIG. 4(a) and FIG. 4(b) are sectional views of the variable resistance means 14. The variable resistance means is comprised of the gear 24 and the gear 26 which input rotational force through a shaft 38. The shaft 38 provides rotation to a plurality of plates 40. These plates 40 are surrounded by a force resisting fluid 41, such as an electro-theological fluid, fine metallic powder, or a fluid having finely sized ferrous metal particles dispersed in it. This force resisting fluid 41 may be a variable viscosity fluid which varies in viscosity depending on, for example, an applied electrical potential or magnetic field.

An example of an electro-rheological (ER) fluid is produced by the LORD ® corporation of Cary, N.C., under the trademark VersaFlo ™. The flow characteristics of the ER fluid changes when an electrical field is applied through it. The ER fluid responds to the applied electrical potential by what can be described as progressively gelling in proportion to the applied field strength. More specifically, ER fluid is generally comprised of a carrier fluid, such as a silicone oil, mineral oil, or chlorinated paraffin. Fine particles, such as polymers, minerals, or ceramics, are suspended in the carrier fluid. When an electrical field is applied through the ER fluid, positive and negative charges on the particles separate, thus giving each particle a positive end and a negative end. The suspended particles are attracted to each other and form chains. These chains of particles cause the ER fluid to "gel" in proportion to the applied potential. Thus, the viscosity of the ER fluid is varied. An illustrative example of an ER fluid has a dynamic yield stress of 140 Pa and viscosity of 195 mPa-s when no electric potential is applied. When an electric field of 4.0 kV/mm is applied, the dynamic yield stress may become 950 Pa while the viscosity becomes 110 mPa-s.

As shown in FIGS. 4(a) and 4(b), an electric potential is applied through the ER fluid 41 between electrodes 42 and 44. One electrode 42, which is formed on or comprises plates 40, is rotatably driven by the shaft 38. In this configuration, the other electrode 44 comprises a plurality members disposed between the plates 40. For the typical ER fluid described, the power supply 46 may thus have a range from 0 through >4.0 kV and is appropriately regulated by the controller 48. The range of the power supply 46 will depend on the properties of a particular ER fluid being used.

In the case of ferrous metal particles, the particles may be suspended in a carrier fluid, such as an oil. Alternatively, the particles may be present in a dry, pure form. In this case, the variable resistance means 14 consists of a magnetic particle brake that uses fine, dry, stainless steel powder (SSP). SSP is free-flowing until a magnetic field is applied to it. When a magnetic field is applied, the particles form chains along the magnetic field lines. These chains resist a shearing force. The ability to resist a shearing force is proportional to the strength of the applied magnetic field. The electrodes 44 may thus be exchanged for one or more torodial shaped magnetic coils effective to create the magnetic field. A configuration of the invention using magnetic particles is described below with reference to FIG. 15.

Referring again to FIGS. 4(a) and 4(b), on either side of the plurality of plates 40 is an electrode 44. As shown, the electrode 44 is supplied with a positive charge from a power supply 46 and the other electrode 42 (i.e., plates 40) is supplied with a negative charge from the power supply 46. In the embodiment shown, the electrode 42 is applied with potential through the shaft 38, such as via brushes. The power supply 46 is regulated by a controller 48 which receives input signals from a sensor 50. The sensor 50 is designed to sense such things as the user applied force, the speed of the exercise motion, or the like. From the data sensed by the sensor 50, the controller 48 (which may include a microprocessor CPU) generates a correct value for the electrical force that is generated by the power supply 46 during a given period of time. When finely sized metal particles, or SSP, are used, the electrodes 42 and 44 are replaced by a magnetic field generating coil (shown in FIG. 15) to apply a magnetic field to the SSP.

As shown in FIG. 4(b), when a given potential is applied between the electrodes 44 and 42, the particles in the fluid 41 align as shown by the straight lines, and exert a resisting force on the plates 40. These aligned particles resist a shearing force, and the resistance is dependent primarily on the potential supplied to the electrodes 42 and 44 from the power supply 46. The ability to resist movement of the rotating plates is dependent on the strength of an electric field applied to the ER fluid. Stated otherwise, the stronger the potential applied to the electrode 42 and 44, the more force that must be applied to the aligned particles to shear the alignment. Thus, the aligned particles in the fluid 41 exert a resistance force on the plates 40 which are being rotationally driven by the shaft 38 which in turn is rotationally driven by the gears 24 and 26. By sensing the force resulting from the user applied force by the sensor 50, correct variable resistance is applied to the plates 40 ultimately to resist the force applied by the user 18. By providing an appropriate period of sampling, the variable resistance means 14 can resist the user applied force in a smooth and consistent manner. The rotational resisting configuration of the variable resistance means is particularly adaptable for resisting an exercise range of motion which occurs when the exercise device is configured as a treadmill, stationary bicycle, rower, or any other configuration that an utilize the ability to resist rotational force.

Figure 4C:
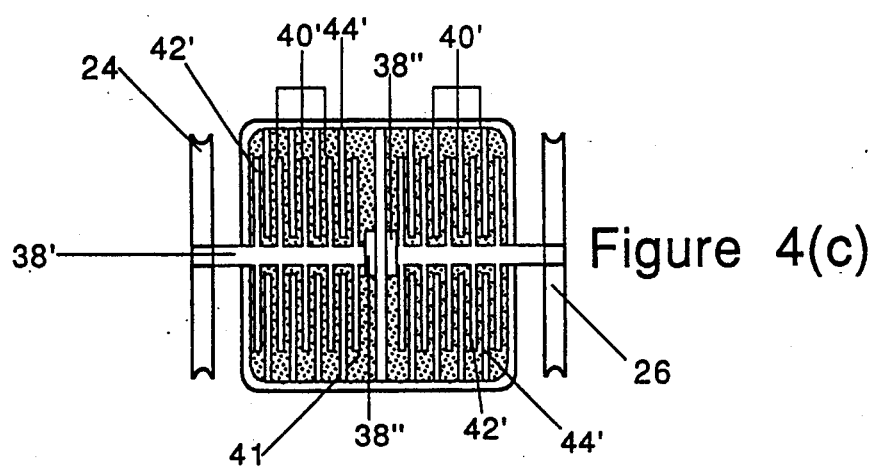
FIG. 4(c) is a cross sectional view of another embodiment of the variable resistance means, showing two separate input chambers.

Referring to FIG. 4(c), an alternative embodiment of the variable resistance means 14 is shown. In this embodiment, the interior of the variable resistance means 14 is separated into two independent sections. Each section has a corresponding set of plates 40' and electrodes 42' and 44'. In each self-contained section is a force resisting fluid 41 which reacts independently with the force resisting fluid 41 contained in the other section. Each section has associated with it a corresponding shaft 38' and a rotational shaft bearing 38". Thus, the rotational force exerted by each respective gear 24 and 26 is individually resisted by the alignment of the particles in the respective sections of the variable resistance means 14. In this way, the variable resistance means 14 is able to react independently to the range of motion of the user applied force that is applied to the variable resistance means 14 in either rotational direction.

Figure 5A:
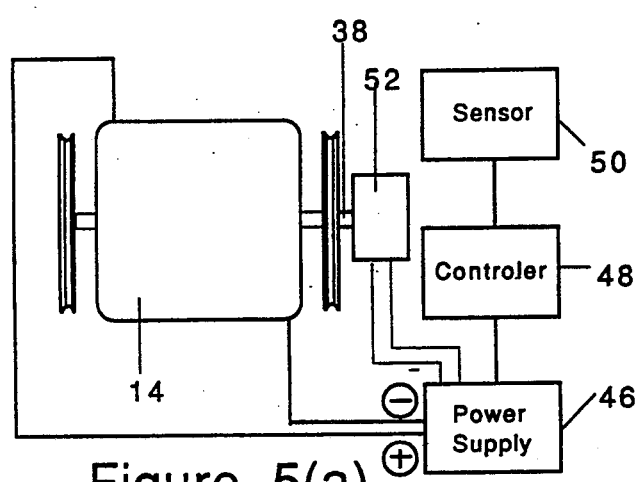
FIG. 5(a) is a plan view of another embodiment of the variable resistance means, showing a self-contained generator.
Figure 5B:
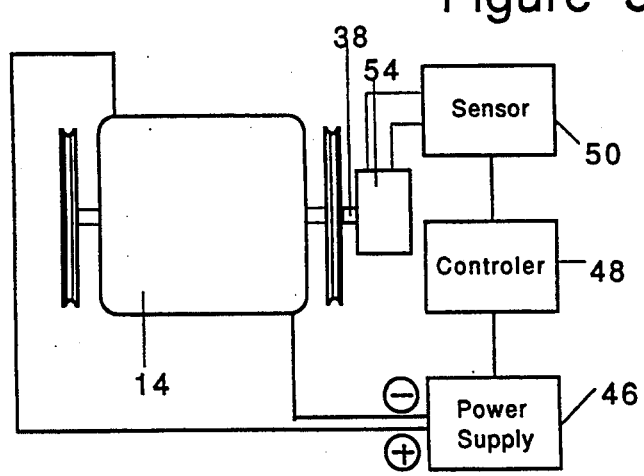
FIG. 5(b) is a plan view of yet another embodiment of the variable resistance means, showing self-contained sensing means.

FIGS. 5(a) and 5(b) show alternative configurations of the variable resistance means 14. In the configuration shown in FIG. 5(a), a generator 52 receives rotational force from the shaft 38 which is being driven by the user 18. This rotational force is converted to an electrical force by the generator 52 which also acts to provide some degree of resistance to the user applied force. Thus, by this configuration, the variable resistance means 14 comprises a closed loop system including its own self-contained energy means. Therefore, an external power supply may be supplemental, or is not necessary. This is particularly suited for use with electrorheological fluids, which drain much less power to develop a given resistance as compared with a magnetic particle brake system.

The configuration shown in FIG. 5(b) shows a rotational sensor 54 attached to the shaft 38. The rotational sensor 54 is adapted to sense such things as rotational force, speed, or the like. The data provided by the rotational sensor 54 is supplied to the sensor 50 to thereby control the controller 48, which in turn controls the power supply 46 to counteract the user applied force dependent on the particulars of the exercise programs selected.

The configurations shown in FIG. 5(a) and FIG. 5(b) can be combined so that the variable resistance means 14 comprises a self-contained unit including a sensing means (including sensor 50, rotational sensor 54) and a power generating means (including power supply 46 and generator 52). Alternatively, the sensor means can include means for sensing the force applied by the user and the speed of motion derived from sensors located along the path of the force transmission means or cables 20. This sensor may be, for example, a linear position sensor, linear velocity sensor, etc. Examples of linear, rotational and angular displacement, velocity, acceleration and force/weight sensors are produced by Lucas Schaevitz of Pennsauken, N.J.

Figure 6:
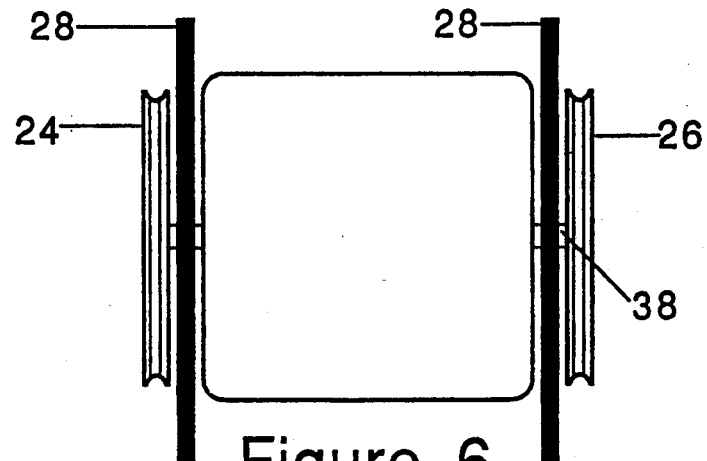
FIG. 6 is a plan view of the variable resistance means, showing a pair of flywheels.

FIG. 6 shows a configuration for the variable resistance means 14 including flywheels 28 associated with either input side of the gears 24 and 26. The flywheels 28 are fixed relative to the shaft 38, and are driven in response to the user applied force. These flywheels 28 help to smooth out and maintain a consistent and evenly applied force supplied by the user. Use of such flywheels 28, reduces the possibility of shock or hesitation along the range of motion of a particular exercise, and may be braked by braking means (similar to that shown in FIGS. 10 and 13(c)) to provide a preselected constant resistive force. The braking means may include a friction band, friction plates, drum brake, or the like.

Figure 7:
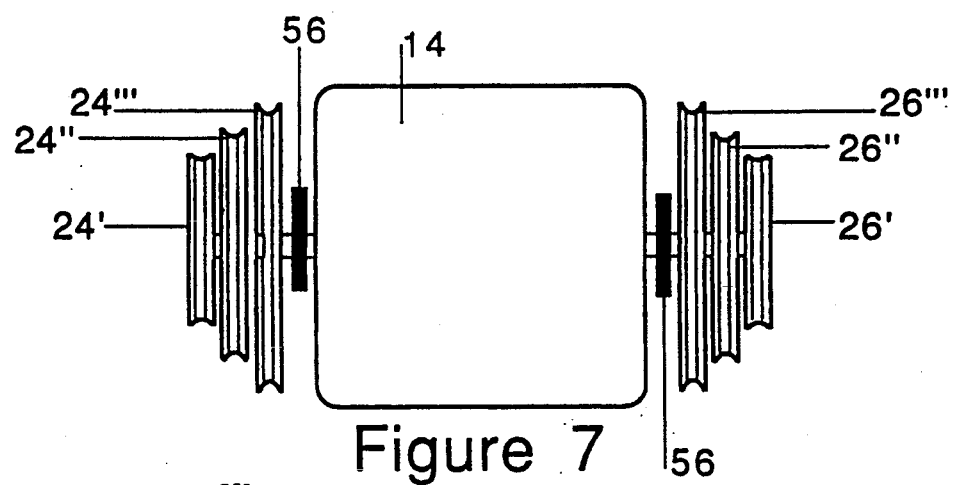
FIG. 7 is a plan view of still another embodiment of the variable resistance means, showing a plurality of input gears.

Referring to FIG. 7, a further embodiment of the variable resistance means 14 is shown as well as schematically represented clutch means 56 which are associated with either rotational input end of the shaft 38, and which are common to, where appropriate, but not necessarily shown in the other Figures. The clutch means 56 associated with either input side of the shaft 38 allow for a rotational force to be inputted via the shaft 38 to the variable resistance means in one rotational direction only. Thus, the gears 24,26 associated with either input end of the shaft 38 may reciprocate back and forth, that is, clockwise and counterclockwise, and apply a rotational force to the shaft 38 in one-direction only. In the other direction, the clutch means 56 allows the gears 24 and 26 to be freewheeling. As shown in FIG. 7, either input side of the shaft 38 may have associated with it multiple gears 24', 24" and 24''' and 26', 26" and 26'''. Each gear associated with a particular side has a different diameter as compared with the other gears associated with that side. By this configuration, the force experienced by the variable resistance means 14 may be controlled by selecting appropriate gearing. In this way, a particularly strong muscle group, such as the biceps muscle group relative to a weaker muscle group, such as the triceps muscle group, may be compensated for and the resistance applied by the variable resistance means 14 may be smoother.

Figure 8:
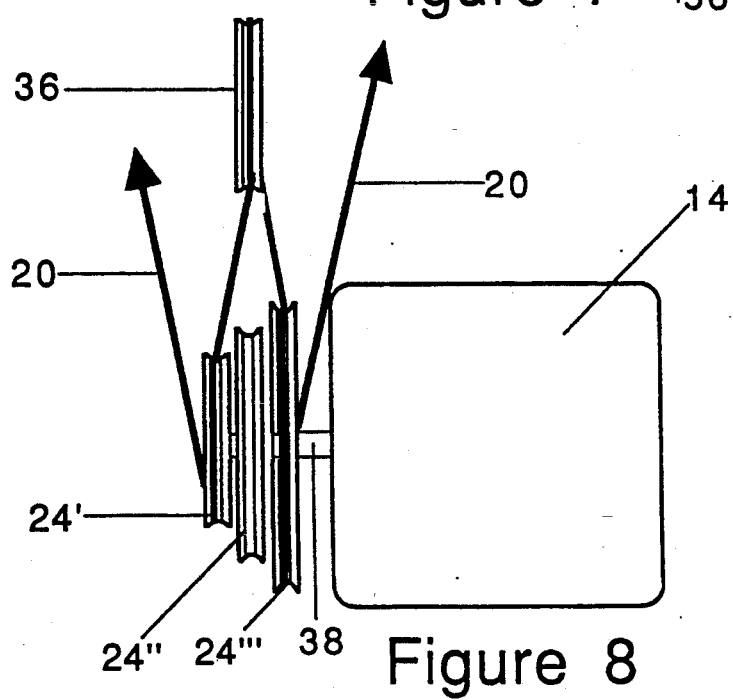
FIG. 8 is a plan view of yet another embodiment of the variable resistance means, showing a single sided multi-geared input means.

As shown in FIG. 8, in accordance with the present invention, a single input side of the shaft 38 is driven by multiple gears 24', 24" and 24''' and appropriately configured cables 20 to supply the reciprocating range of motion as shown by the arrows. Also shown is a guide pulley 36 which is used so that the cables 20 may be appropriately driven. In this case, a one-way clutch mechanism 56 (shown, for example in FIG. 7) may be used to apply the reciprocating two-directional rotational force from the gears 24, 24' and 24''' as a single-directional rotation. The appropriate gears may be selected by a derailing mechanism, similar to that used on multi-speed bicycles.

Alternative embodiments of the variable resistance means 14 are shown in FIGS. 9(a) and 9(b). FIG. 9(a) shows an alternative embodiment of the plates 40 which are designed to have a fan-like profile and are submerged in a resisting medium, such as water, oil, or the like. In this case, the force inputted to the gears 24 and 26 by the user, is resisted by the resistance medium 57 to counteract the applied force. By controlling the volume of the resistance medium 57, such as by use of a valve means or by controlling the degree of immersion of the fan-like plates 40, the force counteracting the user applied resistance can be varied. FIG. 9(b) shows another alternative embodiment in which the fans 40 present a fan-like profile to the ambient air. In this case, the plates 40 are surrounded by air, and due to, among other things, the compressible nature of air, the faster the plates are driven, the greater the air resistance they experience. In this case, the automatic compensating effect of the air resistance may obviate the use of sensing and controlling means (and the power supply) shown in previous drawings. A constant resistance may be set, as further described below, which is augmented by the air resistance.

FIG. 10(a) shows yet another embodiment of the variable resistance means 14 in which a friction plate 58 is sandwiched between a pair of friction applying plates 60. The friction plate 58 is driven by the shaft 38 to rotate relative to the friction applying plates 60. Force controlling means, such as screw means 59 or the like, applies the consistent resisting friction force to the friction plate 58 by controlling how hard the friction applying plates 60 squeeze the friction plate 58 sandwiched between them. In addition, this configuration may also have a predetermined resistance dial 62 to indicate a selected degree of force. Features of the various above described embodiments may be combined with each other to provide an optimum combination. For example, the friction plate and friction applying plates of FIG. 10(a) and 10(b) may be combined with the other embodiments to provide a constant selectable resistance which is augmented depending on the exercise mode and the user applied force. This feature allows for most of the user applied force to be absorbed by the constantly set constant resistance.

Figure 11A:
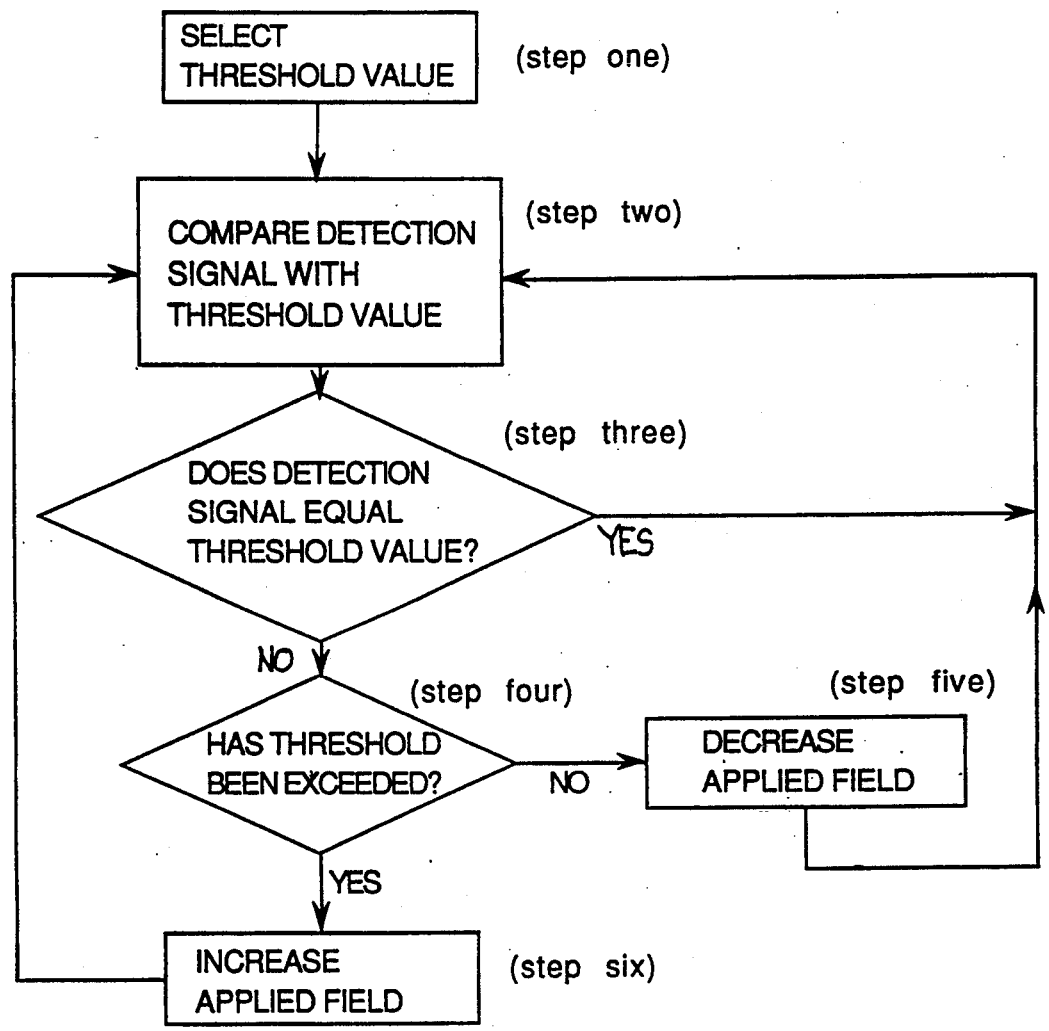
FIG. 11(a) is a flow chart illustrating operation of an embodiment of the inventive variable resistance means.
Figure 15:
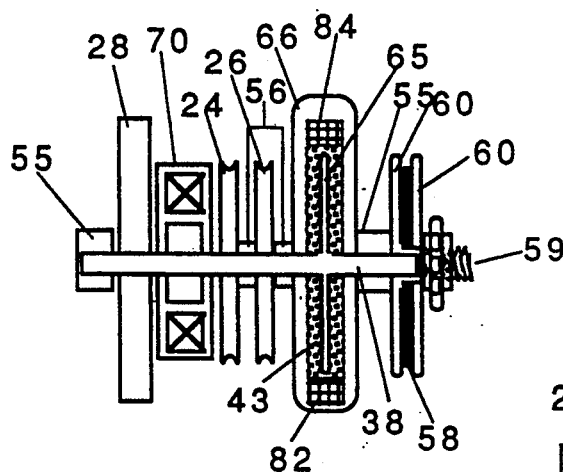
FIG. 15 is a cross sectional view showing an alternative configuration of the variable resistance apparatus utilizing magnetically reactive particulate.

FIG. 11(a) is a flow chart for explaining, in general, the operation and control of the variable resistance means 14 in accordance the present invention. A threshold value is first selected (step one). The threshold value may depend on any single variable or combination exemplified by the following: the type of exercise being performed (i.e., isotonic, isokinetic, cardiovascular, etc.), the muscle group being exercised, the user's fitness level, the configuration of the exercise device, and what variable is being sensed (i.e., rotational speed, linear speed, power generated, user applied force, etc.). The detection signal obtained from the sensor 50 (shown, for example in FIG. 5) or the detecting means 82 (shown, for example in FIG. 12) is compared with the threshold value (step 2) to determine an appropriate potential to apply to the electrodes 42, 44 to cause the appropriate ER fluid response. If the detection signal equals the threshold value (step three)(within some predetermined tolerance), the resistance is appropriate, the applied potential field is not changed, and control goes to step one. If the detection signal does not equal the threshold value (step three), then the resistance is not appropriate and the applied potential field is to be changed. If the detection signal indicates that the threshold has been exceeded (step four), then the applied field is decreased (step five), and control goes to step one. If the detection signal indicates that the threshold has not been exceeded (step four), then the applied field is increase (step six), and control goes to step one. Similarly, for a magnetic material based clutch (as shown in FIG. 15), the applied magnetic field is appropriately controlled. The applied field may alternatively be decreased when the threshold has not been exceeded and increased when the threshold has been exceeded, depending, for example, on the sensed variable and electronics composing the controller and sensor. The flow chart exemplifies control of the variable resisting means 14 where a constant velocity is desired. However, by appropriately controlling the resistive force over time, any suitable form of exercise (such as isotonic, isometric, isokinetic, cardiovascular, etc.) can be controllably performed.

Figure 11B:
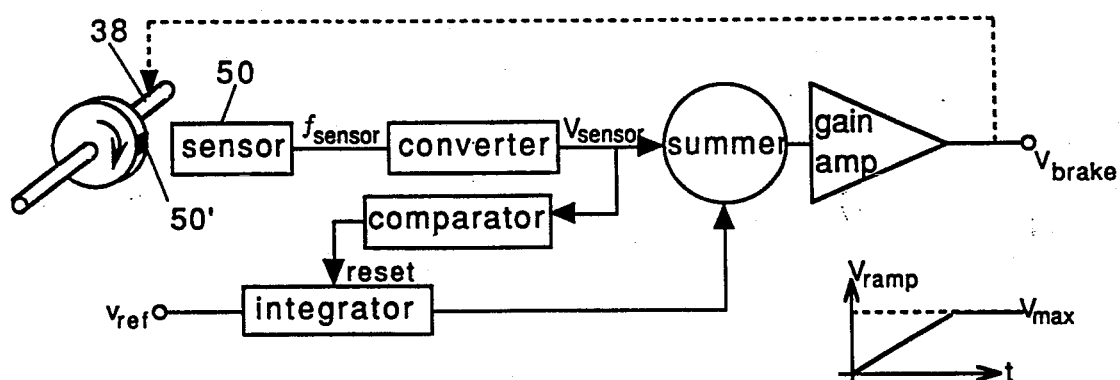
FIG. 11(b) is a block diagram of a circuit for controlling the variable resistance means depending on rotational velocity.

FIG. 11(b) shows a block diagram of a circuit for controlling the variable resisting means 14 so that the exercise range of motion is performed at a selected velocity. At the start of the exercise, or upon resetting of the circuit, a voltage $V_{ref}$ is inputted to an integrator. To provide a gradually increased adequate initial resistance, the integrator outputs a voltage $V_{ramp}$ which increase during a set time up to $V_{max}$. $V_{max}$ is a predetermined base-line value for applying a predetermined base resistance to the rotation of the shaft 38. This base resistance may not be necessary if there is adequate component resistance (such as internal resistance of the variable resisting means 14). $V_{ramp}$ from the integrator is received by a summer. As the user causes the shaft 38 to rotate, a sensor 50 detects the rotational velocity of the shaft 38. In this case, the sensor 50 may be a magnetic sensor, Hall effect sensor, optical sensor, or the like. The sensor 50 includes a reference member 50', which may be, for example, a magnet or optical member fixed to the shaft 38. The reference member 50' comes into proximity with the sensor 50 with each revolution of the shaft 38. The sensor 50 outputs an electrical pulse each time the reference member 50' passes by. The electrical pulse train output by the sensor 50 is dependent on the frequency of the passes of the reference member 50', and the frequency is dependent on the rotational velocity of the shaft 38. A frequency-to-voltage converter converts the frequency pulse train ($f_{sensor}$) to a voltage ($V_{sensor}$) having a value dependent on the rotational velocity of the shaft. $V_{sensor}$ from the converter is also received by the summer and added to $V_{ramp}$. The sum of $V_{ramp}$ and $V_{sensor}$ from the summer is received by a gain amplifier and amplified to a voltage $V_{brake}$. $V_{brake}$ is used to control the variable resisting means 14 to apply a braking force on the shaft effective to maintain the velocity of the shaft 38, and hence the exercise range of motion, at a user selected speed. If the velocity of the shaft drops below a predetermined level, a comparator, which receives $V_{sensor}$ resets the integrator to begin ramping $V_{ramp}$ back up to $V_{max}$.

FIG. 11(c) shows a schematic diagram of the circuit shown in block form in FIG. 11(b). In accordance with the circuit, a voltage-to-current converter (LM2917) receives the frequency pulse train $f_{sensor}$ from the sensor 50, and an appropriate control of the variable resisting means 14 is provided. As an alternative to the circuit shown, an EPROM, or other writable computer chip, can be used to store an appropriate program for controlling the variable resisting means 14 in a manner effective to provide a desired exercise. For example, to maximize the effectiveness and safety of a cardiovascular exercise, a relatively fast velocity, low resistance can be maintained during a warm-up period, a relatively slow velocity, high resistance can be maintained during a workout period, and then a relative high velocity, low resistance can be maintained during a warm-down period.

Figure 12:
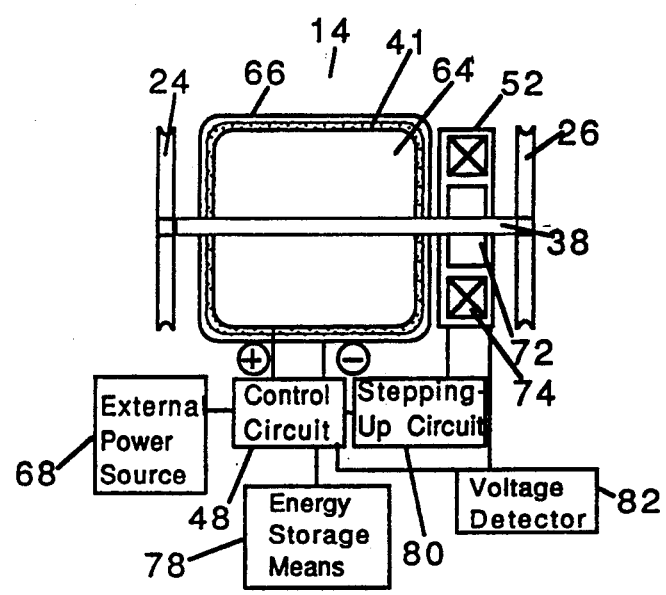
FIG. 12 is a cross sectional view showing another configuration of the inventive variable resistance apparatus.

FIG. 12 shows another embodiment of the inventive resistance apparatus 14 for providing a variable resistance against the rotationally applied force. In this embodiment, a rotatable member 64 is rotatable in response to a rotationally applied force to be resisted. As shown, a rotationally applied force to be resisted is applied to the gears 24,26, which in turn rotate an input shaft 38 which in turn rotates a cylinder (rotatable member 64). The cylinder 64 is contained within a hollow cylindrical container 66 and the shaft 38 is rotationally supported (via, for example, bearings, bushings, or the like) in a hollow cylindrical container 66. Between the peripheral surfaces of the rotatable cylinder 64 and the interior surface of the hollow containing cylinder, a gap is defined. An ER fluid 41 is contained within the gap. A first electrode surface (which may be merely the peripheral surface of a conductive rotatable cylinder 64, or which may be an electrode formed on the surface of a substrate comprising the rotatable cylinder 64), is rotatable with the first rotatable member (the rotatable cylinder 64). A second electrode surface is disposed relative to the first electrode surface to define a gap therebetween.

In the embodiment shown, the interior surfaces of the hollow cylindrical container 66 are electrically conductive, or have a second electrode surface disposed thereon. The electro-rheological fluid 41 is disposed within the gap between the electrode surface of the rotatable cylinder 64 and the electrode surface of the hollow cylindrical container 66. This ER fluid 41 provides a variable resistance to the rotation of the rotatable cylinder 64, which is dependent on a potential applied between the first electrode surface and the second electrode surface. The electric potential can be applied from an external power source 68, such as a battery or house current. Alternatively to supply power, or supplement an external power source 68, an electrical generator 52 is rotatably driven with the rotatable member 64 (as shown, the electrical generator 52 is fixed to the input shaft 38 which rotates the rotatable cylinder 64) for generating the electric potential.

In this configuration, the electrical generator 52 consists of a magnet 72 and a wire coil 74. The wire coil 74 may be fixed to be directly rotatable by the input shaft 38. The magnet 72 is disposed around the wire coil 74. Thus, as the shaft 38 is rotated by the gears 24,26, the electrical generator 52 creates an electric potential. In accordance with the present invention, the electrical generator 52 may comprise a generator shaft that is rotatable by the rotationally applied force. The generator includes a magnet 72 (such as a permanent magnet 72) and a wire coil 74 system. Either of the magnet 72 or the wire coil 74 is rotatable by the generator shaft, while the other remains stationary (or rotated in an opposite direction). Thus, magnetic field lines are produced moving relative to a conductive coil so as to generate the electric power. This electrical power may be stepped up to an appropriate voltage and/or temporarily stored. The electric power may be stored at a low voltage which is stepped up to the appropriate high voltage when used to energize an ER fluid, or may be used at the low voltage to create a magnetic field for the magnetic clutch shown, for example, in FIG. 15.

A proper gearing ratio may be disposed between the gears 24,26 and/or rotatable cylinder 64 and/or electrical generator 52, so that each component part rotates at an appropriate rotational speed. Also, the hollow cylindrical container 66 may be rotated relative to the rotatable cylinder 64.

Applying means, including a control circuit 48, applies the electric potential from the electrical generator 52 as a first polarity to the first electrode surface and a second polarity to the second electrode surface. By controlling the applied potential, the amount of resistance to rotation applied to the rotatable cylinder 64 can be set and varied. Thus, the inventive resistance apparatus 14 is effective for providing a variable resistance against the rotationally applied force.

As shown in FIG. 12, the present invention may include an external power source 68 (such as a battery, a power source which connects to an external supply such as a household electricity supply, or the like). The external power source 68 provides electrical power to supplement the electrical power generated by the electrical generator 52. Thus, for example, when the rotational speed of the electrical generator 52 is not enough to produce adequate electrical potential, the external power source 68 may be tapped (controlled by the control circuit 48), so that an appropriate potential can be applied across the ER fluid 41 disposed within the gap to thereby appropriately resist the rotation of the rotating cylinder. It is noted that the power source, whether it is the external power source 68, electrical generator 52, or an energy storage device 78, may include stepping-up means 80 to step up the voltage so that the required voltage can be applied to the first and second electrode surfaces. Further, as shown in FIG. 12 the energy storage device 78 (such as a capacitor, battery, or the like) may be provided for storing the electrical power generated by the electrical generator 52. Thus, when the output of the electrical generator 52 produces a surplus of electrical power, it can be stored in the energy storage device 80. This generated power (or power from an alternative power source) can also be used to drive display means, computational device, cooling fan for cooling the user 18 and/or the variable resistance means 14, or the like.

Further, detecting means 82 and/or a sensor 50 (not shown) may be provided for detecting the rotational speed of the rotatable member 64 (rotating cylinder), an electrical power output of the electrical generator 52 (as shown), a rotational speed of the electrical generator 52, an applied force, etc. The detecting means 82 and/or the sensor 50 produces a detection signal in response to the detected value. The control circuit 48 thus controls the applying means depending on the detection signal. Therefore, in accordance with one aspect of the present invention, the rotational speed of the rotatable member 64 (rotating cylinder) can be calculated directly from the power output of the electrical generator 52. In this case, since the gear ratio between the electrical generator 52 and the rotating cylinder is predetermined, the power output of the electrical generator 52 (which is dependent on the rotational speed of the rotatable member 64) can be used directly to calculate the speed of the rotatable member 64, shaft 38 member, rotational input, etc. This inventive feature greatly simplifies the circuitry required for appropriately controlling the applying means to resist the rotationally applied force.

As shown, for example, in FIGS. 13(a) through 13(c), various configurations of the inventive device can be used for inputting a rotational force to be resisted. Also, the rotating cylinder 64 can take a variety of shapes, depending on various design considerations. For example, by increasing the surface area between the facing first and second electrodes, the amount of shear stress which must be applied to the ER fluid 41 when energized can be appropriately controlled. The shaft 38 may be rotatably supported by bearing means 55 which are fixed to a frame or the like (not shown) or which may be integral with the containing means 66. As shown in the drawings, in accordance with an aspect of the present invention, one-way rotating means 56, including a one-way clutch 56, can be provided for receiving a first linearly applied force which is applied via the gear 24 having a first linear direction. A second linearly applied force is received by the one-way rotating means 56. The second linearly applied force is applied via the gear 26 having a second linear direction. The one-way rotating means 56 applies the first and second linearly applied force as a one-way rotationally applied force, having only a one-way rotating direction for rotating the rotatable member 64.

Stated otherwise, in accordance with the present invention, a reciprocating linear movement, such as an exercise repetition, can be converted into a first and second linearly applied force. The first and second linearly applied forces have opposite directions. However, in accordance with the present invention, in order to provide smoother operation, more consistent resistance, and better response, the one-way rotating means 56 converts the two-directional forces into a single-directional rotation, which is applied to the rotatable member 64. This is particularly advantageous when the rotatable member 64 rotates with some degree of momentum (which may be increased through the utilization of a flywheel 28). Thus, the reciprocating exercise motion, although in two different linear directions, need only be resisted in the single rotating direction of the rotatable member 64. Therefore, in accordance with the present invention, the one-way clutch allows the two-directional rotating force (clockwise and counter-clockwise) applied through the gears 24,26 to be resisted in only one-direction.

A reciprocating exercise motion drives the gears 24,26. The reciprocating exercise motion comprises two linear directions, which are converted into an applied rotational force by the gears 24,26. When the applied linear force is in one of the directions (for example, the up direction) the gear associated with applying force in the down direction is free-wheeling due to the one-way clutch means 56. Then, when the linear direction reciprocates to the opposite direction (thus applying a downward force), the gear associated with applying the upward force is free-wheeling via the one-way clutch means 56. In accordance with the present invention, a two-directional reciprocating linear motion is converted and applied as a single-directional rotational force to be resisted. The use of a flywheel may be important to provide a smooth and fluid feel to the exercise range of motion. Alternatively, it may be desirable to make the rotating components of the invention as light as possible to prevent the build-up of momentum. In this case, there is less momentum to be overcome by the applied resistance, and thus the ER fluid 41 or magnetic material does not have to have as a great dynamic shear stress level.

FIGS. 14(a) and 14(b) shows a configuration for the variable resistance means 14 wherein the rotatable member 64 comprises a plurality of plate members. Each plate member comprises a respective portion of the first electrode surface. The second electrode surface is configured so as to dispose a portion of the second electrode surface facing a respective portion of the first electrode surface, and define a respective gap therebetween. In these configurations, the electrode surface area (the first and second electrode surfaces) between which the ER fluid 41 is disposed is increased. Thus, the combined shear stress available for resistance to rotation is thereby increased. FIG. 14(a) shows the state when no electrical potential is applied across the ER fluid 41. In this case, the ER fluid 41 has a minimum shear stress resistance. FIG. 14(b) shows the state where an electric potential is applied across the ER fluid 41. In this case, the particulate suspended in the ER fluid 41 align and thereby provide a resisting force to the rotation of the rotatable member 64.

FIG. 15 shows an alternative embodiment of the inventive resistance apparatus. In this embodiment, a rotating plate member 65 is fixed to and rotated by the shaft 38. In accordance with this aspect of the present invention, a magnetic particle clutch is used to provide a variable resistance to resist the one-way direction applied rotational force. The rotating plate member 65 is rotatable by the input shaft 38. The rotating plate member 65 is surrounded by a magnetically reactive fluid 43 (which may contain finely sized magnetic particulates). An electromagnet 84 applies a variable magnetic field, which causes the magnetically reactive particulates 43 to align along the applied magnetic field lines, thereby imparting a resistance to the rotation of the rotating plate member 65. An example of a magnetic particle clutch is manufactured by Placid Industries of Lake Placid, N.Y.

In accordance with this aspect of the present invention, a magnetic particle brake is used to provide a variable resistance to resist the one-way direction applied rotational force. In this case, a rotating plate member is rotatable by the input shaft. The rotating plate member is surrounded by a magnetically reactive material (which may contain finely sized magnetic particulates). An electromagnet 82 applies a variable magnetic field, which causes the magnetically reactive particulates to align along the magnetic field lines, thereby imparting a resistance to the rotation of the rotating plate member. A flywheel 28 and/or constant resistance applying means including a friction plate 58 and friction applying plates 60 may be included in this configuration. It is noted that any of the individually described elements described herein may be reconfigured in a number of different permutations and the configurations disclosed and described herein are illustrative only.

To improve the effectiveness of the magnetically reactive fluid, the particulates may be encapsulated within an insulative shell, such as by a micro encapsulation process. By micro encapsulating fine metallic particles, abrasion can be reduced, thereby decreasing heat generation and increasing the useful life of the brake. The micro encapsulation process may also be used for obtaining an ER fluid having desired characteristics. An additive, such a water, may be include in the shell or internal phase of the resulting microcapsule. This additive may be effective to create a dipolar condition by which the microcapsule becomes more susceptible to the ER phenomenon.

Figure 16:
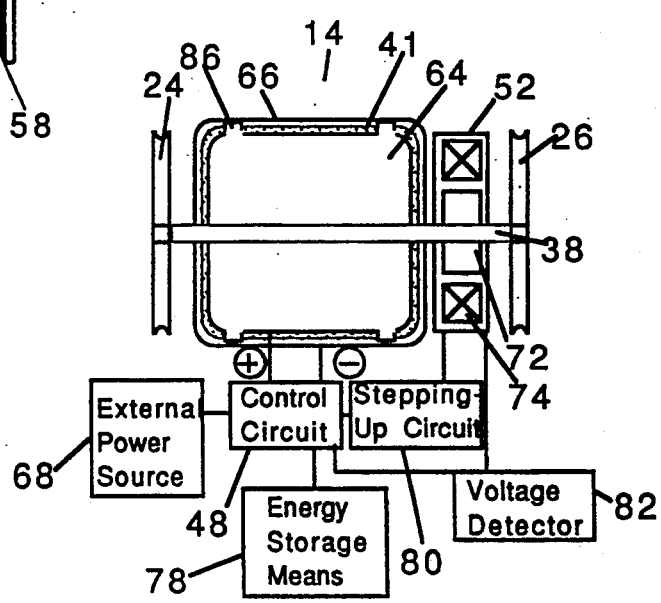
FIG. 16 is a drawing showing another configuration of the variable resistance apparatus, showing sealing means.

FIG. 16 shows a configuration of the present invention in which sealing means are provided for preventing the ER fluid 41 from leaking out from between the gap. As shown, the rotatable member 64 includes a pair of protruding lip portions 86, between which the gap containing the ER fluid 41 is defined. The protruding lip portions 86 are received in receiving grooves disposed in the interior wall surfaces of the containing means 66. As the rotatable member 64 is rotated, there would be a tendency for the ER fluid 41 to leak out through the containing means 66 through, for example, the through-holes through which the shaft 38 passes. Also, contaminates such as dust and moisture, may infiltrate the ER fluid 41 through the through-holes in the containing means 66. In addition, depending on the ER fluid 41 used, the moisture content of the ER fluid 41 is crucial. To combat the contamination, loss of moisture and leaking of the ER fluid 41, the sealing means described herein is provided.

Figure 17A:
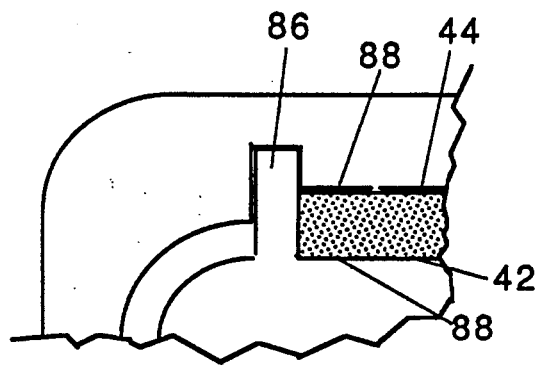
FIG. 17(a) is a cut-away sectional view showing a sealing portion and confining means in accordance with an inventive aspect of the present invention.
Figure 17B:
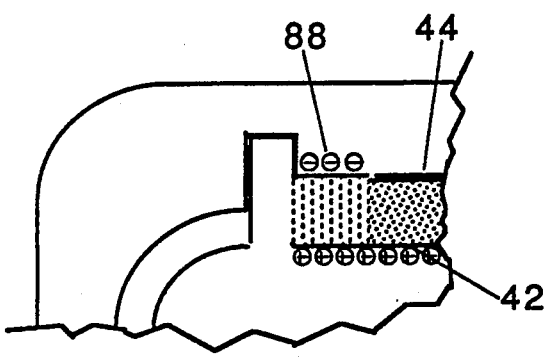
FIG. 17(b) is a cut-away sectional view of the sealing portion and confining means shown in FIG. 17(a), showing the confining means having an applied potential, without a potential applied across the bulk of the ER fluid.
Figure 17C:
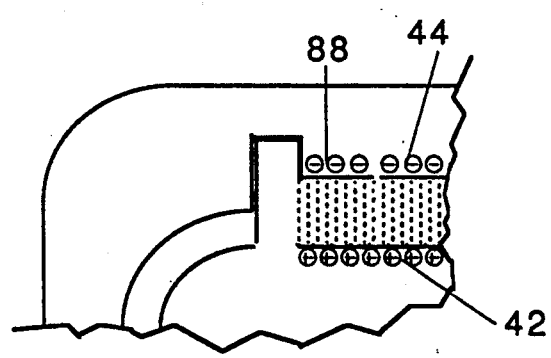
FIG. 17(c) is a cut-away sectional view of the sealing portion and confining means having an applied potential, and showing a potential applied to the bulk of the ER fluid.

FIGS. 17(a) through 17(c) show a close-up of the sealing portion provided for containing the ER fluid 41 in the gap between the rotatable cylinder and the interior walls of the hollow cylinder. As the rotatable cylinder rotates, some of the ER fluid 41 may be able to leak past a sealing member, such as an 0 ring. Alternatively, the sealing member may not be provided, in which case the ER fluid 41 may be more apt to leak out. In particular, since the input shaft 38 must be passed through a through-hole in the containing hollow cylinder, ER fluid 41 may leak out through this through-hole. Thus, in accordance with this configuration, confining means is provided. It is noted that the confining means described with reference to FIGS. 17(a) through 17(c) merely illustrates the principals of this inventive aspect. The confining means may be provided by forming a confining electrode surface 88 at or near the through-hole of the containing hollow cylinder which acts in conjunction with an electrode surface formed on the input shaft 38 (or other appropriate surface). In accordance with this inventive aspect, the confining means comprises a pair of confining electrode surfaces 88 which receive a potential at an appropriate time (such as at the start of rotation of the rotatable cylinder), so that any ER fluid 41 which passes between the confining electrode surfaces 88 receives a relatively high potential applied thereacross, and gels.

As shown in FIGS. 17(a) through 17(f), in accordance with this aspect of the present invention, the containing means 66 (hollow containing cylinder) is provided for containing the ER fluid 41. The containing means 66 has a through-hole. A shaft 38 member (input shaft 38) passes through the through-hole and is connected with the rotatable member 64 (rotatable cylinder). The confining means is provided for confining the ER fluid 41, and preventing the ER fluid 41 from leaking out of the containing means 66 through the through-hole. The confining means receives the electric potential applied from the applying means. The strength of the electric potential is controlled in accordance with the control circuit 48. A first confining electrode 88 receives the electric potential as a first polarity, and a second confining electrode 88 receives the electric potential as a second polarity. The second confining electrode 88 is disposed facing the first confining electrode 88 and defines a confining gap there between. Thus, when the electric potential is applied to the confining electrodes 88, the confining means confines the ER fluid 41 that is disposed in the confining gap. In accordance with one aspect of the present invention, the applying means includes means for applying the electrical potential to the confining means depending on a rotation of the shaft 38 member, so that the confining means is effective to prevent the ER fluid 41 from leaking out of the containing means 66 due to the rotation of the shaft 38 member. Stated otherwise, when a rotationally applied forces is applied to the shaft 38 member, the rotatable cylinder begins to rotate. As the cylinder rotates, the ER fluid 41 disposed within the gap between the rotatable cylinder and the interior walls of the confining hollow cylinder begins to flow. At this time, any ER fluid 41 which is disposed between the electrodes 88 of the confining means has its viscosity changed and acts as a dam against the leakage of ER fluid 41 pass the confining means.

FIG. 17(a) shows a configuration in which the confining electrode surfaces 88 are disposed adjacent to the main electrode surface 42,44 used for providing the bulk of resistance to the rotation of the rotatable member 64. It is noted that the main electrodes 42,44 may simply be the surface of either or both the rotatable member 64 and the confining means, in which case the rotatable member 64 and/or confining means are composed of a conductive material. Alternatively, the main electrodes 42,44 may be formed on the surface of the rotatable member 64 and/or containing means 66 which is formed from a non-conductive material. Furthermore, the confining electrode surfaces 88 may be formed by disposing an insulating layer on the surface of the rotatable member 64 and/or containing means 66 and then building a conductive layer over this insulating member to provide the confining electrode surfaces 88. FIG. 17(a) shows the condition of the confining electrode surfaces 88 and main resistance portion of the gap in which the ER fluid 41 is disposed in the state when no potential is applied to either the confining electrode surfaces 88 or the main electrodes 42,44. FIG. 17(b) shows the condition when a potential is applied to the confining electrode surfaces 88 and not to the main electrodes (such as at the onset of rotation, etc.). In this case the confining means acts as a dam against the flow of the ER fluid 41 through the sealing portion, which may or may not be provided. FIG. 17(c) shows the condition when a potential is applied to the confining electrode surfaces 88 and a potential is applied to the main electrodes 42,44. In this case, a stronger potential may be applied to the confining electrode surfaces 88 at times when the viscosity of the ER fluid 41 between the main electrodes 42,44 is increased due to the applied potential, but still would not increase the viscosity enough to prevent the ER fluid 41 from leaking out. This allows a suitable gap to be maintained, thus lessening the possibility of an electrical short between the confining electrodes.

Figure 17D:
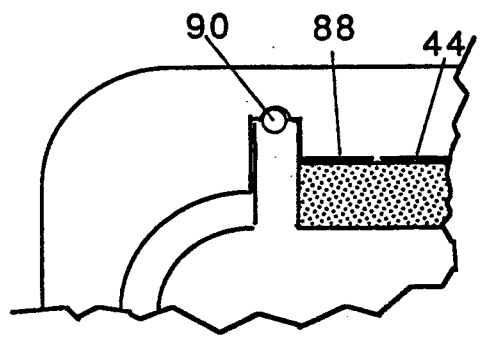
FIG. 17(d) is a cut-away sectional view of another example of the sealing portion and confining means.
Figure 17E:
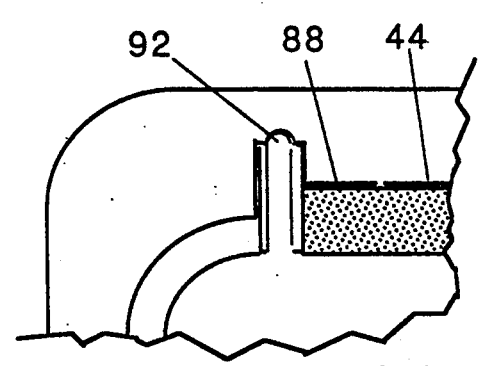
FIG. 17(e) is a cut-away sectional view of another example of the sealing portion and confining means.

FIG. 17(d) shows a cut-away enlarged portion of the containing means 66 and the rotatable member 64, showing an example of the sealing means. In this case, to improve the smoothness of rotation and reduce friction, the lip portion 86 of the rotatable member 64 is rotatably supported within the groove of the containing means 66 by rotational supporting means, such as a ball bearing system 90. If the lip portion 86 and the groove are conductive, the ball bearings are made of a non-conductive material. FIG. 17(e), on the other hand, shows a configuration in which an O-Ring seal 92 is disposed to provide more secure prevention of leakage and contamination. It is noted that the exact geometry of the sealing means is only shown herein by way of example, and many other configurations are possible. For example, the protruding lip may be excluded and a groove provided annularly around the rotatable member 64 for seating an O-Ring, which may also be received by a groove disposed in the containing means 66.

Figure 17F:
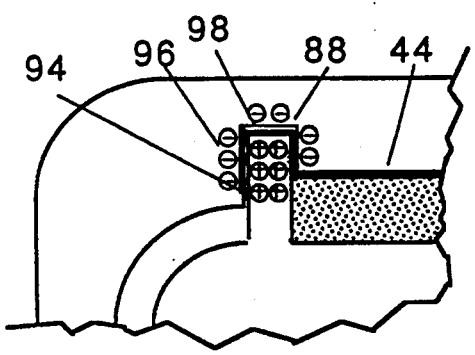
FIG. 17(f) is another example of the sealing portion and confining means.

FIG. 17(f) shows an alternative configuration of the sealing means in which confining means are provided for confining the ER fluid 41 through the use of the electro-theological phenomena. In this case, confining electrode surfaces 88 are disposed in facing arrangement at appropriate positions on both the rotatable member 64 and the containing means 66. A gap between the confining electrode surfaces 88 provides clearance for rotation of the rotatable member 64. A first polarity 94 is applied to one electrode surface 88 and a second polarity 96 is applied to the other electrode surface 88 (the electrode surface may be the surface of the rotatable member 64 or the containing means 66, or a conductive path 98 formed thereon. The potential applied to the confining electrode surfaces 88 at the gap, gels any ER fluid 41 which may otherwise escape. It is noted that the shear stress applied to the ER fluid 41 disposed in this gap due to the rotation of the rotatable member 64 is relatively great, so that, even if the potential applied at the confining electrode surfaces 88 is greater than the potential applied to the main electrodes 42,44 for providing resistance, the electro-rheological fluid will slip and the rotatable member 64 will still be able to rotate in response to the user supplied rotationally applied force. The resistive force at the gap will be part of the net resistive force of the variable resistance apparatus. To prevent ER fluid 41 from escaping at the onset of rotation of the rotatable member 64, the potential can be applied to the confining means at the onset, or immediately before and/or after, so that the viscosity of the ER fluid 41 is increased enough to prevent escape of the fluid through the gap. Due to the added pressure resulting from rotation, ER fluid 4.1 may be urged into the gap, but the potential applied at the confining electrode surfaces 88 creates a damming effect which limits or prevents ER fluid 41 escape.

Figure 18A:
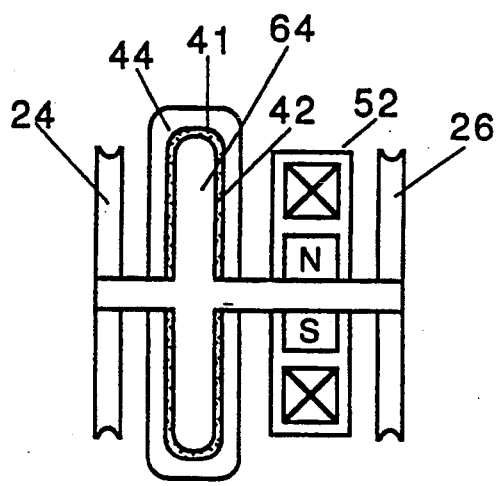
FIG. 18(a) is a cross sectional view of another configuration of the inventive resistance apparatus, showing a single plate rotatable member.
Figure 18B:
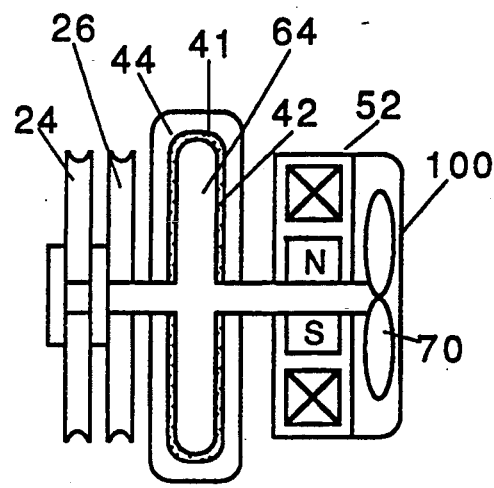
FIG. 18(b) is a cross sectional view of another configuration of the inventive resistance apparatus, showing a cooling fan.
Figure 18C:
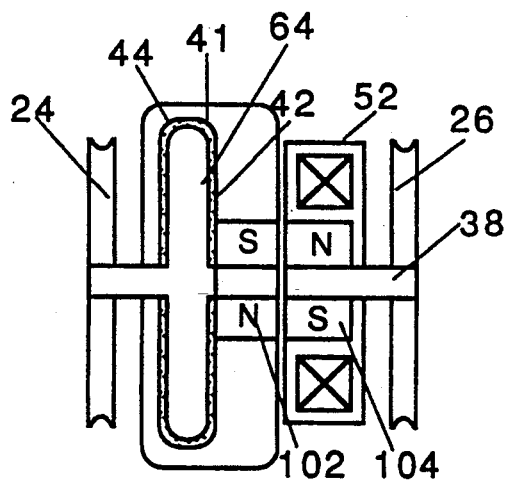
FIG. 18(c) is a cross sectional view of another configuration of the inventive resistance apparatus showing magnetic coupling.

As shown, for example, in FIGS. 18(a) through 18(c), various configurations of the inventive device can be used for inputting a rotational force to be resisted. Also, the rotatable member 64 can take a variety of shapes, depending on various design considerations. For example, by increasing the surface area between the facing first and second electrodes 42,44, the amount of shear stress which must be applied to the ER fluid 41 when energized can be appropriately controlled. Both electro-rhelogical fluids and magnetically reactive fluid create a shear resistance by aligning particles within an applied field. In accordance with the present invention, the resistance to a reciprocating range of motion available from these aligned particles is enhanced by applying the motion in a single rotational direction, so that the aligned particles are not forced back and forth by the reciprocating exercise.

Figure 18D:
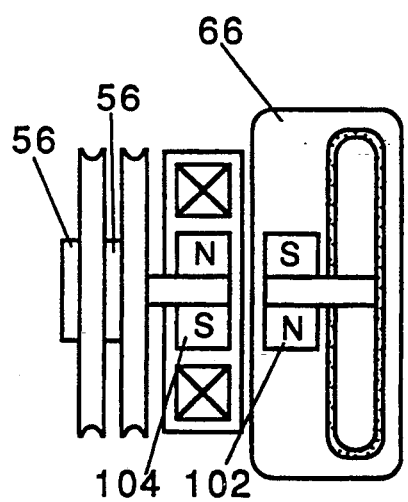
FIG. 18(d) is a cross sectional view of another configuration of the inventive resistance apparatus, showing a fully contained magnetically coupled resisting portion.

As shown in the FIGS. 3, 18(b) and 18(d), one-way rotating means (gears 24, 26 and one-way clutch 56) receives a first linearly applied force which is applied having a first linear direction. As second linearly applied force is received by the one-way rotating means. The second linearly applied force has a second linear direction. The one-way rotating means applies the first and second linearly applied force as a one-way rotationally applied force, having only a one-way rotating direction for rotating the rotatable member 64. Stated otherwise, in accordance with the present invention, a reciprocation movement, such as an exercise repetition, can be converted into a first and second linearly applied forces. The first and second linearly applied forces have opposite directions. However, in accordance with the present invention, in order to provide smoother operation, more consistent resistance, and better response, the one-way rotating means converts the two-directional forces into a single-directional rotation, which is applied to the rotatable member 64. This is particularly advantageous when the rotatable member 64 rotates with some a large degree of momentum (such as through the utilization of a flywheel). In this case, the resistance applied to the rotatable member 64 is consistent and in only one rotational direction. Thus, the reciprocating exercise motion (which may be linear) is received by the gears 24, 26 in two different rotational directions, but need only be resisted in the single rotating direction of the rotatable member 64.

In accordance with the present invention, the electrical generator 52 may comprise a generator shaft that is rotatable by the rotationally applied force. The generator 52 also includes a magnet 72 (such as a permanent magnet 72 stator) and a wire coil 74 system. Either the magnet 72 or the wire coil 74 is rotatable by the generator shaft, while the other remains stationary (or rotated in an opposite direction). Thus, magnetic field lines are produced moving relative to a wire coil 74 so as to generate the electric power. FIG. 18(b) shows a configuration in which a cooling fan 70 is rotated by the shaft for maintaining an air flow over the surfaces of the variable resistance means 14 and/or over the user 18. The cooling fan 70 may be covered by a cover 100 for protection.

FIG. 18(c) shows an embodiment of the present invention in which the rotatable member 64 is rotated via a magnetic coupling. In this case, there is a gap between the rotating portions of the electrical generator 52 and the interior of the confining hollow cylinder. A first magnetic member 102 is contained in the interior of the containing means 66 (hollow cylinder) and is connected with the rotatable member 64 for rotating the rotatable member 64. A second magnetic member 104 (which may be the generator magnet 72) is disposed adjacent to the containing means 66 and magnetically coupled with the first magnetic member 102. The second magnetic member 104 is rotationally driven by the rotationally applied force, so that the rotationally applied force rotates the rotatable member 64 through the magnetically coupled the first magnetic member 102 and the second magnetic member 104. Stated otherwise, the second magnetic member 104, which may be the magnet 72 having north and south poles, is fixed to the input shaft 38 that is rotated by the rotationally applied force. This rotationally applied force is transmitted, via a magnetic coupling, between the first magnetic member 102 and the second magnetic member 104, to rotate the first magnetic member 102 that is contained in the interior of the containing means 66. As shown in FIG. 18(d), the containing means 66 may be completely closed, to fully take advantage of the magnetic coupling so that there is no detriment or design problems associated with requiring seals against the leaking or contamination of the internally confined ER fluid 41. Since the first rotatable member 102 is contained within the closed containing means 66, and since the first magnetic member 102 rotates the rotatable member 64 directly, there is no outlet for the ER fluid 41 to escape. The first magnetic member 102 is magnetically coupled through a magnetically permeable surface of the containing means 66 to the second magnetic member 104. As the second magnetic member 104 rotates, so does the first magnetic member 102, which in turn has its rotation resisted by the ER fluid 41. Therefore, this configuration provides the advantages of completely containing the ER fluid 41 without requiring any means for sealing against leakage through a through-hole needed to accommodate the input shaft 38.

As shown in FIGS. 18(c) and 18(d), the second magnetic member 104 may be a portion of the generating means. In this case, the resistance produced by the generator 52 will be augmented by the resistance of the magnetically coupled electro-rheological fluid brake. The faster the rotation, the more resistance applied by the ER fluid 41 due to the proportional increase in applied electric field, which tends to maintain a consistent rotational speed. Further, the total applied resistance includes the resistance due to the electrical generator 52 and the resistance due to the ER effect. To optimize the design of the exercise device, the most efficient gearing must be determined at which to drive an efficient generator 52 based on the anticipated applied human force. The weakest rotational drive coupling is the magnetic coupling, and it may slip more than is desirable if not properly designed. Therefore, an effective generator 52 must be provided that is capable of producing enough electricity to apply an appropriate electric field, and which does not exceed the maximum resistance limits of the magnetic coupling. In one embodiment of the present invention, a constant resistance is applied, which is augmented by the variable resistance means 14. In this case, the embodiment of the variable resistance means 14 shown in FIGS. 18(c) and 18(d) may be most effectively used, since the whole resistance force need not be produced by the variable resistance means 14.

Figure 19A:
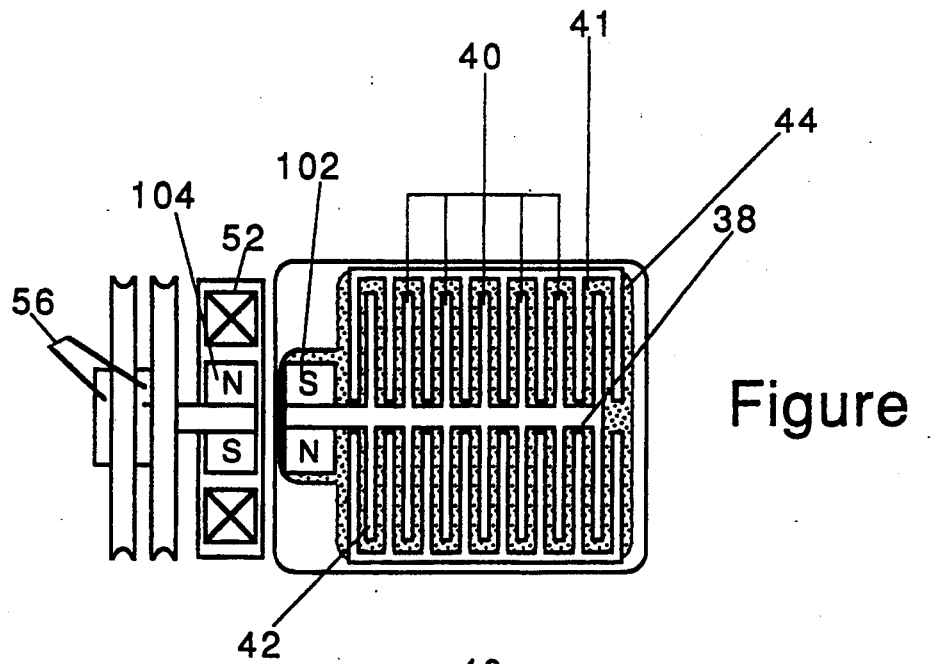
FIG. 19(a) is a cross sectional view of another configuration of the inventive resistance apparatus having a multi-plate rotatable member, and showing the state of the ER fluid with no potential applied.
Figure 19B:
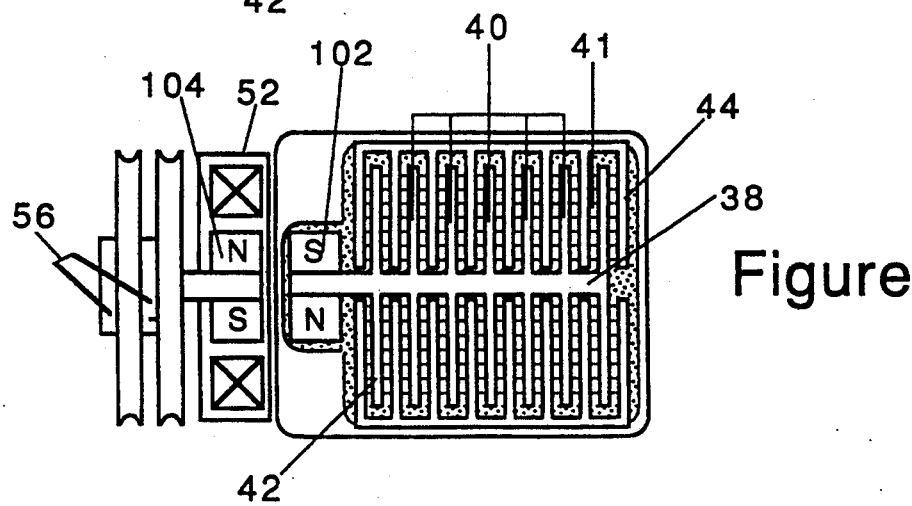
FIG. 19(b) is a cross sectional view of the configuration shown in FIG. 19(a), showing the state of the ER fluid with a potential applied.

FIGS. 19(a) and 19(b) show a configuration for the variable resistance means 14 wherein the rotatable member 64 comprises a plurality of plate 40 members. Each plate 40 member comprises a respective portion of the first electrode surface 42. The second electrode surface 44 is configured so as to dispose a portion of the second electrode surface 44 facing a respective portion of the first electrode surface 42, and defining a respective gap therebetween. In this configuration, the electrode 42,44 surface area (the first electrode surface 42 and second electrode surface 44) between which the ER fluid 41 is disposed is increased. Thus, the combined shear stress available for resistance to rotation is thereby increased. It is noted that the configuration shown in these drawings having a magnetic coupling is for illustrative purposes only. The rotatable member 64 may be directly driven via an input shaft 38 passing through a through-hole in the containing member. FIG. 19(a) shows the state when no electrical potential is applied across the ER fluid 41. In this case, the ER fluid 41 has a minimum shear stress resistance: FIG. 19(b) shows the state where an electric potential is applied across the ER fluid 41. In this case, the particulate suspended in the ER fluid 41 align and thereby provide a resisting force to the rotation of the rotatable member 64 that has a strength depending on the applied potential.

Figure 20:
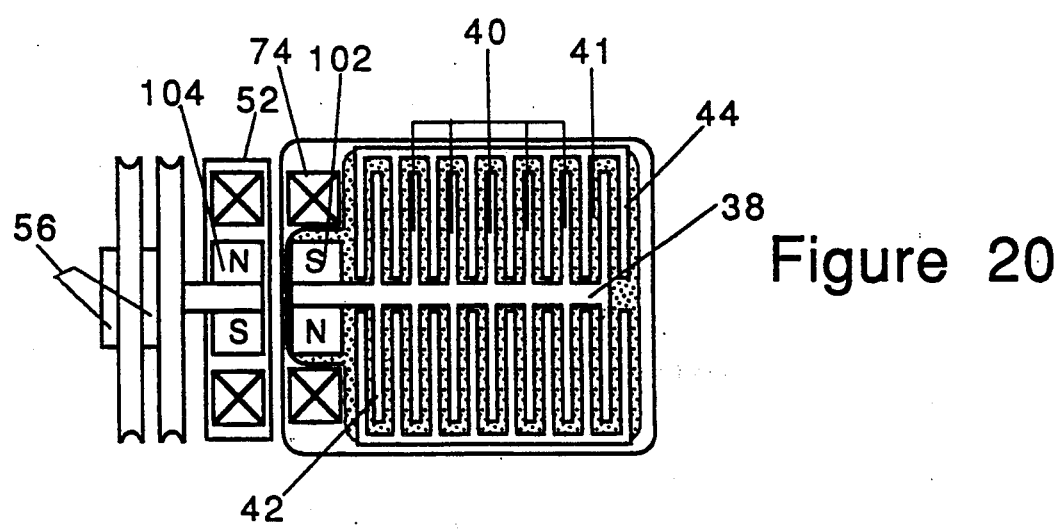
FIG. 20 is a cross sectional view of another embodiment of the inventive resistance apparatus, showing a magnetically coupled, fully contained electrical generator.

FIG. 20 shows another configuration of the inventive resistance apparatus having a coil 74 disposed around the first magnetic member 102 to obtain electricity to energize the ER fluid 41. The electricity generated by the first magnetic member 102 rotating within the electrically conductive coil 74 may also be used to increase the magnetic field acting through the magnetic coupling. The electricity obtained from this electrically conductive coil 74 is used to energize the ER fluid 41, so there may not be any need for an external electrical connection passing through the containing means 66. However, it may still be necessary to apply an additional electric current to the electrode surfaces 42,44, which can be accomplished by passing wires through small through-holes easily sealed in the containing means 66, or the electrical field required to vary the yield stress of the ER fluid 41 can be provided through a capacitive coupling of the magnetic member through the ER fluid 41 to the containing member (not shown). FIG. 20 shows an embodiment in which the variable resistance means 14 has a magnetic coupling to separate the input side from the resistive side. Stated otherwise, the gears which receive the user supplied force are used to rotate a first magnetic member 102. A fully sealed container encloses a second magnetic member 104 which rotatably drives the rotatable member 64. The first magnetic member 102 is magnetically coupled to the second magnetic member 104 through a wall in the containing means 66. Thus, the ER fluid 41 (or magnetically active material) is completely sealed off from the ambient environment. This inventive aspect allows for the effective prevention of contamination of the ER fluid 41 (or magnetically active fluid) since the fluid is completely enclosed within a hermetically sealed containing means 66. Further, there is no problem associated with leaking of the fluid through the through-holes as described above, so that the confining means and/or sealing means are not necessary. To increase the magnetic coupling effect, both gears may be magnetically coupled at respective ends of the container by separate magnetic members (not shown).

In order to make the variable resistance means 14 in mass quantities, and so that each device has a consistent response, it is very important to control the tolerances of the component parts so that the gap distance between the electrode surfaces 42,44 is consistent between different production units. However, conventionally such tolerances are obtained by laboriously machining the geometry of the component parts out of a solid material, such as aluminum, steel, or other conductive metal. This method may be adequate for small scale or prototype production, but is a process which results in relatively high expense for the final product. Therefore, the labor-intensive machining of the component parts is much less than adequate for mass production purposes.

In accordance with the present invention, as shown in FIGS. 21 through 22(c), a method of-producing the component parts having excellent tolerances and consistencies between individual pieces of different units is provided. In accordance with the inventive method, a plastic, or other suitable material, is coated at areas to become electrode surfaces with a sensitizing solution. Electroplating deposits a conductive film directly on the substrate at appropriate electrode locations. This method allows for the use of inexpensive injection molding techniques for producing the substrate, and relatively inexpensive electroplating techniques for depositing electrode surfaces only at selected locations. In the inventive method, as shown in FIG. 22(a), a substrate is provided which may be produced through an injection molding process and may be comprised of plastic. Areas of the substrate that are not to be electrode surfaces are masked. The substrate is then dipped in a sensitizing solution (FIG. 22(b)) so that the unmasked surfaces (which ultimately will become electrode surfaces) become sensitized to receiving an electroplated conductive material. The substrate is placed in a bath containing the conductive material and then electroplated in an electroplating process (FIG. 22(c)), so that the sensitized areas of the substrate have a layer of conductive material deposited thereon. Thus, the areas of the plastic substrate which are to become electrodes receive a conductive layer of material so that these surfaces can be effective for providing a potential through the ER fluid 41. This aspect of the present invention solves the great difficulty of mass-producing the variable resistance means 14 without requiring the labor-intensive and cost-of-material-intensive conventionally used machining processes.

FIG. 21 shows a cut-away and enlarged view of a portion of the rotatable member 64 and a portion of the containing means 66 which have been formed using the inventive masking, sensitizing, and electroplating manufacturing process. As shown, because of the electroplated electrode surfaces, a positive charge and a negative charge can be applied to create the required electric field in the gap for causing the ER fluid effect. As an alternative to the above described masking, sensitizing, and electroplating process, another process can be utilized for inexpensively manufacturing the component parts of the variable resistance means 14. In this process, a substrate is provided which may be injection molded plastic. Electrode surfaces are formed by adhering conductive material to the appropriate surfaces of the plastic substrate so as to form the electrode surfaces that apply the potential to the ER fluid 41 to cause variable resistivity.

Alternatively, the plates 40 shown, for example, in FIG. 4(a)–4(c), may be produced by stamping a disk shape from sheet metal. This feature minimizes the overall thickness of the variable resistance means 14, since the thickness of each plate 40 is minimized. This stamping process for forming the plates 40, in combination with the above described substrate electroplating process for forming the containing means 66, can be combined to reduce costs and improve the consistency of a mass produced variable resistance device. This inventive method is described in detail with reference to FIGS. 38(*a*) and 38(*b*).

Referring now to FIGS. 23(*a*) through 23(*c*), one problem which has occurred in the case of ER fluids (or magnetic particles dispersed in a carrier fluid) is that if the densities of the particles and the carrier fluid differ, the particles will settle out or float to the top of the fluid during periods of non-use. To control this phenomenon, it is known to match the particulate density with the density of the carrier fluid so that the particulates remain suspended within the fluid even during extended periods of non-use. However, it is not always possible to match the density of the carrier fluid with the particulate for a given ER fluid 41 having favorable properties. Therefore, as shown in FIGS. 23(*a*) through 23(*c*), an agitation mechanism is provided for quickly dispersing the ER particulates within the carrier fluid upon rotation of the rotatable member 64. The rotatable member 64 has a shape which quickly disperses settled particles 106 or floating particles into the carrier fluid by creating a turbulence upon rotation of the rotatable member 64. Thus, upon rotation of the rotatable member 64, the turbulence created by the geometry of the rotatable member 64 causes the settled or floating particles 106 to become suspended particles 108 within the carrier fluid. If the ER fluid 41 has settling problems, due to the difference in density between suspended particle and fluid, the rotatable member 64 can have a shape which creates turbulence during rotation. The turbulence acts to quickly disperse settled (or floating) particles 106 into the carrier fluid.

FIG. 24 shows an alternative configuration for the constant resistance applying means. In this case, a bicycle caliper brake type, car disc brake, or motorcycle disc brake type friction system 110 is used in which a rotating disc is frictionally resisted by brake pads. Alternatively, the friction can be obtained using a friction band, or other known apparatus. In the embodiment shown, the pads are disposed on either side of the rotating disc, and are pressed against the disc via a bicycle caliper brake system. However, the brake pad may alternatively be singular and pressed against only one side of the rotating disc. It is noted that this system can be used with or without the variable resistance means 14. For example, the user 18 may be provided with a means to continuously alter the resistance to the exercise range of motion through a lever 112 positioned, for example, on the handle bar, in the case of a stationary bike, or on the bar 22, in the case of, for example, a bench press mode of exercise. Thus, as the user 18 squeezes the lever 112 against the bar 22, the resistance experienced against the range of motion can be proportionally increased (or decreased). Further, in addition to or as an alternative of the lever 112, a dial 62 can be provided which tensions the cable 114 thereby applying more or less resistance to set the constantly applied resistance. Of course, in particular in the case of the lever system, the same resistance is only constantly applied at the same level as long as the user 18 does not adjust it by squeezing the lever.

FIG. 25(*a*) and 25(*b*) show another embodiment of the inventive variable resistance means 14. In this embodiment, a piston is provided within a hollow cylinder. The piston 116 and cylinder 118 are moveable relative to each other (i.e., either the piston 116 moves or the cylinder 118 moves or both move). A gap is defined between the peripheral surface of the piston 116 and the interior walls of the cylinder. An ER fluid 41 is disposed within this gap. The surface of the piston 116 has a first electrode surface 42 disposed thereon, while the surface of the interior of the hollow cylinder 118 has a second electrode surface 44 formed thereon. Thus, a potential is applied across the ER fluid 41 by applying opposite polarities to the first electrode surface 42 and second electrode surface 44. The movement of the piston 116 relative to the cylinder 118 is variably resisted in proportion to the amount of potential applied via the electrode surfaces 42,44. Thus, a linear displacement applied, for example, to the piston shaft 120, can be variably resisted to variably resist a user supplied force. This configuration of the variable resistance means 14′ is particularly suited when the inventive exercise device 10 is configured for substantially linear displacement. In this case, the piston/cylinder type variable resistance means 14′ can be used to replace the air piston systems of known exercise devices so that an instantaneously controllable resistance can be imparted to the exercise regiment. FIG. 25(*b*) shows an embodiment of the piston/cylinder type variable resistance means 14′ in which the piston 116 is reciprocated back and forth within the hollow cylinder 118 via two shafts 120 disposed at either side thereof. In this case, the hollow cylinder 118 can be fixed to the frame of the inventive exercise device 10 so that the movement of the piston 116 is variably resisted by the resistance action of the electro-rheological fluid.

FIGS. 26(*a*) through 26(*c*) show sealing means for sealing the shaft 120 through-hole of the containing cylinder 118 so that ER fluid 41 is prevented from leaking out, and any ER fluid 41 which accumulates on a shaft 120 is removed and recycled back into the hollow cylinder. The shaft 120 passes through a shaft through-hole at the cylinder cap 122 disposed on the hollow cylinder. The cylinder cap 122 has sloping sides so that any ER fluid 41 scraped by the scrapers 124 from the shaft 38 collects at the bottom and reenters the cylinder 118 via one way valves or an ER fluid valve. The ER fluid retaining collar 126 has a small gap filled with ER fluid 41. As soon as the piston 116 moves, the collar 126 is energized so that it creates a barrier to ER fluid 41 escape. Adjacent with the collar 126 is a guiding collar 128 with a smaller tolerance cap between the shaft 120 and the collar walls to guide the smooth movement of the piston 116 within the cylinder 118. The collar 126 is electrically insulated from the cylinder cap 122 (or the cylinder cap 122 is insulated from the body of the cylinder 118) and is supplied with a potential between the shaft 38 and the walls of the collar 128 as soon as the piston 116 begins to move. The piston shaft 120 is supplied with an opposite polarity as soon as the piston 116 moves so that an ER fluid seal is formed between the collar 126 and the shaft 120. The ER fluid seal has a shear strength which is easily overcome. Any ER fluid 41 which may escape is scraped from the shaft 120 and returned via one-way valves to the interior of the hollow cylinder. Furthermore, a second tight tolerance guiding collar (not shown) can be disposed prior to the ER fluid seal to further prevent the escape of ER fluid 41 and/or contamination of the interior of the hollow containing cylinder.

FIGS. 27(a) and 27(b) show another embodiment of the piston 116 type variable resistance means 14. In this embodiment, the flow of an ER fluid 41 is variably resisted through an ER valve 128. The ER valve 128 may simply be a first electrode surface 42 and a second electrode surface 44 between which the ER fluid 41 flows. By controllably applying a potential across the ER fluid 41 via the first and second electrodes 42,44, the particles in the ER fluid align and the flow rate of the ER fluid 41 is controllably varied. Thus, as the top piston 116 is forced downward by a user supplied linear displacing force, the fluid in the top chamber is forced through the valve and adds volume to the fluid in the bottom chamber. Similar conditions occur when the bottom piston 116 is linearly displaced. By controllably varying the flow characteristics of the ER fluid 41 through the valving means, the resistance to the user supplied linear force can be controllably varied.

Figure 28A:
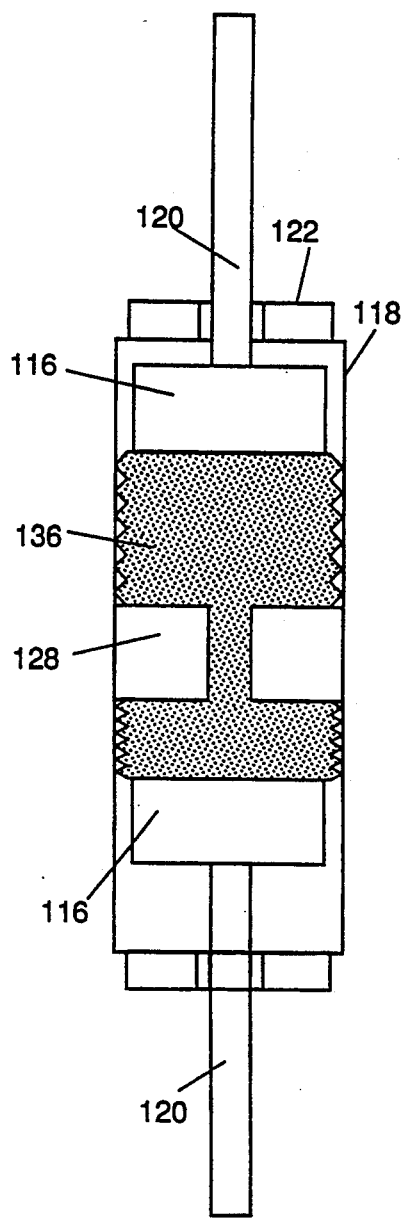
FIG. 28(a) is a cross sectional view of another configuration of the inventive resistance apparatus configured as a piston within a cylinder system having ER fluid containing bellows.
Figure 28B:
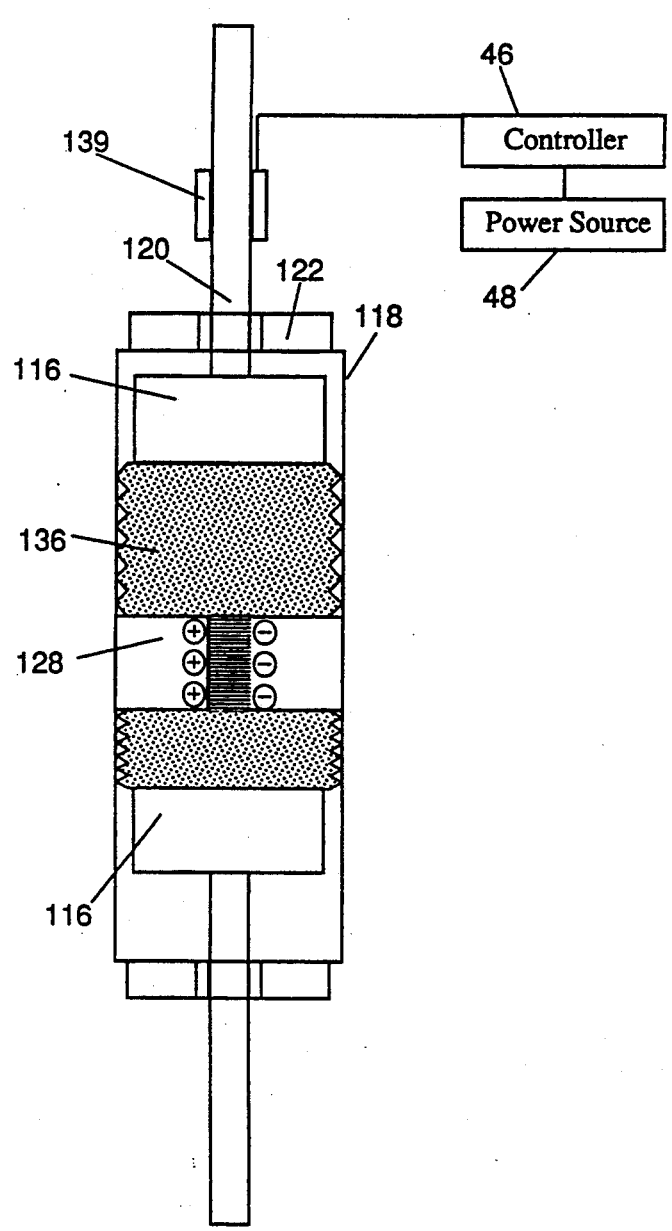
FIG. 28(b) is a cross sectional view of another configuration of the inventive resistance apparatus configured as a piston within a cylinder shown in FIG. 28(a) having a potential applied at an ER valve.

FIGS. 28(a) and 28(b) show a configuration of the piston 116 and cylinder 118 system having the self-contained collapsible bellows 136 for fully containing the ER fluid 41. In this configuration, a bottom piston 116 receives a user supplied force in one linear direction, while a top piston 116 receives a linear user supplied force in another direction. Thus, the piston 116 and cylinder 118 system is available for resisting a reciprocating exercise. FIG. 28(a) shows a state wherein the ER fluid 41 disposed within the ER fluid valve 128 does not have a potential applied. In this case, the ER fluid 41 is not restricted from flowing through the ER fluid valve 128 by the change in viscosity which occurs when an applied potential aligns the particulates contained within the ER fluid 41. FIG. 28(b) shows the state when a potential is applied across the ER fluid 41 disposed within the valve. In this case, the particulates within the ER fluid 41 align, increasing the viscosity of the ER fluid 41 disposed between the valve, thereby variably restricting the flow of the ER fluid 41 between the bellows 136 depending on the strength of the applied field. As shown in FIG. 28(b), a detector 139 may be provided along the shaft 38 of at least one of the pistons, or along another moving part, so that the flow of the ER fluid 41 due to the user applied force can be sensed. The detector 139 may be, for example, a linear motion sensor, a strain gauge, or the like. Thus, the flow can be controlled by a controller 48 depending on the sensed movement of a moving part which is moved by the user 18 applied force. Alternatively, another input can be used to control the applied potential in the ER fluid valve 128 or the potential applied to the electrode surfaces 42, 44. For example, a computer program which simulates a known bicycle course or an imagined bicycle course can be stored in a computer memory and used to adjust the variable viscosity of the ER fluid 41 (when, for example, the exercise device is configured as a stationary bicycle) so that the user 18 is subjected to the conditions of the actual or imaginary bicycle course. Also, the applied field can be controlled depending on other factors, such as heart rate, blood pressure, oxygen intake, or other physiological phenomenon occurring within the user's body, so that the exercise is directly linked to the biofeedback supplied by the user 18 while exercising. These types of input and stored computer programs can be used to control any of the variable resistance configurations described in this application.

Figure 29A:
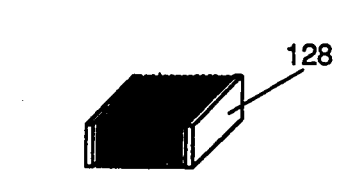
FIG. 29(a) is an isolated perspective view of an example of the inventive ER fluid valve.
Figure 29B:
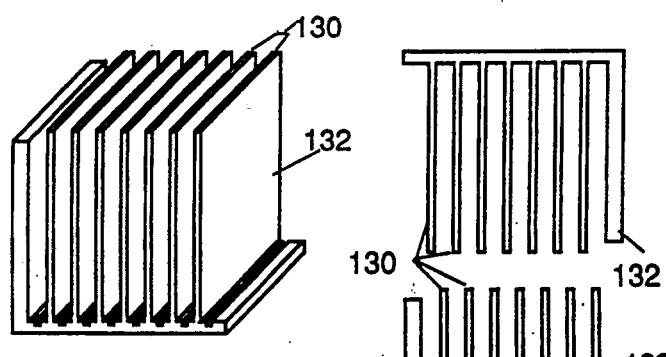
FIG. 29(b) is an enlarged perspective view of a ganged-plates member in accordance with the ER valve shown in FIG. 29(a)
Figure 29C:
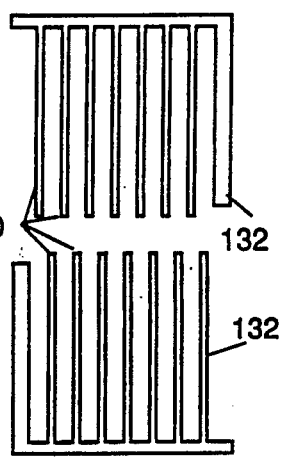
FIG. 29(c) is an enlarged top plan view of two ganged-plates members making up the ER valve shown in FIG. 29(a)
Figure 29D:
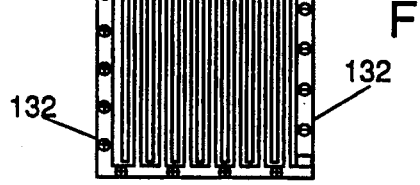
FIG. 29(d) is an enlarged top plan view of the assembled ER valve shown in FIG. 29(a)

FIGS. 29(a) through 29(d) show an embodiment of the ER fluid valve 128 in which a series of valve plate members 130 provide a great increase in electrode 42,44 surface area to thereby more effectively resist the ER fluid 41 flowing through the ER fluid valve 128. The adjacent plates 130 are alternately applied with opposite potentials so that between any two facing plates 130 a potential can be applied through the ER fluid 41 disposed therein. FIG. 29(a) shows an isolated perspective view of the ER fluid valve 128. As shown, a plurality of parallel conductive plates 130 are stack with a gap disposed between adjacent plates 130. Opposite polarities are applied to adjacent plates 130 so as to create an electric field within the gap. This electric field is effective to cause particles in the ER fluid 41 disposed in the gap to align, thereby restrict the flow of the ER fluid 41 through the ER fluid valve 128. A constant voltage power source can be used to energize the plates 130. To provide variability to the ER fluid 41 flow, the number of plates 130 being energized (such as by a separately controlled electrical connection with each respective plate 130) can be controlled so that the ER fluid 41 flows without restriction through non-energized gaps, and is restricted through energized gaps. Also, the effective gap, and thus the strength of the electric field can be controlled by applying opposite polarity to non-adjacent plates 130 (i.e., skipping a plate 130). Since the ER effect is dependent on the applied electric field, controlling application of the electric field in this way will adjust the ER fluid 41 flow through the ER fluid valve 128. FIG. 29(b) shows an isolated enlarged perspective view of ganged-plates member 132 comprising one half of the plates 130 of the ER fluid valve 128 that are formed together. FIG. 29(c) shows a top plan view of two ganged-plates member 132 arranged just prior to assembly. FIG. 29(d) shows the two ganged-plates member 132 assembled to form the ER fluid valve 128. In this configuration, opposite polarity is applied to each respective plates 130 of the ganged-plates member 132, so that ER fluid 41 flow is controlled by controlling the strength of the electric field (i.e., controlling the potential supplied to the two ganged-plates member 132) and/or by controlling the duration of an applied voltage. In accordance with this feature, the applied voltage is switch on and off and the timing of the on/off cycle determines ER fluid 41 flow.

Figure 30A:
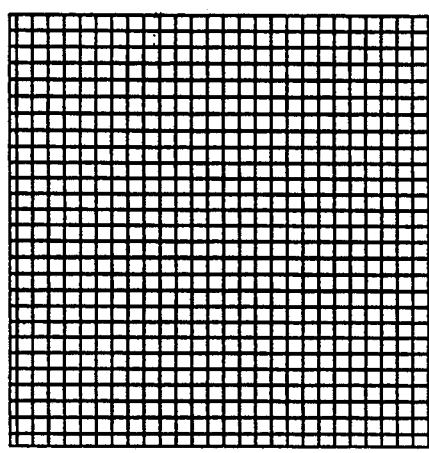
FIG. 30(a) is an enlarged isolated plan view of a portion of a mesh electrode in accordance with another inventive ER valve.
Figure 30B:
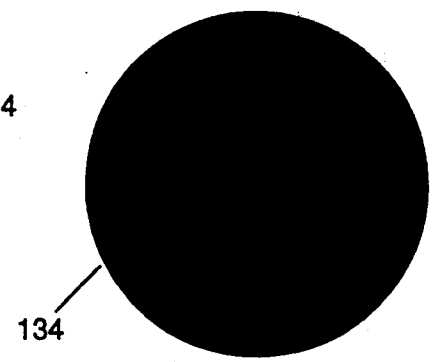
FIG. 30(b) is an enlarged isolated plan view a mesh electrode in accordance with the inventive ER valve.
Figure 30D:
FIG. 30(d) is a representation of offset and aligned mesh electrode wires.
Figure 30C:
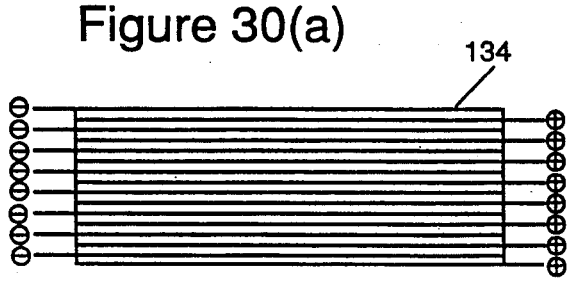
FIG. 30(c) is a side view of a stack of mesh electrodes.
Figure 30E:
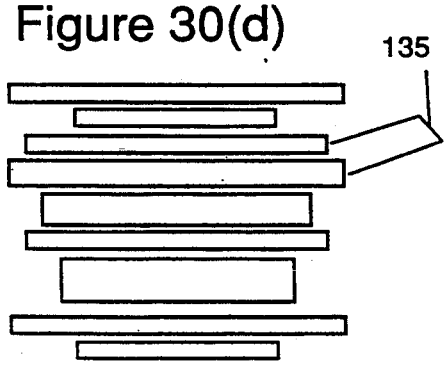
FIG. 30(e) is an enlarged isolated side view of spacers for the inventive mesh electrode stack.

FIGS. 30(a) through 30(e) show another embodiment of the electrode of the inventive ER fluid valve 128. In this embodiment a stack of mesh electrodes 134 are alternately applied with opposite polarity. The ER fluid 41 flow through the stack of mesh electrodes 134 is variably controlled by controlling the potential applied to the mesh electrodes 134. Also, by selectively applying the polarity between non-adjacent mesh electrode 134, the gap between which the potential field must be applied can be selected. For example, a first and second electrode 134 (which are adjacent) define the smallest gap distance across which the electric field is applied. However, if no electric field is applied to the second mesh electrode 134 in the stack, while a polarity opposite the polarity of the first mesh electrode 134 is applied to the third mesh electrode 134, the gap thus becomes the distance between the first and third electrodes 134. The gap distance (i.e., the distance between the charged electrodes 134) greatly influences the ER phenomenon. Thus, by controlling the gap distance, the flow rate through the mesh electrode 134 can also be variably controlled, as well as is done via controlling the applied potential. The individual wires of the mesh electrodes 134 may be oriented so that the adjacent electrode 134 are stacked one on top of the other or alternatively, the mesh electrodes 134 can be disposed so that the individual wires adjacent electrodes 134 have other orientations, such as to dispose the adjacent wires at an offset positions. FIG. 30(a) shows an enlarged top plan view of a portion of one mesh electrode 134, and FIG. 30(b) shows a top plan view of a circular mesh electrode 134. A plurality of mesh electrodes 134 are stacked, as shown in FIG. 30(c), and applied with opposite polarity between adjacent mesh electrodes 134. FIG. 30(d) shows the offset and stack wire configuration, while FIG. 30(e) shows a plurality of spacers 135 which may be provided between the mesh electrodes 134 to maintain consistent gap distances. The spacers 135 may have different thickness to provide a variety of gap distances between adjacent mesh electrodes 134. Since the electric field applied to the ER fluid 41 is dependent on the gap distance, a single voltage power source can be used and the ER fluid 41 flow through the ER fluid valve 128 is controlled by applying potential between selected mesh electrodes 134 while leaving other without an applied potential.

Referring to FIGS. 31(a) through 32(c), an embodiment of the inventive piston 116 and cylinder 118 configuration for the variable resistance means 14 is shown. In this embodiment, to prevent contamination of the ER fluid 41, as well as to prevent leakage and to maintain the integrity and the consistency of the variable resistance, the ER fluid 41 is contained within the fully sealed flexible bellows 136. A top bellow is separated from a bottom bellow through a fluid valve, such as that described above. The valve may be fixed so as to be stationary relative to the moving piston. As the piston 116 moves from the position shown in FIG. 31(a) to the position shown in FIG. 31(b)), the ER fluid 41 from the top bellows 136 is forced into and expands the bottom bellows 136 by passing through the fluid valves. By controlling the flow of the ER fluid 41 through the ER fluid valve 128, the resistance to the movement of the piston 116 can be variably controlled. The piston 116 is moved directly or indirectly through the exercising motions of the user 18. Thus, the movement of the exercise motion of the user 18 is variably resisted by the piston 116 and cylinder 118 system. FIG. 31(c) shows a view of the piston 116 and cylinder 118 system shown in FIG. 31(a) and 31(b) rotated 90 degrees. This figure also shows the containing hollow cylinder 118 in solid form, having a groove so as to be slidable relative to the fixed ER fluid valve 128. In this case, as the bottom bellows 136 is expanded by the introduction of ER fluid 41 from the top bellows 136 through the valve, the external piston 116 slides relative to the valve. The piston 116 may returned to the constant position (i.e. the ER fluid 41 from the bottom bellows 136 flows to the top bellows 136) by a returning spring (not shown), or by a piston 116 that presses against the bottom bellows 136 forcing the ER fluid 41 through the valve. The piston 116 and cylinder 118 configuration is particularly adaptable for resisting exercise range of motion when the exercise device is configured as a stepper, bench press, shoulder press, or any other configuration which can utilize the resistance to linear displacement of the piston 116 and/or cylinder 122.

FIG. 32(a) and 32(b) shows another configuration for applying the constantly applied resistance. In this case, a weight stack 138, such as that commonly used with a Universal ™ or Nautilus ™ type gym equipment, is used to select a constant resistance level. A chain 142, cable, or other force transferring means is fixed to the weight stack 138 and the amount of weight lifted depends on the placement of the key within the plurality of holes. In this case, the static weight of the selected weight stack 138 is supplemented variably and continuously along the exercise range of motion by the variable resistance means 14. By way of example, a user 18 may anticipate that the minimum weight he wishes to bench press is 250 lbs. This minimum weight corresponds to the weakest ability of his body to bench press, plus an adequate safety margin. To maximize the effectiveness of the exercise, the variable resistance means 14 is available to provide an additional resistance to supplement the static 250 lbs being bench pressed. This supplemental resistance is varied continuously and nearly instantaneously along the exercise range of motion. Also, a micro-processor which controls the variable resistance means 14 can be preprogrammed for a particular exercise regiment. A typical weight lifting regiment is known as pyramiding. When pyramiding, the user 18 performs a fixed number of repetitions at a certain weight and then progresses to less repetitions at a higher weight and so on. In the bench press example, the user 18 will typically start with 10 repetitions at 250 lbs. as a first iteration. A next iteration in the pyramid has the user 18 doing 8 repetitions at 260 lbs. Next the user 18 does 6 repetitions at 252 lbs. Next the user 18 does 4 repetitions at 280 lbs., and then 2 repetitions at 290 lbs. Finally, the user 18 does one repetition at his maximum of 300 lbs. This exercise regiment can be preprogrammed into the CPU so that the user 18 merely has to set the constant weight and then perform the exercise. A sensor 50 detects the number of repetitions and adjusts the variable resistance means 14 accordingly. The user 18 may be given a signal (audio, visual, or tactile) counting the number of reps, indicating the iteration, etc. Also, after a predetermined amount of time the CPU may instruct the variable resistance means 14 to lessen the resistance so that the user 18 can finish the repetition. For example, toward the end of the pyramid, it is common for the user 18 to have difficulty in finishing the repetitions. He may, in fact, only be able to push the weight part-way through the exercise range of motion and then remain static. Traditionally, the user's 18 weight lifting partner will step in and assist with slight upward pressure to help the user 18 finish the rep. However, in accordance with this aspect of the present invention, the CPU detects the slowing or static condition of the user's 18 rep, and adjusts the variable resistance means 14 accordingly. The above illustrates only one possible weight lifting regiment. By appropriately controlling the variable resisting means 14, almost any conceivable weight lifting regiment can be implemented.

FIGS. 33(a)-33(c) illustrate an example of the inventive exercise device 10 which is configured to replicate the exercise of cross country skiing. It is to be noted, however, that this configuration is for illustrative purposes only. The exercise device can be configured in any of a number of other configurations to replicate, for example, rowing, stepping, bicycling, etc. As shown in the skier configuration, the exercise device includes a frame which supports guide rollers 144 which in turn slidably support two skis 146. These skis 146 drive respective drive rollers 148, as the user 18 causes the skis 146 to slide. The feet of the user 18 engage with toe grips 150 attached to the skis 146. As the user 18 replicates the cross country ski motion, the skis 146 rotate the drive rollers 148, which in turn rotate a shaft through a one-way clutch 56 mechanism. Thus, each drive roller 148 is free wheeling in the rotational direction opposite the drive direction, while being effective to drive the shaft in the one-way drive direction. The shaft in turn rotates a flywheel 28 which has a friction band 152 in contact with its peripheral surface. The amount of friction generated by the friction band 152 is determined by a tension adjuster 154 through which the user 18 can vary the amount of tension on the friction band 152. A spring attached to the friction band helps reduce shocks and maintains a consistent friction force applied to the rotating flywheel 28. In accordance with the present invention, a variable resistance means 14 is rotatably driven through a drive pulley 156 and drive belt system (or may be directly driven by the shaft and/or flywheel 28). The drive pulley 156 is fixed to the shaft and rotates therewith. The drive belt is thus driven by the pulley 156 which drives the shaft of the variably resistance means. By controlling the resistance available through the variable resistance means 14, the resistance experienced by the user 18 when performing the cross country skiing exercise is appropriately varied. A rotational velocity sensor 50, or strain gauge, etc., is fixed to the shaft to provide telemetry regarding the forces being applied through the exercise of the user 18. The information obtained by the sensor 50 is received by a controller 48 which in turn controls the amount of resistance applied through the variable resistance means 14. The resistance can be applied in accordance with a predetermined set of instructions so that the user 18 undergoes an exercise regiment, replicating for example, going up and down hills of varying slope. Also, the controller 48 can control the applied resistance through the variable resistance means 14 so that the user 18 is forced to maintain a constant velocity or constantly applied force to the rotation shaft, and hence, experiences an exercise replicating cross country skiing at a constant speed. Alternatively, the heart rate of the user 18 can be used to as biofeedback to control the application of the applied resistance through the variable resistance means 14. In this case, a heart monitoring device (not shown), such as a pulse determining means, etc. is used to obtain the heart rate. The resistance can also be controlled in accordance with other variables such as oxygen intake, respiration, blood pressure, blood chemistry, body temperature, etc. It is to be noted that the biofeedback obtained through sensing the body's changes during the exercise can be applied to any of the described configurations or other configurations of the inventive exercise device 10. The variably resistance means can also include a number of other resistance sources, such as magnetically induced resistance, friction brake, etc. An arm exerciser 158 may also have a variable resistance means 14 provided for providing variable resistance force to exercise the user's arms.

FIG. 33(d) shows an enlarged isolated view of another configuration for applying the variable resistance to the rotation of the shaft 38. In this case, the drive rollers 148 receive two-directional reciprocating motion and apply the force exerted by the user 18 as a one-way drive rotation through the one-way clutch 56. Variable resistance means 14 is fixed to the flywheel 28, which rotates freely on the shaft. The rotation of the variable resistance means 14 is coupled with the rotation of the shaft so that the variable resistance means 14 couples the rotation of the shaft to the rotation of the flywheel 28 in a variable manner. Thus, the friction band 152 on the flywheel 28 perimeter acts as a resistance amplifier to the resistance applied through the variable resistance means 14. In accordance with this aspect of the present invention, the containing means 66 of the variable resistance means 14 is fixed to the flywheel 28 and thus rotates. Therefore, an electrical potential is applied to the variable resistance means 14 through the use of brushes or other rotating electrode.

Figure 34:
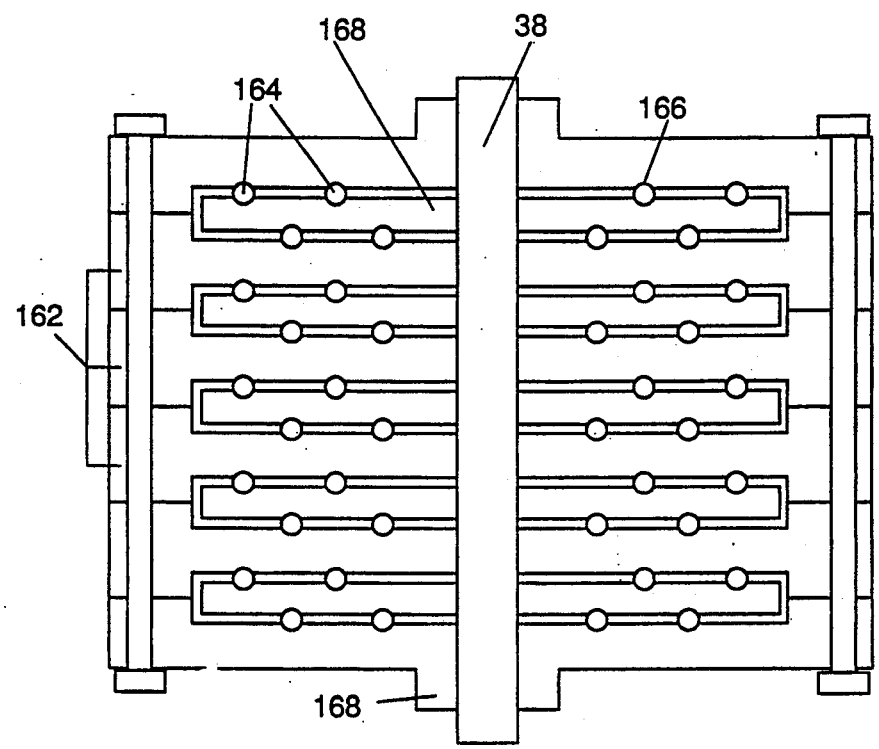
FIG. 34 is a cross sectional view of an assembled stack of section/disk units in accordance with another embodiment of the inventive variable resistance apparatus.

FIG. 34 shows a cross section 162 of an embodiment of the present invention which provides and easy to manufacture and easily alterable variable resistance means 14. This embodiment of the present invention provides an easy to manufacture variable resistance means 14, which does not require many expensive and laborious time consuming machining operations. In accordance with this aspect of the present invention, an ER fluid 41 is disposed in a gap between a respective disk 160 and section 162. A series of non-conductive bearings 164 are disposed in bearing grooves 166 to maintain the gap distance to within a high tolerance. A voltage is applied across the ER fluid 41 by applying a polarity to the sections 162 and an opposite polarity to the disks 160. The voltage causes a change in rheology of tile ER fluid 41, thus varying the resistance to the rotation of the disk 160 by a shaft 38. The total resistance applied by the stack by controlling the applied voltage and/or controlling the separate disk/section units (i.e., tile number of units having applied voltage and/or amount of applied voltage to individually controlled units). Also, the disk/section units can be added or deleted from the assembled stack depending on the application and the anticipated resistance it requires. A sealing cap 168 is provided at the exit point of the shaft 38 from the assembled stack. The sealing cap 168 seals the interior of the assembled stack from the external environment. By selecting an appropriate dielectric constant for the non-conductive bearings 164, disk 160 and/or section 162 substrate, any uneven electric field which may be caused by, for example, the existence of the bearings 164 between the electrode surface 42,44 is minimized. The assembled stack may be held together by bolts and nuts, or other fixing means, such as threaded members integrally formed with respective sections 162.

Figure 35A:
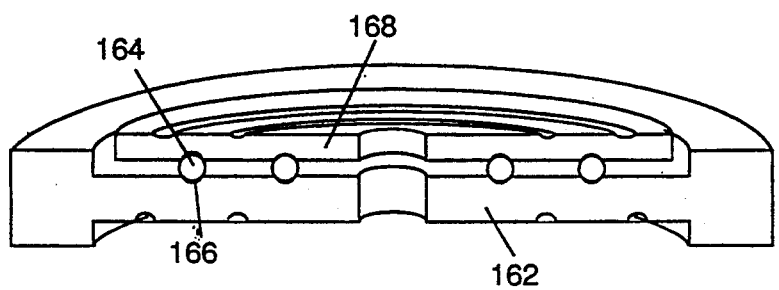
FIG. 35(a) is a cross sectional perspective view of an assembled section/disk unit.
Figure 35B:
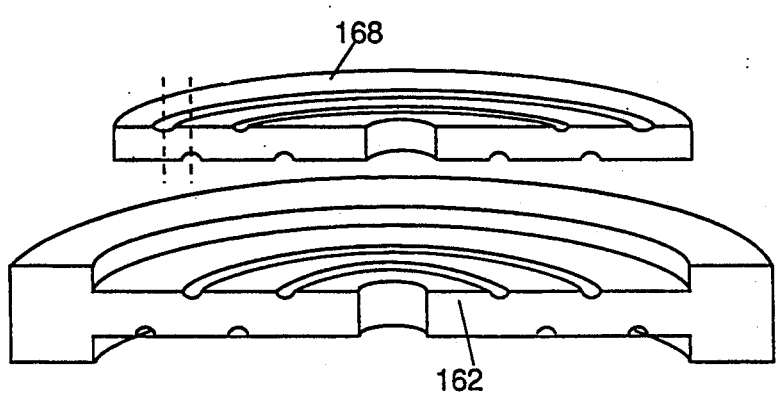
FIG. 35(b) is a cross sectional perspective view of an exploded section/disk unit.

Referring to FIG. 35(a) and FIG. 35(b), a cross sectional perspective view of the assembled and explodes disk/section unit are shown. A unit is complete with a second section 162 (not shown) disposed adjacent to the section 162 and over the disk 160 to provide a gap between the interior peripheral surfaces of the two sections 162 and the peripheral surfaces of the disk 160. The non-conductive bearings 164 are disposed in bearing grooves 166 that are off set between the grooves 166 on the top of the disk 160 and the grooves 166 on the bottom. This helps to reduce the thickness of the disk 160, since the cut groove surfaces are not in the same vertical plane, as well as add stability to the rotation of the disk 160.

Figures 36A, 36B, 36C:
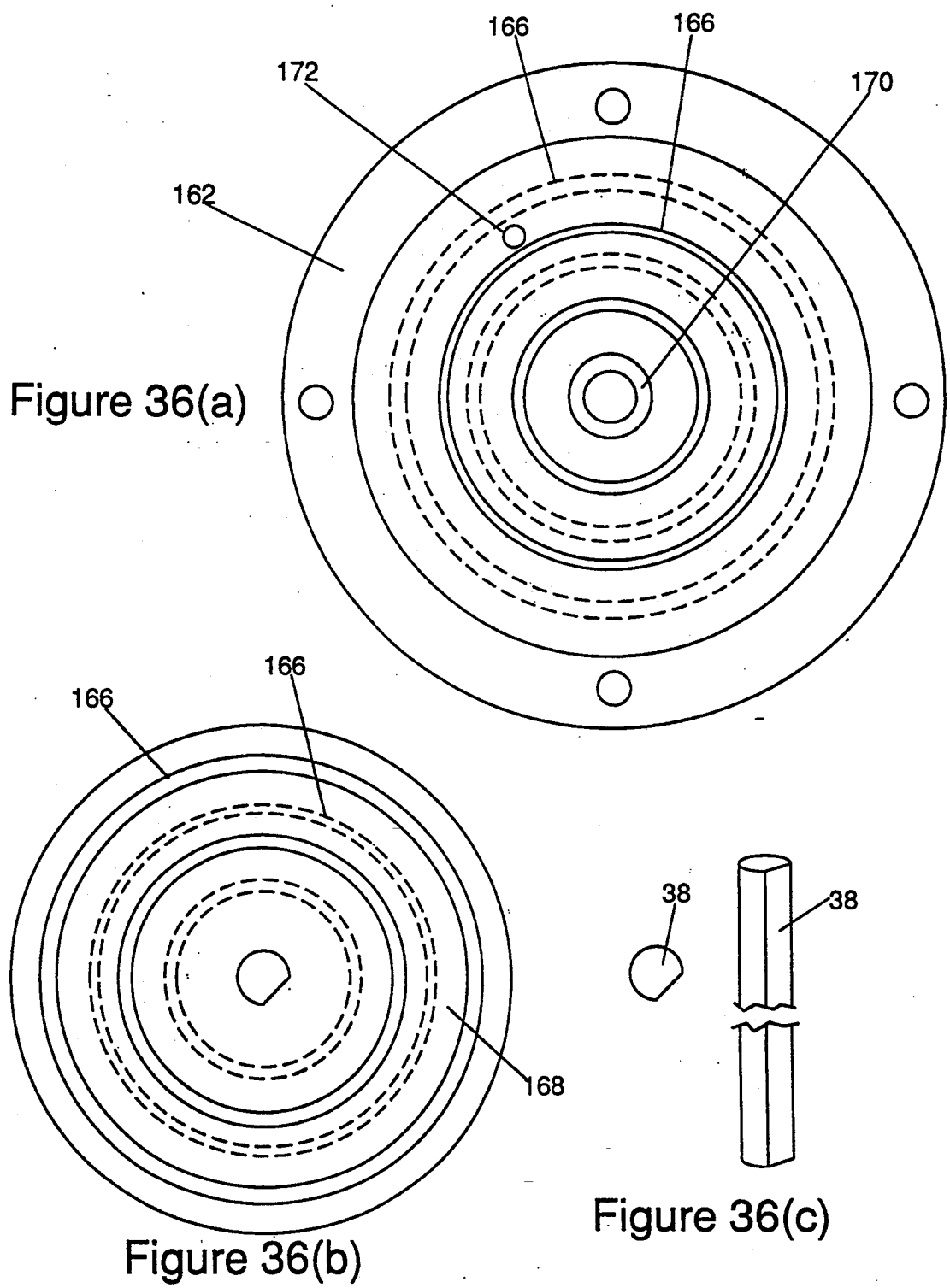
FIG. 36(a) is a top plan view of a section in accordance with the assembled stack shown in FIG. 34.
FIG. 36(b) is a top plan view of a disk in accordance with the assembled stack shown in FIG. 34.
FIG. 36(c) shows a top plan and cut perspective view of a shaft in accordance with the assembled stack shown in FIG. 34.

FIG. 36(a) shows a top plan view of a section 162. Each section 162 may be made by machining the section 162 geometry from a plate of conductive material, such as aluminum or steel. Alternatively, each section 162 can be mass produced by forming an injection molded substrate upon which appropriate electrode surfaces 44 are formed, through electroplating or adhesion. If the section 162 is made of a conductive material, than an insulating collar 170 may be disposed at the shaft through hole, to prevent shorting between the shaft 38 and the section 162. Alternatively, the shaft 38 may be non-conductive. One or more ER fluid through holes 172 may be provided to promote ER fluid 41 flow between disk/section units of the stack.

FIG. 36(b) shows a top plan view of the disk 160 and FIG. 36(c) shows a top plan and a cut perspective view of the shaft 38. The shaft 38 is received through the shaft 38 through hole of the disk 160, and both the shaft 38 and the shaft 38 through hole have retaining surfaces. The retaining surfaces lock the rotation of the shaft 38 to the rotation of the disk 160. Each disk 160 can be machined from a plate 40 of conductive material, or alternatively formed by injection molding a disk 160 shaped substrate and forming an appropriate electrode 42 surface thereon. The shaft 38 can be made from a rod having the retaining surface formed by a surface grinder, or can be otherwise extruded, injection molded, or made by any other suitable manufacturing technique.

FIG. 37 shows an enlarged cross sectional view of a sealing cap 168 and the shaft 38. The sealing cap 168 is disposed at the exit point of the shaft 38 from the assembled stack. A pair of O rings are provided for sealing off the interior of the shaft 38 from the environment. The cap has confining electrode surfaces 88 disposed between O ring seals, which when energized, reduce the flow of any ER fluid 41 disposed between the confining electrodes 88 and the shaft 38 thereby to thereby enhance the seal.

FIG. 38(a) and 38(b) show an alternative configuration for the assembled stack. In this case, the assembled stack is made by assembling disk 160 and section 162 units. At least one of the disk 160 and the section 162 units can be formed by a more efficient metal stamping operation, rather than the injection molding and electroplating process. In this case, for example, the disk 160 can be formed simply by stamping an appropriate disk 160 shape from a sheet of sheet metal. The sections 162 can be formed by a machining process, or by the injection molding and electroplating process. Ridges 172 in the sections 162 are masked so that electrodes 42,44 are planer and parallel, before forming the electrode surfaces 42,44 on the interior section 162 peripheral surfaces. The ridges 172 are provided to maintain a consistent gap distance between the disk 160 and the electrode surfaces 42,44 of the section 162. These ridges 172 also help to maintain flatness and rigidity of the section 162 as well as to increase the overall stability and strength of the assembled stack. The dielectric constant of the section 162 and/or disk 160 is selected to minimize any uneven electric field applied to the ER fluid 41. The ER fluid 41 acts as a lubricant between the disk 160 and the ridges 172. The stacking system allows for constant voltage (i.e., a simple power supply 46) to be used. By applying a constant voltage, while controlling the number of sections 162 and/or disks 160 having the potential applied thereto, the overall total resistance available through the assembled stack can be appropriately controlled. Thus, if a greater resistance is required, a larger number of disk/section units have voltage applied thereto to increase the resistance. If less resistance is required, fewer disk/section units the potential applied. The units not having the potential applied do not add any resistance to the assembled stack, since the ER fluid 41 disposed within the gap of these units is not caused to gel.

The total resistance available from the variable resistance means 14 is obtained, for the most part, by those disk/section units to which a potential is applied. For example, the first six out of the fifteen total disk/section units may have the potential applied causing the particles in the ER fluid 41 to align. The remaining disk/section units do not have aligned ER particles, since the potential is not applied thereto. Control of which disk/section units are energized can be obtained by controlling switching elements (not shown) between the power supply and electrodes that bring the power to the sections 162 (or disks 160). This feature allows for a much less expensive and much less complex power supply 46 to be utilized since only a single constant voltage needs to be supplied. Alternatively, the power supply 46 may be configured to output a variety of constant voltages, so that total resistance available from the variable resistance means 14 is dependent on the particular voltage supplied by the power supply 46 and the number of disk/section units having the potential applied thereto. This feature increases the range of resistance available from the variable resistance means 14 while maintaining a simple power supply 46 which only need to output a predetermined number of constant applied voltages. A microprocessor is used to control the application of the voltage to the individual disk/section units of the assembled stack. The microprocessor can receive input, such as biofeedback, strain gauge, position or velocity sensor 50 out put which is used to determine an appropriate voltage and number of disks 160/section 162 units to apply the voltage to. Due to the extremely fast response time of the ER fluid 41, a microprocessor having a fast clock speed, an hence a high sampling rate can be utilized to provide nearly instantaneous alteration of the applied resistance to optimize the exercise benefit. Also shown in the drawing is a plan view of the section 162. Concentric ridges 172 are provided which maintain an appropriate gap between the respective disk 160 and electrode surfaces 42,44 of the sections 162. The ridges 172 can be formed by an injection molding process while forming the section 162 substrate, the ridges 172 are then masked or otherwise prevent from forming an electrode 42,44 surface thereupon during an electroplating or adhesion process. In accordance with this aspect of the present invention, an easy to manufacture, assemble and reconfigure variable resistance means 14 is obtainable having very small size as compared with that available in the conventional art. As is also shown, stiffening ribs 176 increase the rigidity, flatness and strength of the section 162, and may also be used to enhance the rotation of the disks 160, while controlling the gap tolerance.

FIG. 39(a) shows another alternative configuration of the present invention. In this case, the variable resisting means 14 is fixed at one end of the shaft 38, and a flywheel 28 is fixed at the other end. Between the variable resisting means 14 and the flywheel 28 are gears 24,26 which have one-way clutch mechanisms internally disposed for applying the same one-way driving direction to the shaft 38. In the other direction, the gears 24,26 are freewheeling. A cable 20 is fixed to a carriage 178 which rides on a vertical frame member 12. A bar 22 is fixed to the carriage 178. The cable 20 is strung between the gears 24,26 and directional pulleys 36 in such a manner that a reciprocating motion of the bar 22 (as shown by the straight arrow) drives the shaft 38 in only one rotational direction (as shown by the curved arrow).

FIG. 39(b) shows still another alternative configuration of the present invention. In this case, a resistance is applied in one direction only, rather than in reciprocating directions. As shown, when the bar 22 is pushed upward, a length of cable 20 pulls out from a spool, and the shaft 38 is rotated. The rotation of the shaft 38 is braked by a variable resisting means 14. In the reverse direction, a coil spring member 35 recoils the cable 20 onto the spool through the action of a one-way clutch mechanism 56. A pulley 16 is used to guide the cable 20 and a flywheel 28 may be provided to improve the feel of the resistance.

FIG. 39(c) shows the configuration shown in FIG. 29(b) reconfigured as a rowing machine. In this case, the user 18 is slidably supported on a rolling seat. During the power stroke of the rowing exercise (i.e., from the position shown to an extended position wherein the legs of the user 18 become straightened), the cable 20 uncoils from the spool and rotates the shaft 38. The rotation of the shaft 38 is braked by the variable resisting means 14. The coil spring member 35 returns the cable 20 to the spool on the reverse stroke (non-load stroke).

Figure 40A:
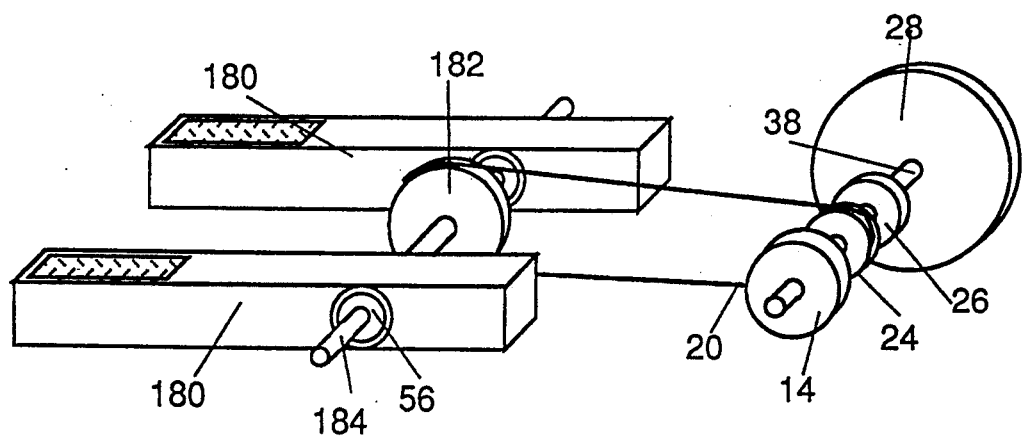
FIG. 40(a) shows an isolated view, of a stepper attachment for the inventive exercise device.
Figure 40B:
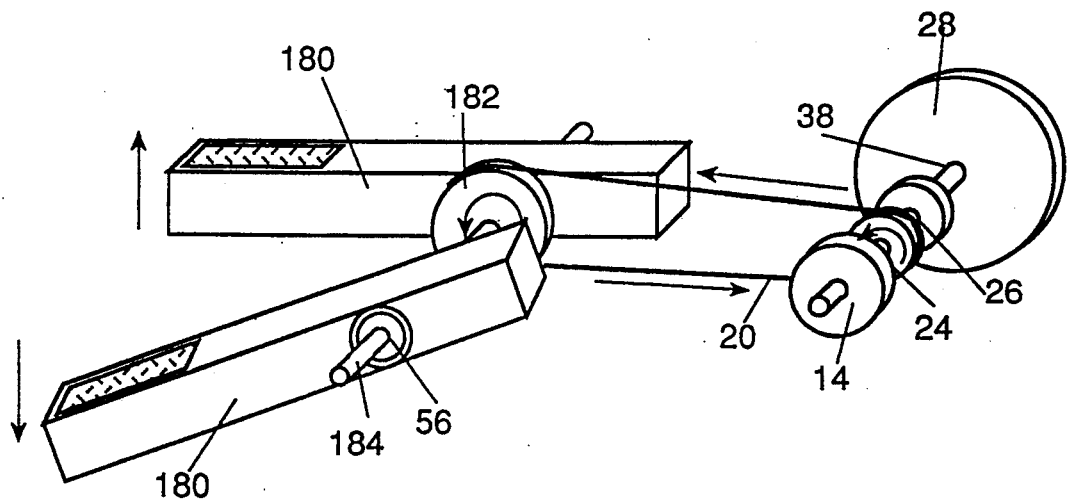
FIG. 40(b) shows an isolated view of the stepper attachment shown in FIG. 40(a)
Figure 40C:
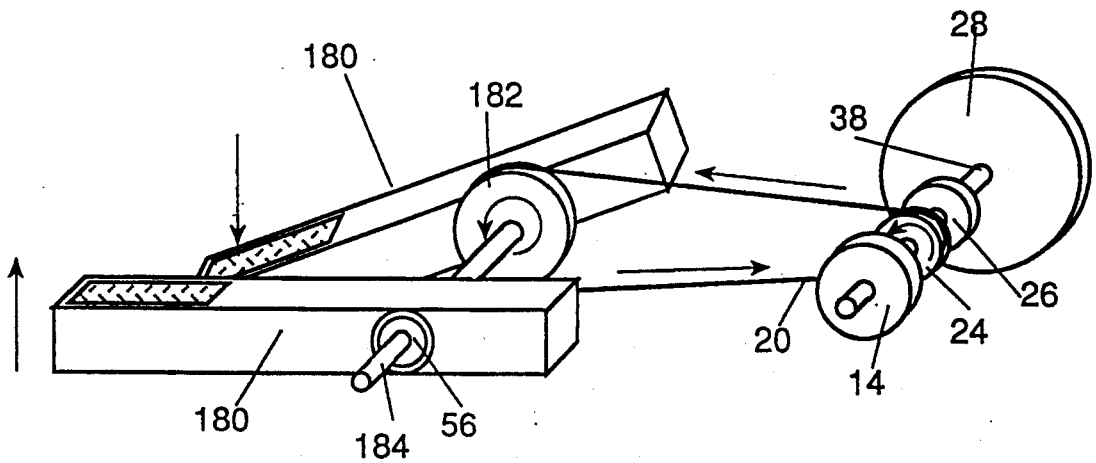
FIG. 40(c) shows an isolated view of the stepper attachment shown in FIG. 40(a)

FIG. 40(a)-40(c) show an add-on attachment for the inventive exercise device. This attachment provides a stepper exerciser. Two stepper arms 180 are pivotally supported on a stepper shaft 184 via one-way clutch mechanisms 56. As the user reciprocates the stepper arms 180 in an exercise range of motion replicating stair climbing, the stepper shaft 184 is rotated, which in turn rotates a stepper drive pulley 182. The stepper drive pulley 182 drives one of the gears 24,26 through a cable 20 in a direction that is braked by the variable resisting means 14. The variable resisting means 14 and/or the flywheel 28 may alternatively be disposed directly on the stepper shaft 184.

FIGS. 41(a)-41(c) show various alternative configurations for applying a two-directional reciprocating motion as a one-way driving force. As shown in FIG. 41(a) a directional pulley 36 is used to convert a two opposite directional linear forces applied to the gears 24,26 into a one-way driving force. FIGS. 41(b) and 41(c) show examples of direct drive gear trains for driving the shaft 38 in a one-way driving direction. The direct drive gear train reduces the space required, and also reduces any slippage due to stretching of the cable 20, slipping of the cable on the gears 24,26, etc.

Figure 42:
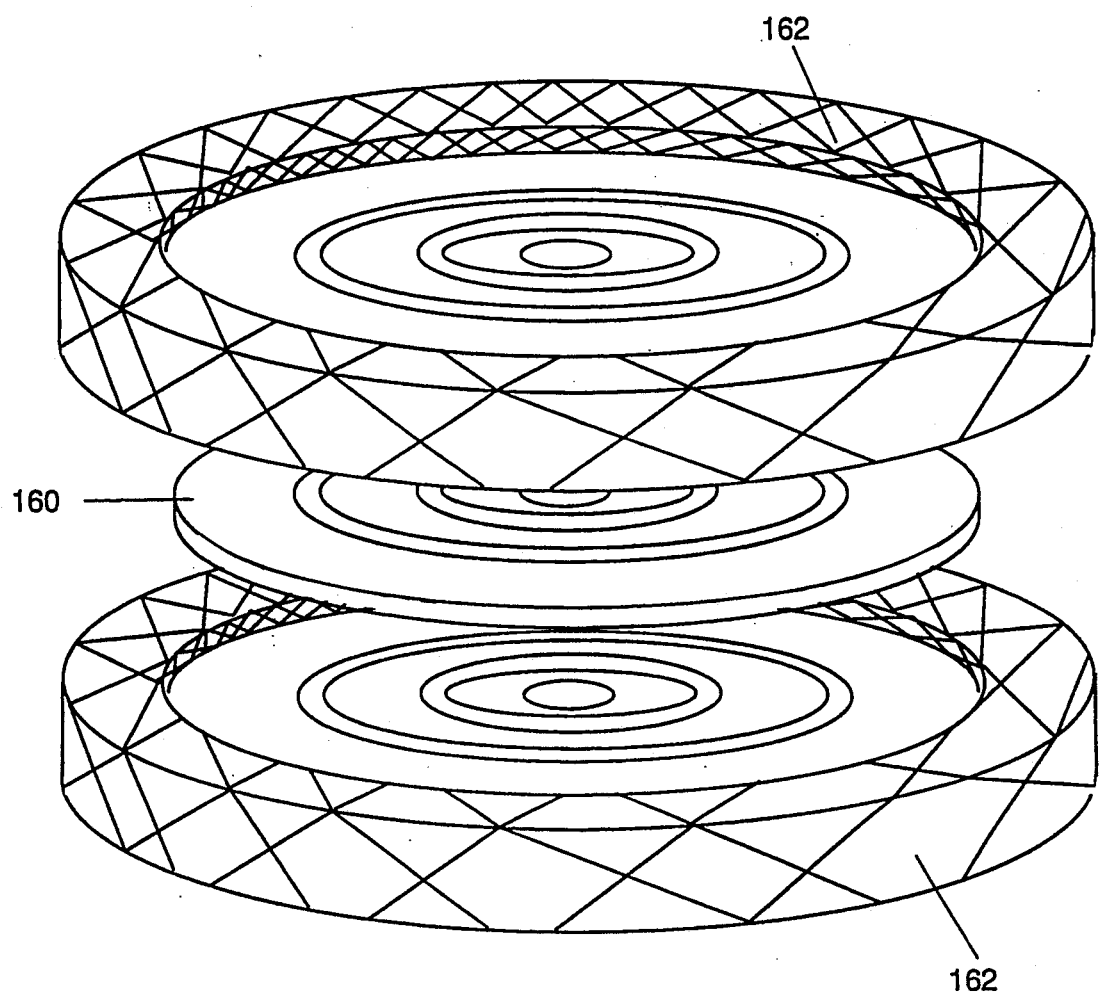
FIG. 42 shows an exploded view of a disk/section unit for forming a magnetically reactive brake.

FIG. 42 shows an embodiment of the section and disk units that are used when forming a less expensive magnetic particle brake. An assembled stack of section/disk units is configures as shown, for example, in FIG. 34. In this case, an electrically conductive coil is formed on the sections 162 (by a winding, selective electroplating or selective etching techniques) so that a electromagnetic field can be applied to align magnetizable particles disposed adjacent to the disk 160.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

INDUSTRIAL APPLICABILITY

The inventive features described herein have direct applications in the field of exercise devices. Also, the inventive variable resistance means 14 can be utilized in other fields of endeavor, such as machine control, robotics, vibration dampening, wire drawing, vehicle shock absorbers, and other applications where controlled rotational and linear force braking is desired.

I claim:

1. An exercise device for providing a variable resistance against a user supplied force resulting from an exercise range of motion, characterized by: a rotatable member rotatable by the user supplied force; containing means having a hollow interior for containing the rotatable member; a variable resisting material disposed in said gap for variably resisting rotation of the rotatable member depending on an applied field; applying means for applying a variable applied field to the variable resisting material to provide a variable resistance to the user supplied force; and one-way rotating means for receiving a first user supplied force having a first linear direction and a second user supplied force having a second linear direction, and for applying the first and the second user supplied forces as a one-way rotationally applied driving force having only a one-way driving rotating direction for rotating the rotatable member so that a two directional user supplied force is variably resisted in only the one-way driving rotating direction; including the rotatable member having a first electrode surface; the containing means having a second electrode surface disposed relative to the first electrode surface to define a gap therebetween; the variable resisting material comprising an electro-rheological fluid disposed in said gap; and the applying means for applying an electric potential to the first and the second electrode surface to vary the viscosity of the electro-rheological fluid.

2. An exercise device for providing a variable resistance against a user supplied force according to claim 1; including the rotatable member comprising a plurality of plate members each comprising a respective portion of the first electrode surface; and the containing means having the second electrode surface configured so as to dispose a portion of the second electrode surface facing a respective portion of the first electrode and define a respective gap therebetween for receiving a portion of the electro-rheological fluid.

3. An exercise device for providing a variable resistance against a user supplied force, according to claim 1; including an electrical generator rotatable by the user supplied force for generating an electric potential; the applying means for applying the electric potential from the electric generator as a first polarity to the first electrode surface and as a second polarity to the second electrode surface to cause the electro-rheological fluid to undergo a change in viscosity dependent on the applied electric potential; and controlling means for controlling the applying means to variably apply the electric potential to cause a controlled variable change in viscosity of the electro-theological fluid effective to variably resist the rotation of the first rotatable member by the user supplied force.

4. An exercise device for providing a variable resistance against a user supplied force according to claim 3; including at least one of an external power source for providing electrical power to supplement the electrical power generated by the electrical generator and an energy storage device for storing at least some of the electrical power generated by the electrical generator.

5. An exercise device for providing a variable resistance against a user supplied force according to claim 3; including the electrical generator comprising a generator shaft rotatable by the user supplied force and a magnet and wire coil system, wherein one of the magnet and the wire coil is rotatable by the generator shaft so as to produce magnetic field lines moving relative to a wire coil to generate the electric potential from the user supplied force; detecting means for detecting at least one of a velocity dependent on the user supplied force, a force dependent on the user supplied force and an electric power from the electrical generator, and for producing a detection signal in response thereto; and the controlling means for controlling the applying means depending on the detection signal to variably apply the applied field to variably resist the user supplied force.

6. An exercise device for providing a variable resistance against a user supplied force according to claim 1; including detecting means for detecting at least one of a velocity dependent on the user supplied force, and a force dependent on the user supplied force and producing a detection signal in response thereto; and controlling means for controlling the applying means depending on the detection signal to variably apply the applied field to variably resist the user supplied force.

7. An exercise device for providing a variable resistance against a user supplied force according to claim 1; including the one-way rotating means comprising a one-way clutch means for rotating the rotatable member, a first rotatable body for receiving the first user supplied force to rotatably drive the one-way clutch means and a second rotatable body for receiving the second user supplied force to rotatably drive the one-way clutch means, wherein the one-way clutch means allows the first rotatable body and second rotatable body to be respectively free wheeling in a direction that is not the one-way driving rotating direction so that the two directional user supplied force is resisted in only the one-way driving rotating direction.

8. An exercise device for providing a variable resistance against a user supplied force according to claim 1; including constant resistance applying means for applying a constant resistance to the user supplied force so that at least a portion of the user supplied force is resisted by the constant resistance and the variable resistance supplements the constant resistance depending on the applied field to apply a variable total resistance against the user supplied force.

9. An exercise device for providing a variable resistance against a user supplied force according to claim 8; including the constant resistance applying means comprising a friction plate member in contact with at least one friction surface member, and adjusting means for adjusting a friction force generated between the friction plate member and the friction surface member for adjusting the applied constant resistance.

10. An exercise device for providing a variable resistance against a user supplied force resulting from an exercise range of motion, characterized by: a rotatable member having a first electrode surface rotatable by the user supplied force; containing means having a hollow interior for containing the rotatable member and having a second electrode surface disposed relative to the first electrode surface to define a gap therebetween; a variable resisting material comprising an electro-theological fluid disposed in said gap for variably resisting rotation of the rotatable member depending on an applied field; applying means for applying an electric potential to the first and the second electrode surface to vary the viscosity of the electro-theological fluid to provide a variable resistance to the user supplied force; detecting means for detecting at least one of a velocity dependent on the user supplied force, and a force dependent on the user supplied force and producing a detection signal in response thereto; controlling means for controlling the applying means depending on the detection signal to variably apply the electric potential to variably resist the user supplied force; and one-way rotating means for receiving a first user supplied force having a first rotating direction and a second user supplied force having a second rotating direction, and for applying the first and the second user supplied force as a one-way rotationally applied driving force having only a one-way driving rotating direction for rotating the rotatable member so that a two directional user supplied force is variably resisted in only the one-way driving rotating direction.

* * * * *